(12) United States Patent
Byun et al.

(10) Patent No.: US 11,294,825 B2
(45) Date of Patent: Apr. 5, 2022

(54) MEMORY SYSTEM FOR UTILIZING A MEMORY INCLUDED IN AN EXTERNAL DEVICE

(71) Applicant: SK hynix Inc., Gyeonggi-do (KR)

(72) Inventors: Eu-Joon Byun, Gyeonggi-do (KR); Hye-Mi Kang, Gyeonggi-do (KR); Jong-Hwan Lee, Gyeonggi-do (KR); Young-Ick Cho, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 54 days.

(21) Appl. No.: 16/850,929

(22) Filed: Apr. 16, 2020

(65) Prior Publication Data

US 2020/0334166 A1 Oct. 22, 2020

Related U.S. Application Data

(63) Continuation-in-part of application No. 16/841,431, filed on Apr. 6, 2020, and a continuation-in-part of (Continued)

(30) Foreign Application Priority Data

Apr. 17, 2019 (KR) .................. 10-2019-0044900
Jun. 5, 2019 (KR) .................. 10-2019-0066405
(Continued)

(51) Int. Cl.
*G06F 12/10* (2016.01)
*G06F 12/122* (2016.01)
*G06F 1/3234* (2019.01)

(52) U.S. Cl.
CPC ............ *G06F 12/10* (2013.01); *G06F 1/3275* (2013.01); *G06F 12/122* (2013.01); *G06F 2212/1021* (2013.01); *G06F 2212/657* (2013.01)

(58) Field of Classification Search
CPC .............. G06F 12/10; G06F 12/122; G06F 2212/1021; G06F 2212/657
See application file for complete search history.

(56) References Cited

U.S. PATENT DOCUMENTS 9,229,854 B1 1/2016 Kuzmin et al.
10,198,198 B2 2/2019 Machida
(Continued)

FOREIGN PATENT DOCUMENTS

KR 10-2014-0065856 A 5/2014
KR 10-2018-0123192 A 11/2018

OTHER PUBLICATIONS

Office Action issued by the USPTO for U.S. Appl. No. 16/673,730 dated Jun. 28, 2021.
(Continued)

*Primary Examiner* — Ryan Bertram
(74) *Attorney, Agent, or Firm* — IP &T Group LLP

(57) ABSTRACT

A memory system includes a memory device configured to store a piece of data in a location which is distinguished by a physical address and a controller configured to generate a piece of map data associating a logical address, inputted along with a request from an external device, with the physical address and to determine a timing of transferring the piece of map data into the external device to avoid decreasing an input/output throughput of the memory system.

19 Claims, 37 Drawing Sheets

Related U.S. Application Data application No. 16/734,075, filed on Jan. 3, 2020, and a continuation-in-part of application No. 16/681,076, filed on Nov. 12, 2019, and a continuation-in-part of application No. 16/673,730, filed on Nov. 4, 2019.

(30) Foreign Application Priority Data

| Jun. 28, 2019 | (KR) | ................ 10-2019-0077806 |
| Aug. 30, 2019 | (KR) | ................ 10-2019-0106958 |

(56) References Cited

U.S. PATENT DOCUMENTS

| 10,860,228 | B1* | 12/2020 | Mulani ................ G06F 3/0604 |
| 2007/0283125 | A1 | 12/2007 | Manczak et al. |
| 2008/0189485 | A1 | 8/2008 | Jung et al. |
| 2012/0110259 | A1 | 5/2012 | Mills et al. |
| 2013/0067125 | A1 | 3/2013 | Rizzo et al. |
| 2013/0268741 | A1 | 10/2013 | Daly et al. |
| 2013/0290571 | A1* | 10/2013 | Rizzo ................ G06F 3/067 710/19 |
| 2014/0215129 | A1 | 7/2014 | Kuzmin et al. |
| 2016/0070474 | A1 | 3/2016 | Yu et al. |
| 2017/0038973 | A1* | 2/2017 | Takano ................ G06F 3/0655 |
| 2017/0109089 | A1 | 4/2017 | Huang |
| 2017/0357572 | A1 | 12/2017 | Okubo et al. |
| 2018/0039578 | A1* | 2/2018 | Yun ................ G06F 11/1068 |
| 2018/0081569 | A1 | 3/2018 | Kan et al. |
| 2018/0121109 | A1 | 5/2018 | Li |
| 2018/0121121 | A1* | 5/2018 | Mehra ................ G06F 3/0604 |
| 2018/0239726 | A1* | 8/2018 | Wang ................ G06F 12/1081 |
| 2019/0004944 | A1 | 1/2019 | Widder et al. |
| 2019/0079859 | A1 | 3/2019 | Li et al. |
| 2019/0087125 | A1* | 3/2019 | Matsumoto ......... G06F 12/0868 |
| 2019/0108131 | A1* | 4/2019 | Lee ................ G06F 3/0622 |
| 2019/0129838 | A1 | 5/2019 | Yoshida et al. |
| 2019/0266079 | A1* | 8/2019 | R ................ G06F 3/061 |
| 2019/0384506 | A1* | 12/2019 | Shivanand ............ G06F 3/0647 |
| 2020/0065259 | A1 | 2/2020 | Byun |
| 2020/0225875 | A1 | 7/2020 | Oh |
| 2021/0056021 | A1* | 2/2021 | Parry ................ G06F 12/0246 |

OTHER PUBLICATIONS

Office Action issued by the USPTO for U.S. Appl. No. 16/681,076 dated Apr. 14, 2021.

Office Action issued by the USPTO for U.S. Appl. No. 16/673,730 dated Mar. 26, 2021.

Office Action issued by the USPTO for U.S. Appl. No. 16/841,431 dated Jul. 28, 2021.

Office Action issued by the USPTO for U.S. Appl. No. 16/734,075 dated Mar. 3, 2021.

Notice of Allowance issued by the USPTO dated Oct. 18, 2021.

* cited by examiner

| MAP MANAGEMENT DATA | | |
|---|---|---|

| | MM TABLE | | |
|---|---|---|---|
| | M_SEGMENT LIST | RD_CNT | CND_FLAG |
| 1 | M_SEGMENT 11 | 30 | 0 |
| 2 | M_SEGMENT 03 | 2000 | 1 |
| 3 | M_SEGMENT 06 | 400 | 0 |
| 4 | M_SEGMENT 30 | 1000 | 1 |
| 5 | M_SEGMENT 15 | 900 | 1 |
| ⋮ | ⋮ | ⋮ | ⋮ |

| MISS TABLE | | |
|---|---|---|
| ALL_RD_CNT | MISS_CNT | MISS_RATIO |
| 10,000 | 3000 | 30% |

| TH TABLE | |
|---|---|
| RD_CNT TH(TH1) | MISS_CNT TH(TH2) |
| 500 | 25% |

MEMORY SYSTEM FOR UTILIZING A MEMORY INCLUDED IN AN EXTERNAL DEVICE

CROSS-REFERENCE TO RELATED APPLICATIONS

This patent application claims to the benefit of Korean Patent Applications: No. 10-2019-0044900 filed on Apr. 17, 2019; No. 10-2019-0066405 filed on Jun. 5, 2019; No. 10-2019-0077806 filed on Jun. 28, 2019; Ser. No. 10-2019-0106958 filed on Aug. 30, 2019, and the benefit of U.S. patent application Ser. No. 16/681,076 filed on Nov. 12, 2019; Ser. No. 16/673,730 filed on Nov. 4, 2019; Ser. No. 16/734,075 filed on Jan. 3, 2020; Ser. No. 16/841,431 filed on Apr. 6, 2020, the entire disclosures of which is incorporated herein by reference.

TECHNICAL FIELD

An embodiment of this disclosure relates to a memory system and a data processing system including the memory system, and more particularly, to a memory system which is capable of utilizing a memory included in an external device of the data processing system.

BACKGROUND

Recently, a paradigm for a computing environment has shifted to ubiquitous computing, which enables computer systems to be accessed anytime and everywhere. As a result, the use of portable electronic devices, such as mobile phones, digital cameras, notebook computers and the like, are rapidly increasing. Such portable electronic devices include a data storage device operating together with a memory device. The data storage device can be used as a main storage device or an auxiliary storage device of a portable electronic device.

A data storage device using a nonvolatile semiconductor memory device is advantageous in that it has excellent stability and durability because it has no mechanical driving part (e.g., a mechanical arm). Such data storage device also has high data access speed and low power consumption. Examples of data storage devices having such advantages include a USB (Universal Serial Bus) memory device, a memory card having various interfaces, a solid state drive (SSD) or others.

BRIEF DESCRIPTION OF THE DRAWINGS

The description herein makes reference to the accompanying drawings wherein like reference numerals refer to like parts throughout the figures.

FIGS. 20 and 21 are diagrams illustrating an operation of a data processing system in accordance with an embodiment of the disclosure.

Figure 1:
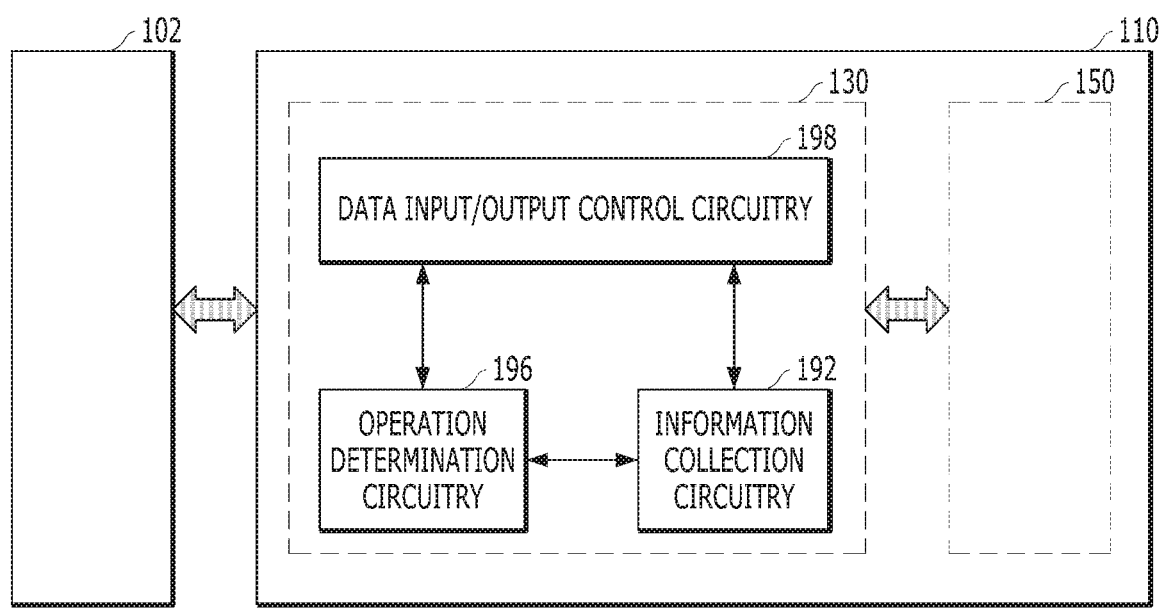
FIG. 1 illustrates an example a host and a memory system in a data processing system based on an embodiment of the disclosure.

This disclosure includes references to "one embodiment" or "an embodiment of the disclosure." The appearances of the phrases "in one embodiment" or "in an embodiment" do not necessarily refer to the same embodiment of the disclosure. Particular features, structures, or characteristics may be combined in any suitable manner consistent with this disclosure.

DETAILED DESCRIPTION

Various embodiments of the disclosure are described below in with reference to the accompanying drawings. Elements and features of the disclosure, however, may be configured or arranged differently to form other embodiments, which may be variations of any of the disclosed embodiments.

In this disclosure, the terms "comprise," "comprising," "include" and "including" are open-ended. As used in the appended claims, these terms specify the presence of the stated elements and do not preclude the presence or addition of one or more other elements. The terms in a claim does not foreclose the apparatus from including additional components (e.g., an interface unit, circuitry, etc.). Further, the term "and/or" includes any or all combinations of one or more of the associated listed items.

In this disclosure, various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

As used herein, these terms are used as labels for nouns that they precede, and do not imply any type of ordering (e.g., spatial, temporal, logical, etc.). The terms "first" and "second" do not necessarily imply that the first value must be written before the second value. Further, although the terms "first", "second", "third", and so on may be used herein to identify various elements, these elements are not limited by these terms. These terms are used to distinguish one element from another element that otherwise have the same or similar names. For example, a first circuitry may be distinguished from a second circuitry.

Further, this term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

As used in the disclosure, the term 'circuitry' refers to any and all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

An embodiment of the disclosure can provide a data processing system capable of minimizing complexity and performance degradation, and maximizing the usage efficiency of a memory device to rapidly and stably process data to the memory device, and an operating method thereof.

An embodiment of the disclosure can provide an apparatus or a method for operating a memory system and an external device which can be operatively engaged with the memory system. Specifically, the memory system can transfer map information to the external device. Herein, the map information can be referred as to map data, mapping data or mapping information which can be used for associating two different addresses with each other. Two different addresses may be a kind of means indicating a piece of data or a location where a piece of data is stored. For example, the external device such as a computing device or a host generally uses a logical address, while a nonvolatile memory system uses its own address such as a physical address. Accordingly, the apparatus can be configured to generate the map information for associating the logical address with the physical address. When the external device transfers a request with a logical address, the memory system may perform address translation for finding a physical address corresponding to the logical address, based on the map information.

When the external device may include the map information, the external device can transfer a request along with the logical address which the external device uses for indicating a piece of data and the physical address which the memory system independently uses but the external device does not use. Further, the apparatus can transfer the map information to the external device so that the external device uses the map information to send a request along with two addresses. In this case, the memory system may skip address translation so that an input/output (I/O) throughput may be improved.

An embodiment of the disclosure is linked to how the memory system transfers the map information to the external device or how the memory system utilizes a portion of memory included in the external device. By the way of example but not limitation, an embodiment of the disclosure may provide an apparatus or a method for determining which map information the memory system transfers to the external device. Another embodiment of the disclosure may provide an apparatus or a method for activating or inactivating an operation mode where the memory system or the external device transfers or receives the map information to or from each other. Another embodiment of the disclosure may provide an apparatus or a method for controlling or managing the map information transferred from the memory system and stored in the memory of the external device. Another embodiment of the disclosure may provide an apparatus or a method for determining when transferring map data or map information from the memory system to the external device, or vice versa. Another embodiment of the disclosure may provide an apparatus or a method for checking whether the received or transferred map information is valid and determining whether the external device or the memory system continue to use the received or transferred map information.

An embodiment of the disclosure can provide a data processing system and a method for operating the data processing system. The data processing system may include components and resources such as a memory system and a host and dynamically allocate data paths used for transferring data between the components based on usages of the components and the resources.

An embodiment of the disclosure can provide a method and an apparatus for improving or enhancing operations or performance of the memory system. While the memory system in the data process system transmits map information to the host or a computing device, the host or the computing device can transmit a request (or a command) including a specific item recognized from the map information. Due to the specific item delivered along with the request transmitted from the host to the memory system, the memory system can reduce a time spent on address translation for an operation corresponding to the request.

An embodiment of the disclosure can provide an apparatus included in a data processing system including a host or a computing device, which is configured to check map information used in the process of performing a request or a command transmitted from the host or the computing device, monitor a frequency of usage regarding the map information for determining whether to transmit the map information to the host or the computing device, and transmit determined map information to the host or the computing device during an idle state of the memory system.

An embodiment of the disclosure can provide a data processing system which includes a host and a memory system, capable of monitoring map segments to be uploaded to the host or a computing device, by using a map miss ratio, and reflecting the monitoring result at the time that map data is transmitted to the host, thereby efficiently managing the entire performance of the memory system.

An embodiment of the disclosure can provide an apparatus which transfers, to a host, internal data stored in a volatile memory of a memory system to which power is suspended when the memory system included in the data processing system is controlled to enter a sleep mode, and then receives internal data from the host and stores the internal data in the volatile memory of the memory system when exiting from the sleep mode, thereby improving the operational performance of the memory system.

An embodiment of the disclosure can provide a memory system, a memory controller and a meta-information storage device capable of processing a command received from a host as quickly as possible even when an SPO occurs.

An embodiment of the disclosure can provide a memory system, a memory controller and a meta-information storage device capable of allowing a host to quickly refer to necessary mapping information.

In an embodiment, a memory system can include a memory device configured to store a piece of data in a location which is distinguished by a physical address; and a controller configured to generate a piece of map data associating a logical address, inputted along with a request from an external device, with the physical address and to determine a timing of transferring the piece of map data into the external device to avoid decreasing an input/output throughput of the memory system.

By the way of example but not limitation, the controller can be configured to determine a map miss count based on whether the physical address associated with the logical address, which is inputted from the external device, is loaded in a cache memory, to calculate a map miss ratio based on a total read count and the map miss count and to determine the timing of transferring the piece of map data based on the map miss ratio.

The controller can be configured to select the piece of map data, which would be transferred, based on a read count corresponding to a map segment including the piece of map data.

The controller can be configured to synchronize the piece of map data stored in the memory device with the piece of map data which is previously transferred to the external device.

The controller can be configured to monitor whether the piece of map data stored in the memory device is updated after the piece of map data is transferred to the external device and to determine the timing of transferring the piece of map data based on a monitoring result.

The controller can be configured to use a flag for indicating whether the piece of map data is updated, and the flag is individually assigned for a map segment including plural pieces of map data.

The controller can be configured to receive a hibernation request inputted from the external device, to transfer the piece of map data to the external device before transferring a response corresponding to the hibernation request to the external device, and to transfer the response including whether an operation status of the memory system enters into a sleep mode to the external device.

The controller can be configured to select plural pieces of map data to be transferred, to send an inquiry to the external device when an amount of the plural pieces of map data is larger than a size of map data transferred one time to the external device, and to determine how many the controller transfers some of the plural pieces of map data to the external device based on a request corresponding to the inquiry.

The controller can be configured to perform a data input/output operation based on the request, wherein the data input/output operation is parallelly or independently performed by a multi-processor with the determining the timing of transferring the piece of map data to the external device.

The controller can be configured to monitor a usage frequency regarding the piece of map data, and to determine the timing of transferring the piece of map data to the external device based on the usage frequency.

In another embodiment, a controller can operate between plural devices, each device including an independent address scheme to indicate a location in which a piece of data is stored. The controller can be configured to perform an operation in response to a request inputted from one of the plural devices, to generate a piece of map data associating plural addresses used in the plural devices with each other, and to determine a timing of transferring the piece of map data into the one of the plural devices to avoid decreasing an input/output throughput of another device of the plural devices.

The timing of transferring the piece of map data can be determined based at least on a map miss count, an update or a usage frequency regarding the piece of map data.

The controller can be configured to determine the map miss count based on whether the physical address associated with the logical address, which is inputted from the one of the plural devices, is loaded in a cache memory from the another device of the plural devices, to calculate a map miss ratio based on a total read count and the map miss count and to determine the timing of transferring the piece of map data based on the map miss ratio.

The controller can be configured to monitor whether the piece of map data stored in the another device of the plural devices is updated after the piece of map data is transferred to the one of the plural devices and to determine the timing of transferring the piece of map data based on a monitoring result.

The controller can be configured to monitor a usage frequency regarding the piece of map data, and to determine the timing of transferring the piece of map data to the one of the plural devices based on the usage frequency.

The controller can be configured to synchronize the pieces of map data, which are stored in the plural devices individually, with each other.

The controller can be configured to receive a hibernation request inputted from the one of the plural devices, to transfer the piece of map data to the one of the plural devices before transferring a response corresponding to the hibernation request to the one of the plural devices, and to transfer the response including whether an operation status regarding the another device of the plural devices enters into a sleep mode to the one of the plural devices.

The controller can be configured to perform a data input/output operation to the another device of the plural devices based on the request inputted from the one of the plural devices, wherein the data input/output operation is parallelly or independently performed by a multi-processor with the determining the timing of transferring the piece of map data to the one of the plural devices.

In another embodiment, a method for operating a memory system, including a memory device configured to store a piece of data in a location which is distinguished by a physical address, can include generating a piece of map data associating a logical address, inputted along with a request from an external device, with the physical address; and determining a timing of transferring the piece of map data into the external device to avoid decreasing an input/output throughput of the memory system.

The method can further include monitoring at least one of a map miss count, an update or a usage frequency regarding the piece of map data. The timing of transferring the piece of map data can be determined based on a monitoring result.

In an embodiment, a piece of map data or map information may associate a logical address used in the external device or the host with a physical address used in the memory system. A map segment may be referred as to a group of plural pieces of map data or map information. For example, the map segment may be determined based on a size of transaction between the memory system and the external device (or the host). In another example, the map segment may be determined based on an internal configuration of the memory device included in the memory system, e.g., a size of page, a size of block or the like.

FIG. 1 shows an example of an apparatus for determining and transmitting map information in accordance with an embodiment of the disclosure.

Referring to FIG. 1, a host 102 and a memory system 110 may be communicatively coupled to each other. The host 102 may include a computing device and may be implemented in a form of a mobile device, a computer, a server, or others. The memory system 110 may receive a command from the host 102 and store or output data in response to the received command.

The memory system 110 may have a storage space including nonvolatile memory cells. For example, the memory system 110 may be implemented in a form of a flash memory, a solid-state drive (SSD), or others.

In order to store data requested by the host 102 in a storage space including the nonvolatile memory cells, the memory system 110 can perform a mapping operation for associating a file system used by the host 102 with a storage space including the nonvolatile memory cells. This can be referred as to an address translation between a logical address and a physical address. For example, an address identifying data in the file system used by the host 102 may be called a logical address or a logical block address, and the address indicating a physical location of data in the storage space including nonvolatile memory cells may be referred to as a physical address or a physical block address. When the host 102 sends a read command with a logical address to the memory system 110, the memory system 110 can search for a physical address corresponding to the logical address and then read and output data stored in the physical location indicated by the physical address. The mapping operation or the address translation may be performed during the search by the memory system 110 for the physical address corresponding to the logical address inputted from the host 102. The mapping operation or the address translation can be performed based on mapping information such as a mapping table which can associate a logical address with a physical address.

When a piece of data associated with a specific logical address is updated and programmed in a different location of the memory system 110, the map information associated with the specific logical address needs to be updated. When a certain update is made to map information, the updated map information is considered valid, while the previous map information before the update becomes invalid.

It is suggested to operate the host 102 to perform the mapping operation instead of the memory system 110. In this case, it is possible to reduce time taken by the memory system 110 to read and output data corresponding to a read command transmitted by the host 102. To perform the mapping operation, the host 102 may store and access at least some of map information and deliver, to the memory system 110, the read command with the physical address that is obtained through the mapping operation.

Referring to FIG. 1, the memory system 110 receiving a read request inputted from the host 102 may perform a first operation corresponding to the read request. The controller 130 in the memory system 110 may include data input/output (I/O) control circuitry 198 that reads data from the memory device 150 and outputs the data to the host 102 in response to the read request. When the host 102 performs address translation between the logical address and the physical address, the controller 130 may receive the read request along with a logical address as well as a physical address. If the physical address transmitted with the read command is valid, the controller 130 may perform a read operation by using the physical address to access a specific location in the memory device 150, without performing a separate address translation. On the other hand, when the physical address inputted with the read command is not valid, the controller 130 performs an address translation to obtain a physical address corresponding to an inputted logical address. Then, the controller 130 performs the read operation using the obtained physical address for accessing the specific location in the memory device 150 based on the physical address obtained through the address translation.

The controller 130 can perform a high-speed read operation or a general read operation depending on whether the host 102 performs address translation or not. When the host 102 stores valid map data and the host 102 performs address translation instead of the controller 130, since the memory system 110 does not need to perform the address translation, the high-speed read operation of the data input/output (I/O) control circuitry 198 in the controller 130 can be performed by the memory system 110. Thus, a data input/output speed (e.g., I/O throughput) of the memory system 110 can be improved. When the host 102 does not store the valid mapping information, the memory system 110 needs to perform the address translation and the general read operation of the data input/output control circuitry 198 can be performed by the memory system 110. Therefore, transmitting valid mapping information from the memory system to the host 102 can allow the host 102 to perform address translation based on the valid mapping information, which results in improving the data input/output speed (e.g., I/O throughput).

Based on the high-speed read operation and the general read operation performed by the data input/output (I/O) control circuitry 198, the information collection circuitry 192 may select or collect map information to be transmitted to the host 102. By the way of example but not limitation, the information collection circuitry 192 can check a usage frequency of the map information which is used for address translation, while or after the general read operation including the address translation is performed by the data input/output (I/O) control circuitry 198. For example, the information collection circuitry 192 can determine a usage count for the map information used for address translation during a preset period. Recognizing frequently used map information based on the usage count, the controller 130 can provide the frequently used map information to the host 102. According to an embodiment, the information collection circuitry 192 might not care the high-speed read operation because the host 102 has already stored the valid mapping information which is used for transferring a physical address along with a corresponding logical address to the memory system 110. When the host 102 has already stored in the valid mapping information, it might be unnecessary that the memory system 110 transfers the mapping information to the host 102.

After the information collection circuitry 192 determines which map information is to be transmitted to the host 102, an operation determination circuitry 196 can check an operational state of the controller 130 or the data input/output control circuitry 198 to determine a transmission timing regarding determined or selected map information. The map information can be transmitted into the host 102 at a time point that does not lower or degrade the data input/output speed (e.g., I/O throughput) of the memory system 110. For example, the controller 130 can transfer the map information while not outputting data or signal corresponding to any read request or any write request inputted from the host 102.

The operations of the information collection circuitry 192 and the operation determination circuitry 196 can be performed separately and independently from an operation of the data input/output (I/O) control circuitry 198. This allows to avoid the degradation of the data input/output speed (e.g., I/O throughput) of the memory system 110. For example, when an operation performed by the data input/output (I/O) control circuitry 198 in response to a command (for example, a read request or a write request) transmitted from the host 102 is interfered, interrupted or delayed, the data input/output speed (e.g., I/O throughput) of the memory system 110 may be degraded. To avoid degradation of the data input/output speed, the operations of the information collection circuitry 192 and the operation determination circuitry 196 may be performed as a background operation. The background operation may use less resources of the memory system 110 or the controller 130 than a general operation or a foreground operation which is performed in response to a request entered from the host 102. The information collection circuitry 192 and the operation determination circuitry 196 are configured not to interfere the operation performed by the data input/output control circuitry 198. In an embodiment, the information collection circuitry 192 and the operation determination circuitry 196 can use different resources. For example, the information collection circuitry 192 and the operation determination circuitry 196 use a core, while the data input/output control circuitry 198 uses another core. Accordingly, it is possible to prevent the operation performed by the data input/output control circuitry 198 from being interfered with or limited by the operations of the information collection circuitry 192 and the operation determination circuitry 196.

In an embodiment, the operations of the information collection circuitry 192 and the operation determination circuitry 196 may be performed in different ways from the operation of the data input/output control circuitry 198. The information collection circuitry 192 and the operation determination circuitry 196 can operate, for example, based on a time sharing scheme, a time slicing scheme, or a time division scheme or others, by utilizing an operational margin that ensures that the data input/output control unit 198 is not interfered with the information collection circuitry 192 and the operation determination circuitry 196. For example, operations of the information collection circuitry 192 and the operation determination circuitry 196 may be performed as a parallel operation or a background operation. In another embodiment, operations of the information collection circuitry 192 and the operation determination circuitry 196 may be followed by an operation of the data input/output control circuitry 198 or concurrently performed with the operation of the data input/output control circuitry 198. Based on various schemes, the information collection circuitry 192 and the determination circuitry 196 may select or determine map information whose usage frequency is high, and transmit the selected or determined map information to the host 102 after or between operations performed by the data input/output control circuitry 198.

In an embodiment, the memory system 110 transmitting at least some of the map information to the host 102 may generate a log or a history regarding the transmitted map information. The log or a history may have one of various formats, structures, marks, variables or types, and may be stored in a memory device or a storage area including nonvolatile memory cells. In an embodiment, whenever the memory system 110 transmits map information to the host 102, the transmitted map information may be recorded in the log or the history. In an embodiment, the memory system 110 may determine an amount of transmitted map information to be recorded in the log or the history based on a size of map information that can be transmitted to the host 102. For example, it may be assumed that a size of map information that the memory system 110 can transmit to the host 102 is 512 KB. Although the memory system 110 may transmit more than 512 KB of map information to the host 102 in a log or a history, the amount of transmitted map information recorded in the log or the history may be limited to 512 KB. The amount of map information that memory system 110 can send to host 102 at one time may be less than the amount of map information that host 102 can store in the memory. For example, the map information may be transmitted to the host 102 in a segment unit. The memory system 110 may transfer segments of the map information to the host 102 through multiple transmissions, and the segments of the map information may be transmitted to the host 102 continuously or intermittently.

In an embodiment, when the memory system 110 transmits more than 1 MB of map information to the host 102, the host 102 can delete old map information that has been previously transmitted from the memory system 110 and stored in a memory. The map information deleted can be decided based on time information when such map information was sent from the memory system 110 to the host 102. In an embodiment, the map information transmitted from the memory system 110 to the host 102 may include update information. Since a space allocated by the host 102 to store the map information transmitted from the memory system 110 includes volatile memory cells (an overwrite is supported), the host 102 can update map information based on the update information without an additional operation of erasing another map information.

The host 102 may add a physical address PBA into a command that is to be transmitted to the memory system 110 based on the map information. In the mapping operation, the host 102 can search for and find the physical address PBA in the map information stored in the memory, based on a logical address corresponding to a command to be transmitted to the memory system 110. When the physical address corresponding to the command exists and is found by the host 102, the host 102 may transmit the command with the logical address and the physical address to the memory system 110.

The memory system 110, which receives a command with a logical address and a physical address inputted from the host 102, may perform a command operation corresponding to the command. As described above, when the host 102 transfers a physical address corresponding to a read command, the memory system 110 can use the physical address to access and output data stored in a location indicated by the physical address. Thus, the memory system 110 can perform an operation in response to the read command by using the physical address received together with the read command from the host 102 without performing a separate address translation, the memory system 110 can reduce a time spent on the operation.

Figure 2:
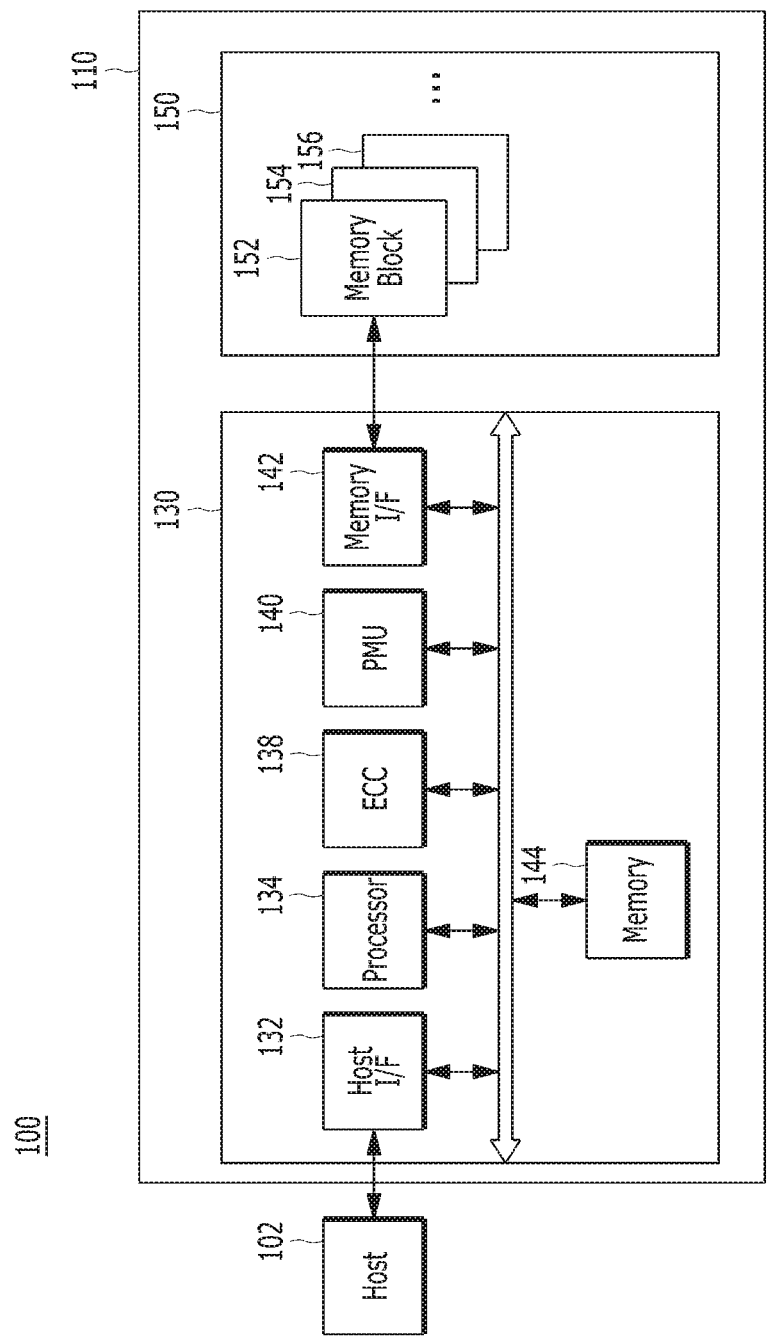
FIG. 2 shows an example of a data processing system including a memory system based on an embodiment of the disclosure.

Referring to FIG. 2, a data processing system 100 in accordance with an embodiment of the disclosure is described. Referring to FIG. 2, the data processing system 100 may include a host 102 engaged or interlocked with a memory system 110.

The host 102 may include, for example, a portable electronic device such as a mobile phone, an MP3 player, or a laptop computer, or a non-portable electronic device such as a desktop computer, a game player, a television (TV), a projector, or others.

The host 102 also includes at least one operating system (OS), which can generally manage and control functions and operations performed in the host 102. The OS can provide interoperability between the host 102 engaged with the memory system 110 and the user using the memory system 110. The OS may support functions and operations corresponding to user's requests. By the way of example but not limitation, the OS can be classified into a general operating system and a mobile operating system according to mobility of the host 102. The general operating system may be split into a personal operating system and an enterprise operating system according to system requirements or a user's environment. But the enterprise operating systems can be specialized for securing and supporting high performance. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110.

The controller 130 in the memory system 110 may control the memory device 150 in response to a request or a command inputted from the host 102. For example, the controller 130 may perform a read operation to provide data read from the memory device 150 for the host 102, and perform a write operation (or a program operation) to store data inputted from the host 102 in the memory device 150. In order to perform data input/output (I/O) operations, the controller 130 may control and manage various operations to read, program, erase, or others.

In an embodiment, the controller 130 can include a host interface 132, a processor 134, an error correction circuitry 138, a power management unit (PMU) 140, a memory interface 142, and a memory 144. Components included in the controller 130 described in FIG. 2 can be varied based on implementation forms, operation performances, or others. For example, the memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, or others. Components in the controller 130 may be added or omitted depending on implementation of the memory system 110.

The host 102 and the memory system 110 may include a controller or an interface for transmitting and receiving a signal, data, and others, under a predetermined protocol. For example, the host interface 132 in the memory system 110 may include an apparatus capable of transmitting a signal, data, and others to the host 102 or receiving a signal, data, and others inputted from the host 102.

The host interface 132 included in the controller 130 may receive a signal, a command (or a request), or data inputted from the host 102. The host 102 and the memory system 110 may use a predetermined protocol to transmit and receive data between the host 102 and the memory system 110. An example of protocols or interfaces, supported by the host 102 and the memory system 110 for sending and receiving a piece of data, can include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIE), Serial-attached SCSI (SAS), Serial Advanced Technology Attachment (SATA), Mobile Industry Processor Interface (MIPI), or others. In an embodiment, the host interface 132 may exchange data with the host 102 and is implemented with, or driven by, firmware called a host interface layer (HIL).

The Integrated Drive Electronics (IDE) or Advanced Technology Attachment (ATA), used as one of the interfaces for transmitting and receiving data, can use a cable including 40 wires connected in parallel to support data transmission and reception between the host 102 and the memory system 110. When a plurality of memory systems 110 are connected to a single host 102, the plurality of memory systems 110 may be divided into a master or a slave by using a position or a dip switch to which the plurality of memory systems 110 are connected. The memory system 110 set as the master may be used as the main memory device. The IDE (ATA) has evolved into Fast-ATA, ATAPI, and Enhanced IDE (EIDE).

Serial Advanced Technology Attachment (SATA) is a serial data communication interface that is compatible with various ATA standards of parallel data communication interfaces which is used by Integrated Drive Electronics (IDE) devices. The forty wires in the IDE interface can be reduced to six wires in the SATA interface. For example, 40 parallel signals for the IDE can be converted into 6 serial signals for the SATA to be transmitted between each other. The SATA has been widely used because of its faster data transmission and reception rate and its less resource consumption in the host 102 used for data transmission and reception. The SATA may support connection with up to 30 external devices to a single transceiver included in the host 102. In addition, the SATA can support hot plugging that allows an external device to be attached or detached from the host 102 even while data communication between the host 102 and another device is being executed. Thus, the memory system 110 can be connected or disconnected as an additional device, like a device supported by a universal serial bus (USB) even when the host 102 is powered on. For example, in the host 102 having an eSATA port, the memory system 110 may be freely detached like an external hard disk.

The Small Computer System Interface (SCSI) is a serial data communication interface used for connection between a computer, a server, and/or another peripheral device. The SCSI can provide a high transmission speed, as compared with other interfaces such as the IDE and the SATA. In the SCSI, the host 102 and at least one peripheral device (e.g., the memory system 110) are connected in series, but data transmission and reception between the host 102 and each peripheral device may be performed through a parallel data communication. In the SCSI, it is easy to connect to, or disconnect from, the host 102 a device such as the memory system 110. The SCSI can support connections of 15 other devices to a single transceiver included in host 102.

The Serial Attached SCSI (SAS) can be understood as a serial data communication version of the SCSI. In the SAS, not only the host 102 and a plurality of peripheral devices are connected in series, but also data transmission and reception between the host 102 and each peripheral device may be performed in a serial data communication scheme. The SAS can support connection between the host 102 and the peripheral device through a serial cable instead of a parallel cable, so as to easily manage equipment using the SAS and enhance or improve operational reliability and communication performance. The SAS may support connections of eight external devices to a single transceiver included in the host 102.

The Non-volatile memory express (NVMe) is a kind of interface based at least on a Peripheral Component Interconnect Express (PCIe) designed to increase performance and design flexibility of the host 102, servers, computing devices, and the like equipped with the non-volatile memory system 110. Here, the PCIe can use a slot or a specific cable for connecting the host 102, such as a computing device, and the memory system 110, such as a peripheral device. For example, the PCIe can use a plurality of pins (for example, 18 pins, 32 pins, 49 pins, 82 pins, etc.) and at least one wire (e.g. x1, x4, x8, x16, etc.), to achieve high speed data communication over several hundred MB per second (e.g. 250 MB/s, 500 MB/s, 984.6250 MB/s, 1969 MB/s, and etc.). According to an embodiment, the PCIe scheme may achieve bandwidths of tens to hundreds of Giga bits per second. A system using the NVMe can make the most of an operation speed of the nonvolatile memory system 110, such as an SSD, which operates at a higher speed than a hard disk.

In an embodiment, the host 102 and the memory system 110 may be connected through a universal serial bus (USB). The Universal Serial Bus (USB) is a kind of scalable, hot-pluggable plug-and-play serial interface that can provide cost-effective standard connectivity between the host 102 and a peripheral device such as a keyboard, a mouse, a joystick, a printer, a scanner, a storage device, a modem, a video camera, or others. A plurality of peripheral devices such as the memory system 110 may be coupled to a single transceiver included in the host 102.

Referring to FIG. 2, the error correction circuitry 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit of the read data. When the number of the error bits is greater than or equal to a threshold number of correctable error bits, the ECC component 138 might not correct error bits but instead may output an error correction fail signal indicating failure in correcting the error bits.

In an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The error correction circuitry 138 may include and all circuits, modules, systems or devices for performing the error correction operation based on at least one of the above described codes.

The power management unit (PMU) 140 may control electrical power provided in the controller 130. The PMU 140 may monitor the electrical power supplied to the memory system 110 (e.g., a voltage supplied to the controller 130) and provide the electrical power to components included in the controller 130. The PMU 140 can not only detect power-on or power-off, but also generate a trigger signal to enable the memory system 110 to back up a current state urgently when the electrical power supplied to the memory system 110 is unstable. In an embodiment, the PMU 140 may include a device or a component capable of accumulating electrical power that may be used in an emergency.

The memory interface 142 may serve as an interface for handling commands and data transferred between the controller 130 and the memory device 150, to allow the controller 130 to control the memory device 150 in response to a command or a request inputted from the host 102. The memory interface 142 may generate a control signal for the memory device 150 and may process data inputted to, or outputted from, the memory device 150 under the control of the processor 134 in a case when the memory device 150 is a flash memory. For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) as a component for exchanging data with the memory device 150.

According to an embodiment, the memory interface 142 may support an open NAND flash interface (ONFi), a toggle mode or the like for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), and a toggle double data rate (DDR).

The memory 144 may be a sort of working memory in the memory system 110 or the controller 130, while storing temporary or transactional data occurred or delivered for operations in the memory system 110 and the controller 130. For example, the memory 144 may temporarily store a piece of read data outputted from the memory device 150 in response to a request from the host 102, before the piece of read data is outputted to the host 102. In addition, the controller 130 may temporarily store a piece of write data inputted from the host 102 in the memory 144, before programming the piece of write data in the memory device 150. When the controller 130 controls operations such as data read, data write, data program, data erase or etc. of the memory device 150, a piece of data transmitted or generated between the controller 130 and the memory device 150 of the memory system 110 may be stored in the memory 144. In addition to the piece of read data or write data, the memory 144 may store information (e.g., map data, read requests, program requests, etc.) necessary for performing operations for inputting or outputting a piece of data between the host 102 and the memory device 150. According to an embodiment, the memory 144 may include a command queue, a program memory, a data memory, a write buffer/cache, a read buffer/cache, a data buffer/cache, a map buffer/cache, and the like.

In an embodiment, the memory 144 may be implemented with a volatile memory. For example, the memory 144 may be implemented with a static random access memory (SRAM), a dynamic random access memory (DRAM), or both. Although FIG. 2 illustrates, for example, the memory 144 disposed within the controller 130, the embodiment is not limited thereto. The memory 144 may be located within or external to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150, in response to a write request or a read request entered from the host 102. According to an embodiment, the processor 134 may execute firmware to control the program operation or the read operation in the memory system 110. Herein, the firmware may be referred to as a flash translation layer (FTL). An example of the FTL is later described in detail, referring to FIG. 3. In an embodiment, the processor 134 may be implemented with a microprocessor or a central processing unit (CPU).

Further, in an embodiment, the memory system 110 may be implemented with at least one multi-core processor. The multi-core processor is, for example, a circuit or chip in which two or more cores, which are considered distinct processing regions, are integrated. For example, when a plurality of cores in the multi-core processor drive or execute a plurality of flash translation layers (FTLs) independently, data input/output speed (or performance) of the memory system 110 may be improved. According to an embodiment, the data input/output (I/O) control circuitry 198 and the information collection circuitry 192 described in FIG. 1 may be independently performed through different cores in the multi-core processor.

The processor 134 in the controller 130 may perform an operation corresponding to a request or a command inputted from the host 102. Further, the memory system 110 may be independent of a command or a request inputted from an external device such as the host 102. Typically, an operation performed by the controller 130 in response to the request or the command inputted from the host 102 may be considered a foreground operation, while an operation performed by the controller 130 independently (e.g., regardless of the request or the command inputted from the host 102) may be considered a background operation. The controller 130 can perform the foreground or background operation for read, write or program, erase and others regarding data in the memory device 150. In addition, a parameter set operation corresponding to a set parameter command or a set feature command as a set command transmitted from the host 102 may be considered a foreground operation. As a background operation without a command transmitted from the host 102, the controller 130 can perform garbage collection (GC), wear leveling (WL), bad block management for identifying and processing bad blocks, or others may be performed, in relation to a plurality of memory blocks 152, 154, 156 included in the memory device 150.

In an embodiment, substantially similar operations may be performed as both the foreground operation and the background operation. For example, if the memory system 110 performs garbage collection in response to a request or a command inputted from the host 102 (e.g., Manual GC), garbage collection can be considered a foreground operation. However, when the memory system 110 may perform garbage collection independently of the host 102 (e.g., Auto GC), garbage collection can be considered a background operation.

When the memory device 150 includes a plurality of dies (or a plurality of chips) including non-volatile memory cells, the controller 130 may be configured to perform a parallel processing regarding plural requests or commands inputted from the host 102 in to improve performance of the memory system 110. For example, the transmitted requests or commands may be divided into and processed simultaneously in a plurality of dies or a plurality of chips in the memory device 150. The memory interface 142 in the controller 130 may be connected to a plurality of dies or chips in the memory device 150 through at least one channel and at least one way. When the controller 130 distributes and stores pieces of data in the plurality of dies through each channel or each way in response to requests or commands associated with a plurality of pages including nonvolatile memory cells, plural operations corresponding to the requests or the commands can be performed simultaneously or in parallel. Such a processing method or scheme can be considered as an interleaving method. Because data input/output speed of the memory system 110 operating with the interleaving method may be faster than that without the interleaving method, data I/O performance of the memory system 110 can be improved.

By the way of example but not limitation, the controller 130 can recognize statuses regarding a plurality of channels (or ways) associated with a plurality of memory dies included in the memory device 150. The controller 130 may determine the state of each channel or each way as one of a busy state, a ready state, an active state, an idle state, a normal state and/or an abnormal state. The controller's determination of which channel or way an instruction (and/or a data) is delivered through can be associated with a physical block address, e.g., which die(s) the instruction (and/or the data) is delivered into. The controller 130 can refer to descriptors delivered from the memory device 150. The descriptors can include a block or page of parameters that describe something about the memory device 150, which is data with a predetermined format or structure. For instance, the descriptors may include device descriptors, configuration descriptors, unit descriptors, and others. The controller 130 can refer to, or use, the descriptors to determine which channel(s) or way(s) an instruction or a data is exchanged via.

Referring to FIG. 2, the memory device 150 in the memory system 110 may include the plurality of memory blocks 152, 154, 156. Each of the plurality of memory blocks 152, 154, 156 includes a plurality of nonvolatile memory cells. According to an embodiment, the memory block 152, 154, 156 can be a group of nonvolatile memory cells erased together. The memory block 152, 154, 156 may include a plurality of pages which is a group of nonvolatile memory cells read or programmed together. Although not shown in FIG. 2, each memory block 152, 154, 156 may have a three-dimensional stack structure for a high integration. Further, the memory device 150 may include a plurality of dies, each die including a plurality of planes, each plane including the plurality of memory blocks 152, 154, 156. Configuration of the memory device 150 can be different for performance of the memory system 110.

In the memory device 150 shown in FIG. 2, the plurality of memory blocks 152, 154, 156 are included. The plurality of memory blocks 152, 154, 156 can be any of different types of memory blocks such as a single level cell (SLC) memory block, a multi-level cell (MLC) Cell) memory block or others, according to the number of bits that can be stored or represented in one memory cell. In an embodiment, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have larger storage capacity for the same space compared to the SLC memory block. The MLC memory block can be highly integrated in a view of storage capacity. In an embodiment, the memory device 150 may be implemented with MLC memory blocks such as a double level cell (DLC) memory block, a triple level cell (TLC) memory block, a quadruple level cell (QLC) memory block and a combination thereof. The double level cell (DLC) memory block may include a plurality of pages implemented by memory cells, each capable of storing 2-bit data. The triple level cell (TLC) memory block can include a plurality of pages implemented by memory cells, each capable of storing 3-bit data. The quadruple level cell (QLC) memory block can include a plurality of pages implemented by memory cells, each capable of storing 4-bit data. In another embodiment, the memory device 150 can be implemented with a block including a plurality of pages implemented by memory cells, each capable of storing 5-bit or more bit data.

In an embodiment, the controller 130 may use a multi-level cell (MLC) memory block included in the memory system 150 as a SLC memory block that stores one-bit data in one memory cell. A data input/output speed of the multi-level cell (MLC) memory block can be slower than that of the SLC memory block. When the MLC memory block is used as the SLC memory block, a margin for a read or program operation can be reduced. The controller 130 can utilize a faster data input/output speed of the multi-level cell (MLC) memory block when using the multi-level cell (MLC) memory block as the SLC memory block. For example, the controller 130 can use the MLC memory block as a buffer to temporarily store a piece of data, because the buffer may require a high data input/output speed for improving performance of the memory system 110.

In an embodiment, the controller 130 may program pieces of data in a multi-level cell (MLC) a plurality of times without performing an erase operation on a specific MLC memory block included in the memory system 150. In general, nonvolatile memory cells have a feature that does not support data overwrite. The controller 130 may use a feature in which a multi-level cell (MLC) may store multi-bit data, in order to program plural pieces of 1-bit data in the MLC a plurality of times. For the MLC overwrite operation, the controller 130 may store the number of program times as separate operation information when a piece of 1-bit data is programmed in a nonvolatile memory cell. In an embodiment, an operation for uniformly levelling threshold voltages of nonvolatile memory cells can be carried out before another piece of data is overwritten in the same nonvolatile memory cells.

In an embodiment of the disclosure, the memory device 150 is embodied as a nonvolatile memory such as a flash memory such as a NAND flash memory, a NOR flash memory or others. Alternatively, the memory device 150 may be implemented by at least one of a phase change random access memory (PCRAM), a ferroelectrics random access memory (FRAM), a spin injection magnetic memory (STT-RAM), a spin transfer torque magnetic random access memory (STT-MRAM), or others.

Figure 3:
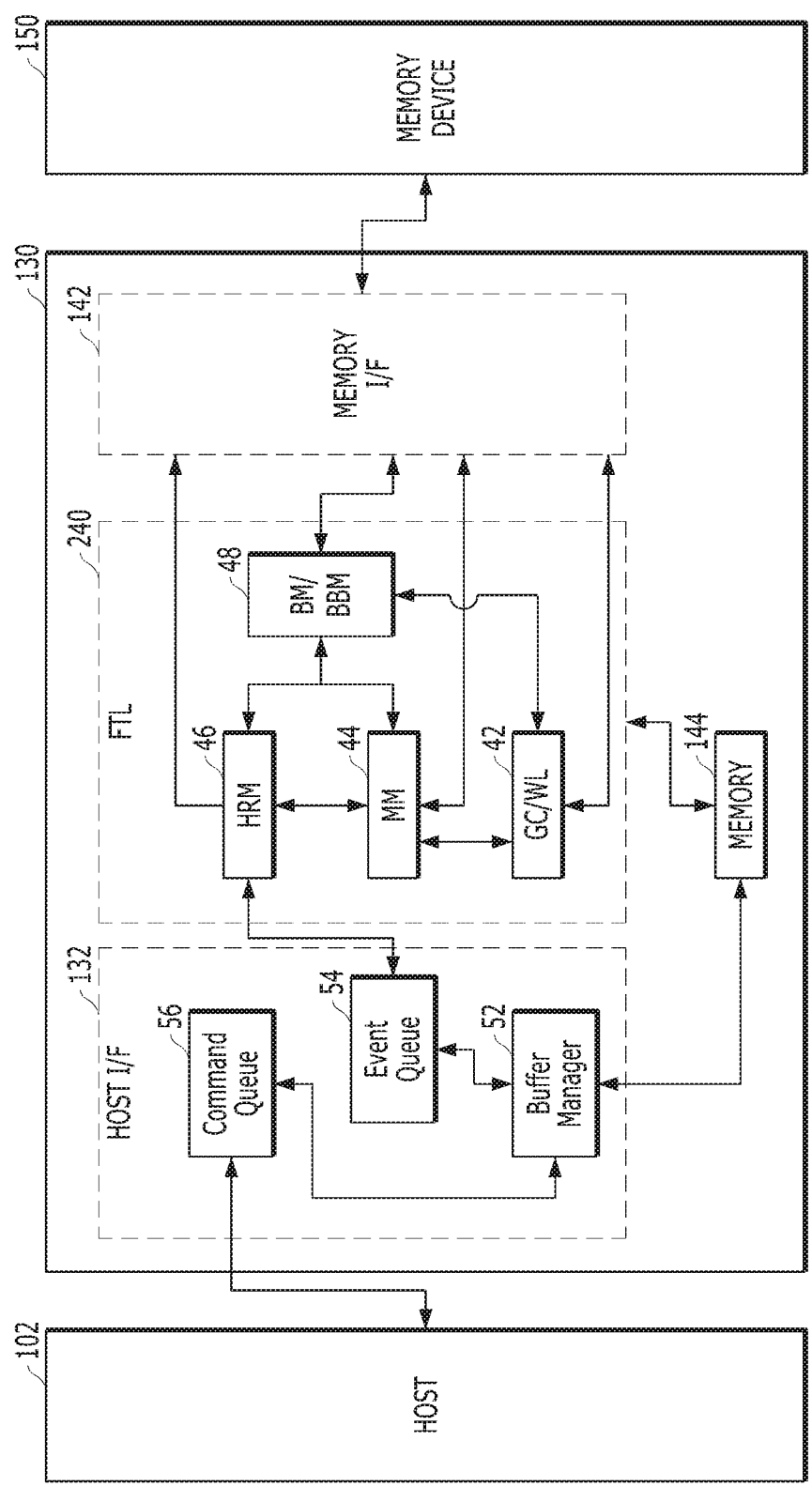
FIG. 3 illustrates an example of a memory system in accordance with an embodiment of the disclosure.

Referring to FIG. 3, a controller in a memory system in accordance with another embodiment of the disclosure is described. The controller 130 cooperates with the host 102 and the memory device 150. As illustrated, the controller 130 includes a host interface 132, a flash translation layer (FTL) 240, as well as the host interface 132, the memory interface 142 and the memory 144. The controller 130 can be one previously described in connection with FIG. 2.

Although not shown in FIG. 3, in accordance with an embodiment, the ECC unit 138 described in FIG. 2 may be included in the flash translation layer (FTL) 240. In another embodiment, the ECC unit 138 may be implemented as a separate module, a circuit, firmware or others, which is included in, or associated with, the controller 130.

The host interface 132 is for handling commands, data, and others transmitted from the host 102. By way of example but not limitation, the host interface 132 may include a command queue 56, a buffer manager 52 and an event queue 54. The command queue 56 may sequentially store commands, data, and others received from the host 102 and output them to the buffer manager 52 in an order in which they are stored. The buffer manager 52 may classify, manage or adjust the commands, the data, and the like, which are received from the command queue 56. The event queue 54 may sequentially transmit events for processing the commands, the data, and the like received from the buffer manager 52.

A plurality of commands or data of the same characteristic, e.g., read or write commands, may be transmitted from the host 102, or commands and data of different characteristics may be transmitted to the memory system 110 after being mixed or jumbled by the host 102. For example, a plurality of commands for reading data (read commands) may be delivered, or commands for reading data (read command) and programming/writing data (write command) may be alternately transmitted to the memory system 110. The host interface 132 may store commands, data, and others, which are transmitted from the host 102, to the command queue 56 sequentially. Thereafter, the host interface 132 may estimate or predict what kind of internal operation the controller 130 will perform based on the characteristics of commands, data, and others, which have been entered from the host 102. The host interface 132 can determine a processing order and a priority of commands, data and others, based at least on their characteristics. Based on characteristics of commands, data, and the like transmitted from the host 102, the buffer manager 52 in the host interface 132 is configured to determine whether the buffer manager needs to store commands, data, and others in the memory 144, or whether the buffer manager needs to deliver the commands, the data, and others to the flash translation layer (FTL) 240. The event queue 54 receives events, entered from the buffer manager 52, which are to be internally executed and processed by the memory system 110 or the controller 130 in response to the commands, the data, and others transmitted from the host 102, so as to deliver the events to the flash translation layer (FTL) 240 in the order received.

Figure 6:
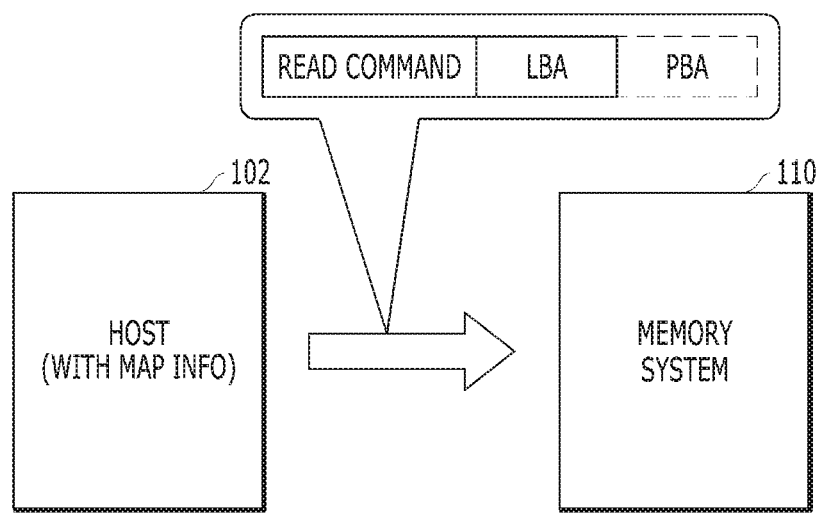
FIG. 6 illustrates an example of a transaction between a host and a memory system in a data processing system based on an embodiment of the disclosure.
Figure 9:
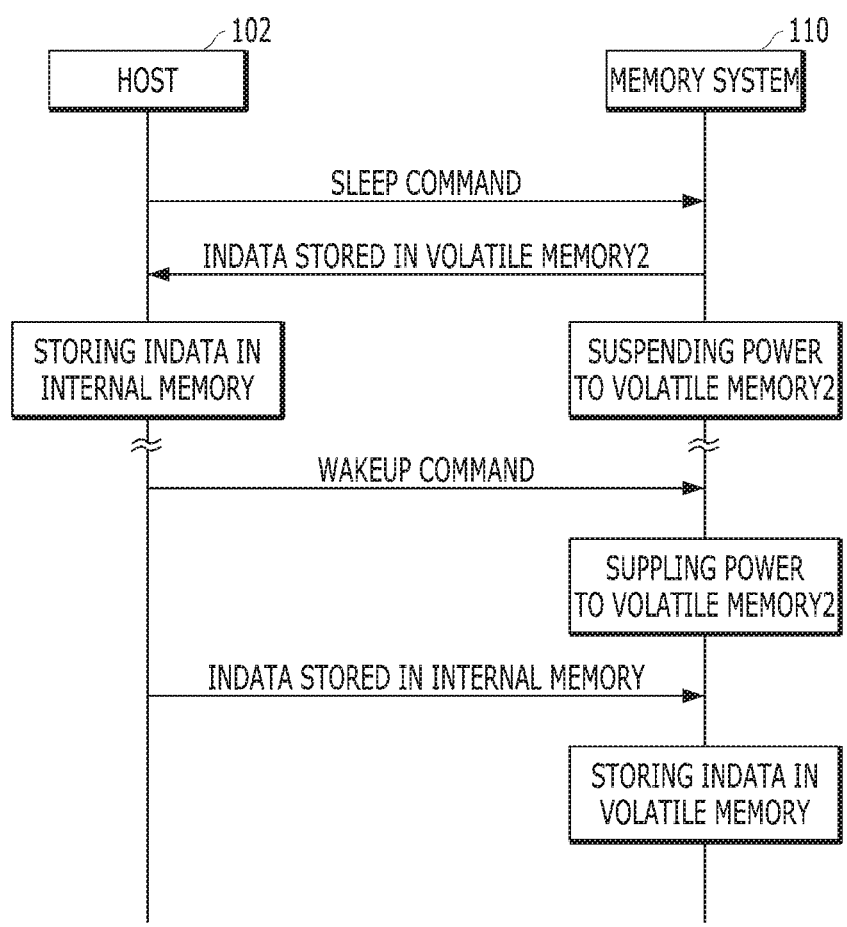
FIG. 9 illustrates sleep mode entry and exit operations in a data processing system in accordance with an embodiment of the disclosure.

In accordance with an embodiment, the flash translation layer (FTL) 240 described in FIG. 3 may perform some functions of the data input/output (I/O) control circuitry 198 and the information collection circuitry 192 described in FIG. 1. Further, the host interface 132 may set a host memory 106 in the host 102, which is shown in FIG. 6 or 9, as a slave and add the host memory 106 as an additional storage space which is controllable or usable by the controller 130.

In accordance with an embodiment, the flash translation layer (FTL) 240 can include a host request manager (HRM) 46, a map manager (MM) 44, a state manager 42 and a block manager 48. The host request manager (HRM) 46 can manage the events entered from the event queue 54. The map manager (MM) 44 can handle or control a map data. The state manager 42 can perform garbage collection (GC) or wear leveling (WL). The garbage collection may refer to a form of memory management, in which a garbage collector attempts to reclaim (garbage) memory that is occupied by objects that are no longer in use. The wear leveling indicates techniques for prolonging lifetime of erasable storage devices. The block manager 48 can execute commands or instructions onto a block in the memory device 150.

By way of example but not limitation, the host request manager (HRM) 46 can use the map manager (MM) 44 and the block manager 48 to handle or process requests based on the read and program commands, and events which are delivered from the host interface 132. The host request manager (HRM) 46 can send an inquiry request to the map data manager (MM) 44, to determine a physical address corresponding to the logical address which is entered with the events. The host request manager (HRM) 46 can send a read request with the physical address to the memory interface 142, to process the read request (handle the events). The host request manager (HRM) 46 can send a program request (write request) to the block manager 48, to program data to a specific empty page (no data) in the memory device 150, and then, can transmit a map update request corresponding to the program request to the map manager (MM) 44, to update an item relevant to the programmed data in information of mapping the logical-physical addresses to each other.

In an embodiment, the block manager 48 can convert a program request delivered from the host request manager (HRM) 46, the map data manager (MM) 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

In an embodiment, the block manager 48 can be configured to manage blocks in the memory device 150 based on the number of valid pages, select and erase blocks having no valid pages when a free block is needed, and select a block including the least number of valid pages when it is determined that garbage collection is necessary. The state manager 42 can perform garbage collection to move the valid data to an empty block and erase the blocks containing the moved valid data so that the block manager 48 may have enough free blocks (empty blocks with no data). If the block manager 48 provides information regarding a block to be erased to the state manager 42, the state manager 42 could check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, and others, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

When garbage collection is performed, the state manager 42 copies valid page(s) into a free block, and the host request manager (HRM) 46 can program the latest version of the data for the same logical address of the page and currently issue an update request. When the status manager 42 requests the map update in a state in which copying of valid page(s) is not completed normally, the map manager 44 might not perform the mapping table update. It is because the map request is issued with old physical information if the status manger 42 requests a map update and a valid page copy is completed later. The map manager 44 may perform a map update operation only if the latest map table still points to the old physical address in order to ensure accuracy.

Figure 4:
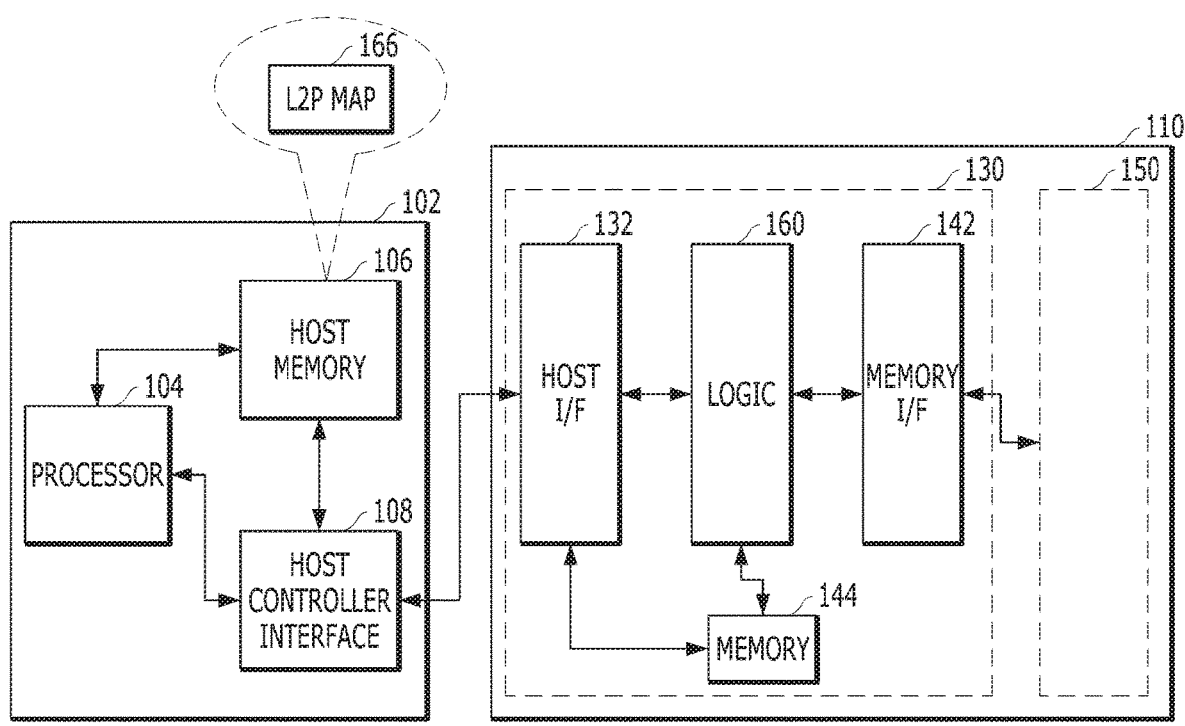
FIG. 4 shows examples of configurations of a host and a memory system in a data processing system based on an embodiment of the disclosure.
Figure 5:
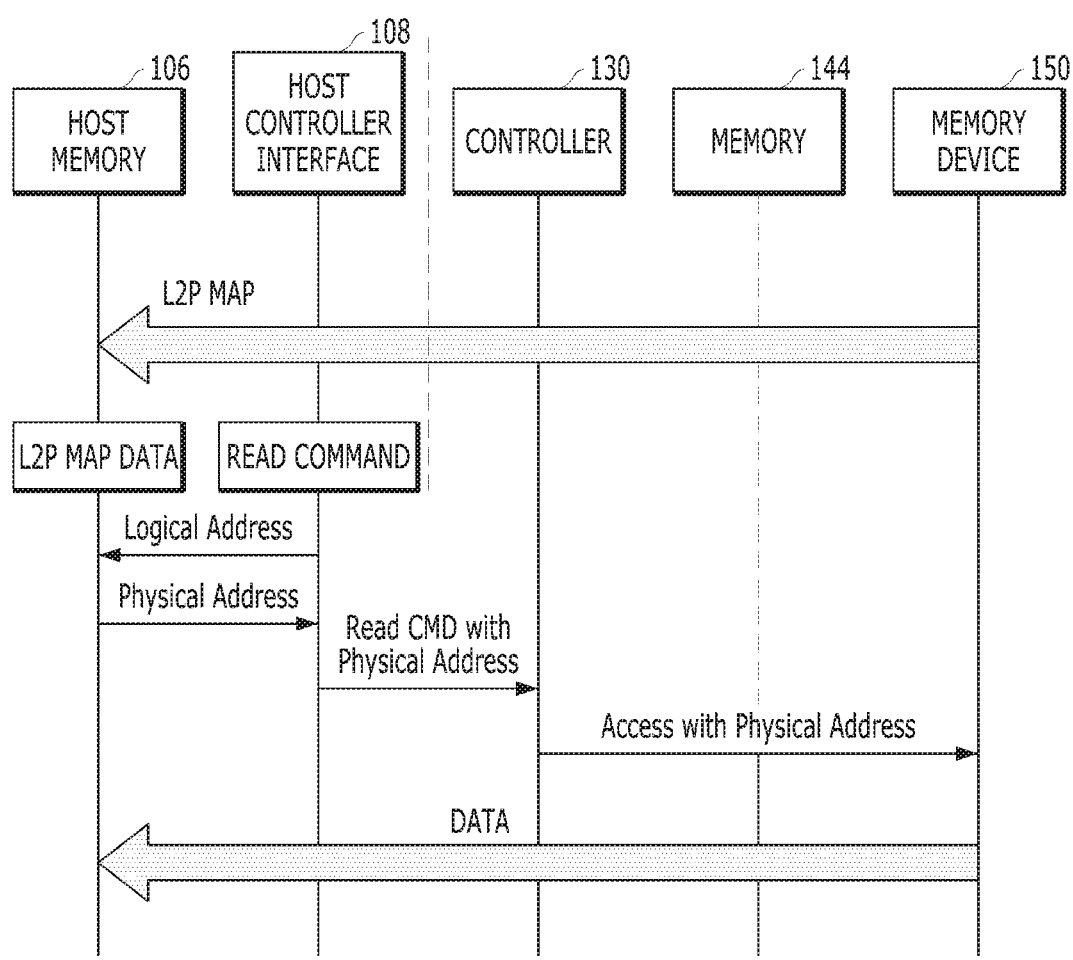
FIG. 5 illustrates a read operation performed in a host and a memory system in a data processing system based on an embodiment of the disclosure.

FIGS. 4 and 5 illustrate a case where a part of a memory included in a host can be used as a cache device for storing metadata used in the memory system.

Referring to FIG. 4, the host 102 may include a processor 104, a host memory 106, and a host controller interface 108. The memory system 110 may include a controller 130 and a memory device 150. Herein, the controller 130 and the memory device 150 described in FIG. 4 may correspond to the controller 130 and the memory device 150 described in FIGS. 1 to 3.

Hereinafter, a difference between the controller 130 and the memory device 150 shown in FIG. 4 and the controller 130 and the memory device 150 shown in FIGS. 1 to 3, which can technically be distinguished, is mainly described. For example, a logic block 160 in the controller 130 may correspond to the flash translation layer (FTL) 240 described in FIG. 3. In an embodiment, the logic block 160 in the controller 130 may work as an additional role and perform an additional function not described in the flash translation layer (FTL) 240 shown in FIG. 3.

The host 102 may include the processor 104, which has a higher performance than that of the memory system 110, and the host memory 106 which is capable of storing a larger amount of data than that of the memory system 110 that cooperates with the host 102. The processor 104 and the host memory 106 in the host 102 can have an advantage in terms of space and upgrade. For example, the processor 104 and the host memory 106 can have less space limitation than the processor 134 and the memory 144 in the memory system 110. The processor 104 and the host memory 106 can be upgraded to improve their performance, which is distinguishable from the processor 134 and the memory 144 in the memory system 110. In the embodiment, the memory system 110 can utilize the resources possessed by the host 102 in order to increase the operation efficiency of the memory system 110.

As an amount of data which can be stored in the memory system 110 increases, an amount of metadata corresponding to the data stored in the memory system 110 also increases. When storage capability used to load the metadata in the memory 144 of the controller 130 is limited or restricted, the increase in an amount of loaded metadata may cause an operational burden on operations of the controller 130. For example, because of limitation of space or region allocated for metadata in the memory 144 of the controller 130, only a part of the metadata may be loaded. If loaded metadata does not include a specific metadata for a physical location to which the host 102 is intended to access, the controller 130 needs to store, in the memory device 150, the loaded metadata some of which has been updated and the controller 130 also needs to load the specific metadata for the physical location to which the host 102 is intended to access. These operations are necessary for the controller 130 to perform a read operation or a write operation required by the host 102, which can cause the degradation on performance of the memory system 110.

Storage capability of the host memory 106 included in the host 102 may be greater tens or hundreds of times than that of the memory 144 included in the controller 130. The memory system 110 may transfer a metadata 166 used by the controller 130 to the host memory 106 in the host 102 so that at least some part of the host memory 106 in the host 102 may be accessed by the memory system 110. The at least some part of the host memory 106 can be used as a cache memory for address translation required for reading or writing data in the memory system 110. In this case, the host 102 translates a logical address into a physical address based on the metadata 166 stored in the host memory 106 before transmitting the logical address along with a request, a command or an instruction to the memory system 110. Then, the host 102 can transmit the translated physical address with the request, the command or the instruction to the memory system 110. The memory system 110, which receives the translated physical address with the request, the command or the instruction, may skip an internal process of translating the logical address into the physical address and access the memory device 150 based on the physical address transferred. In this case, an overhead (e.g., operational burden) that the controller 130 loads metadata from the memory device 150 for the address translation can be significantly reduced or gone, and operational efficiency of the memory system 110 can be enhanced.

Even if the memory system 110 transmits the metadata 166 to the host 102, the memory system 110 can control or manage information related to the metadata 166 such as generation, erase, and update of metadata. The controller 130 in the memory system 110 may perform a background operation such as garbage collection and wear leveling based on an operation state of the memory device 150 and can determine a physical address, i.e., the physical location in which the memory device 150 for data transferred from the host 102 is stored. Because a physical address of data stored in the memory device 150 can be changed and the host 102 does not know the changed physical address, the memory system 110 is configured to control or manage the information related to metadata 166.

While the memory system 110 controls or manage metadata used for the address translation, the memory system 110 can determined whether it is necessary to modify or update the metadata 166 previously transmitted to the host 102. If the memory system 110 determines that it is necessary to modify or update the metadata 166 previously transmitted to the host 102, the memory system 110 can send a signal or a metadata to the host 102 so as to request the update of the metadata 166 stored in the host 102. The host 102 may update the stored metadata 166 in the host memory 106 in response to a request delivered from the memory system 110. This allows the metadata 166 stored in the host memory 106 in the host 102 to be kept as the latest version such that, and the operation can proceed without errors even though the host controller interface 108 uses the metadata 166 stored in the host memory 106, to translate a logical address into a physical address to be transmitted along with the logical address to the memory system 110.

The metadata 166 stored in the host memory 106 may include mapping information used for translating a logical address into a physical address. Referring to FIG. 4, metadata associating a logical address with a physical address may include two items: a first mapping information used for translating a logical address into a physical address; and a second mapping information used for translating a physical address into a logical address. Among them, the metadata 166 stored in the host memory 106 may include the first mapping information. The second mapping information can be primarily used for internal operations of the memory system 110, but might not be used for operations requested by the host 102 to store data in the memory system 110 or read data corresponding to a particular logical address from the memory system 110. Depending on an embodiment, the second mapping information may be not transmitted by the memory system 110 to the host 102.

The controller 130 in the memory system 110 can control (e.g., create, delete, update, etc.) the first mapping information or the second mapping information, and store either the first mapping information or the second mapping information in the memory device 150. Because the host memory 106 in the host 102 is a volatile memory, the metadata 166 stored in the host memory 106 may disappear when an event such as interruption of power supply to the host 102 and the memory system 110 occurs. Accordingly, the controller 130 in the memory system 110 keep the latest state of the metadata 166 stored in the host memory 106 of the host 102, and also store the first mapping information or the second mapping information in the memory device 150. The first mapping information or the second mapping information stored in the memory device 150 can be the most recent one.

Referring to FIGS. 4 and 5, an operation requested by the host 102 to read data stored in the memory system 110 is described when the metadata 166 is stored in the host memory 106 of the host 102.

Power is supplied to the host 102 and the memory system 110, and then the host 102 and the memory system 110 can be engaged with each other. When the host 102 and the memory system 110 cooperate, the metadata (L2P MAP) stored in the memory device 150 can be transferred to the host memory 106.

When a read command (Read CMD) is issued by the processor 104 in the host 102, the read command is transmitted to the host controller interface 108. After receiving the read command, the host controller interface 108 searches for a physical address corresponding to a logical address corresponding to the read command in the metadata (L2P MAP) stored in the host memory 106. Based on the metadata (L2P MAP) stored in the host memory 106, the host controller interface 108 can recognize the physical address corresponding to the logical address. The host controller interface 108 carries out an address translation for the logical address associated with the read command.

The host controller interface 108 transfers the read command (Read CMD) with the logical address as well as the physical address to the controller 130 of the memory system 110. The controller 130 can access the memory device 150 based on the physical address transferred with the read command. Data stored at a location corresponding to the physical address in the memory device 150 can be transferred to the host memory 106 in response to the read command (Read CMD).

An operation of reading data stored in the memory device 150 including a nonvolatile memory may take more time than an operation of reading data stored in the host memory 106 which is a volatile memory. In the above-described read operation performed in response to the read command (Read CMD), since the controller 130 receives the physical address with the read command (Read CMD), the controller 130 can skip or omit an address translation to search for a physical address corresponding to the logical address provided from the host 102. For example, the controller 130 does not have to load metadata from the memory device 150 or replace the metadata stored in the memory 144 when the controller 130 cannot find metadata for the address translation in the memory 144. This allows the memory system 110 to perform a read operation requested by the host 102 more quickly.

FIG. 6 illustrates a first example of a transaction between a host 102 and a memory system 110 in a data processing system according to an embodiment of the disclosure.

Referring to FIG. 6, the host 102 storing the map information (MAP INFO) may transmit a read command including a logical address LBA and a physical address PBA to the memory system 110. When a physical address PBA corresponding to a logical address LBA transmitted to the memory system 110 with a read command (READ COMMAND) is found in the map information stored in the host 102, the host 102 can transmit, to the memory system 110, the read command (READ COMMAND) with the logical address LBA and the physical address PBA. When the physical address PBA corresponding to the logical address LBA transmitted with the read command (READ COMMAND) is not found in the map information stored by the host 102, the host 102 may transmit, to the memory system 110, the read command (READ COMMAND) including the logical address LBA only without the physical address PBA.

Although FIG. 6 describes an operation in response to the read command (READ COMMAND) as an example, an embodiment of the disclosure can be applied to a write command or an erase command transferred from the host 102 to the memory system 110.

Figure 7:
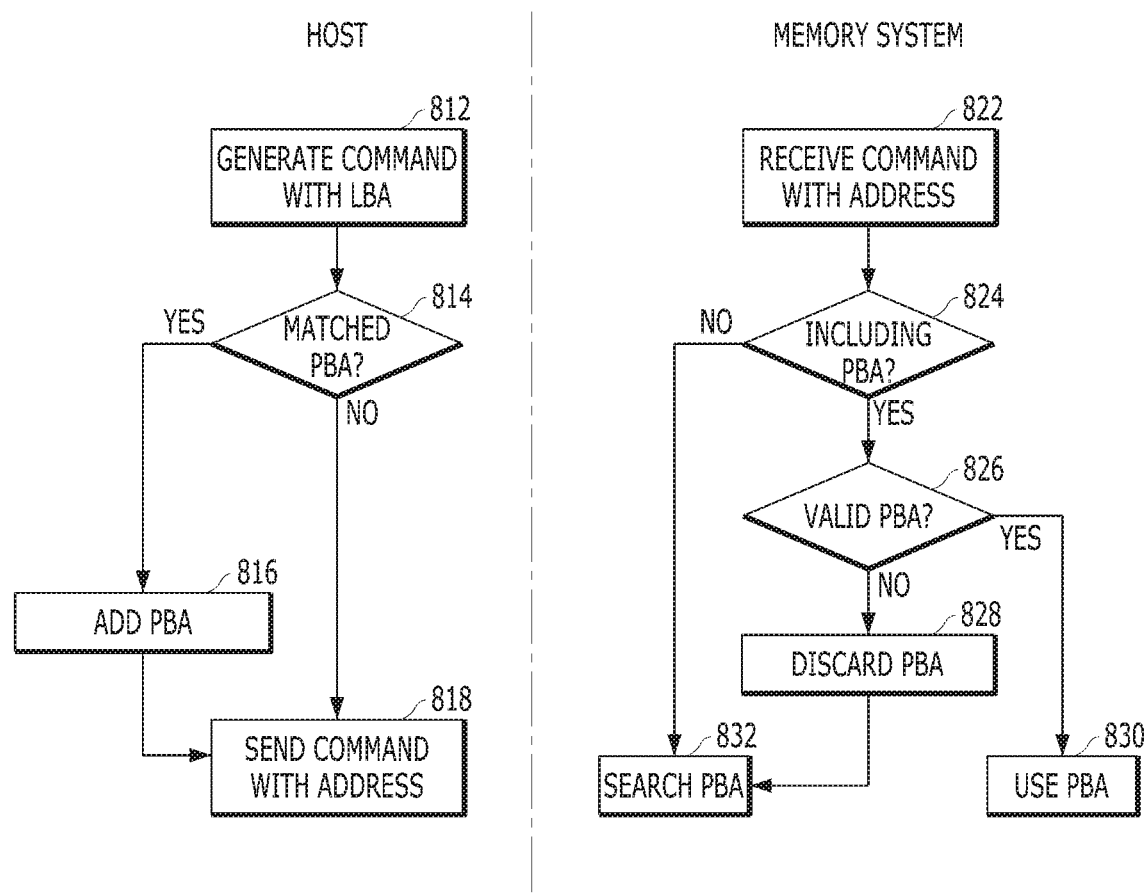
FIG. 7 describes example operations of a host and a memory system based on an embodiment of the disclosure.

FIG. 7 illustrates a first operation of a host and a memory system according to an embodiment of the disclosure. FIG. 7 illustrates detailed operations of the host transmitting a command including a logical address LBA and a physical address PBA and the memory system receiving the command with the logical address LBA and the physical address PBA. The operations as shown in FIG. 7 can be performed by the host 102 and the memory system 110 as shown in FIG. 6.

Referring to FIG. 7, the host may generate a command COMMAND including a logical address LBA (step 812). Thereafter, the host may check whether a physical address PBA corresponding to the logical address LBA is in the map information (step 814). If there is no physical address PBA (NO in step 814), the host may transmit a command COMMAND including the logical address LBA without the physical address PBA (step 818).

On the other hand, if there is the physical address PBA (YES of step 814), the host may add the physical address PBA to the command COMMAND including the logical address LBA (step 816). The host may transmit the command COMMAND including the logical address LBA and the physical address PBA (step 818).

The memory system may receive a command which is transmitted from an external device such as the host (step 822). The memory system may check whether the command is provided with a physical address PBA (step 824). When the command does not include a physical address PBA (NO in step 824), the memory system may perform a mapping operation or an address translation, e.g., search for a physical address corresponding to the logical address inputted with the command (step 832).

When the command includes the physical address PBA (YES of step 824), the memory system may check whether the physical address PBA is valid (step 826). The validity of the physical address PBA is checked to avoid using the physical address PBA that is not valid. The host may perform the mapping operation based on the map information delivered from the memory system. After performing the mapping operation, the host may transmit the command with the physical address PBA to the memory system. In some cases, after the memory system transmits map information to the host, there may be some changes or updates on the map information managed or controlled by the memory system. In this case, the map information which has been delivered to the host before such changes or updates is not valid any longer, the physical address PBA obtained based on such old map information and delivered from the host is not valid either and cannot be used to access data. Thus, the determining of the validity of the physical address corresponds to the determining whether any changes or updates have occurred on map information used for the address translation to obtain the physical address PBA. When the physical address PBA provided with the command is valid (YES at step 826), the memory system may perform an operation corresponding to the command using the physical address PBA (step 830).

When the physical address PBA provided with the command is not valid (NO in step 826), the memory system may ignore the physical address PBA provided with the command (step 828). In this case, the memory system may search for a physical address PBA based on the logical address LBA inputted with the command (step 832).

Figure 8:
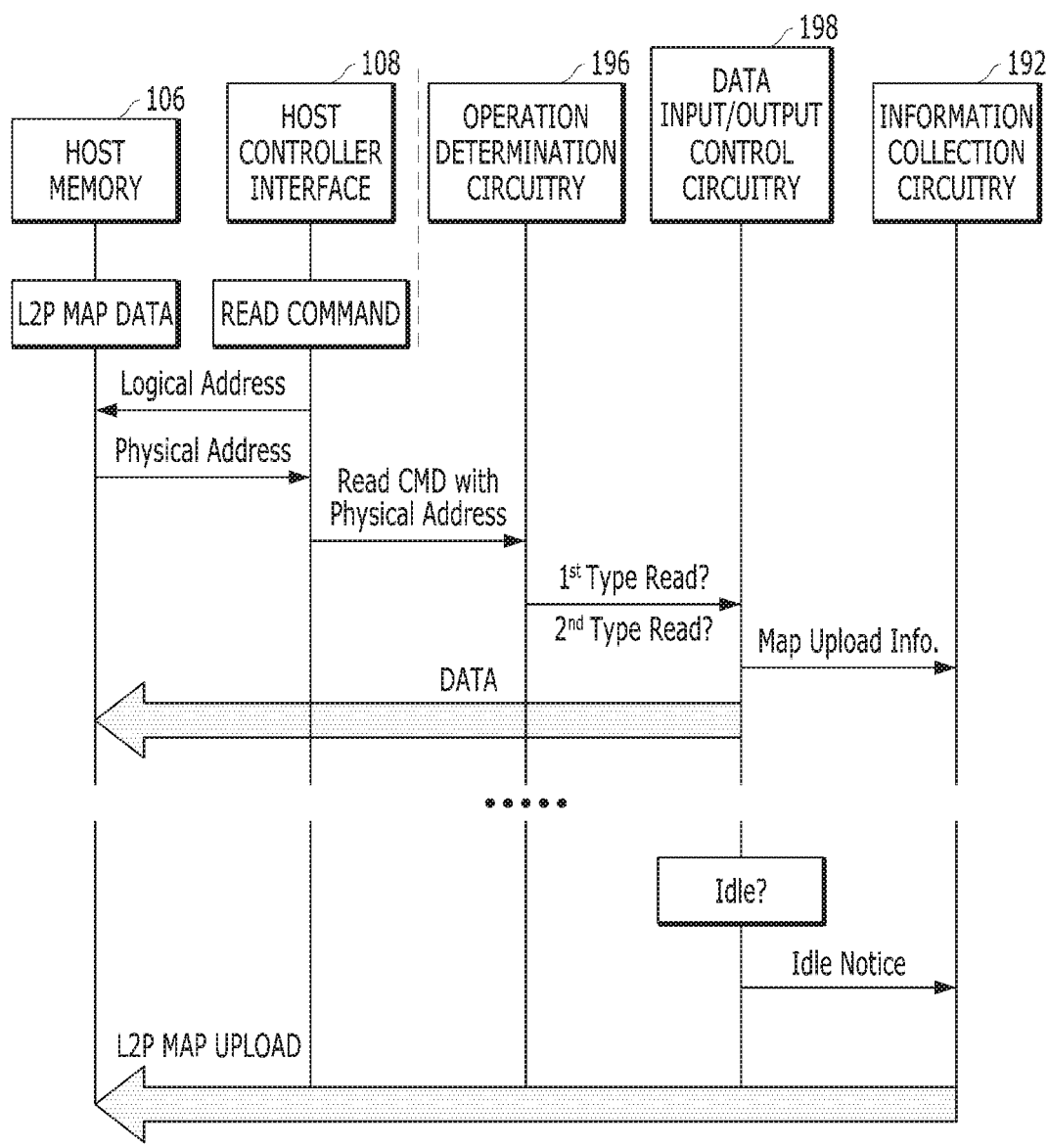
FIG. 8 illustrates an example operation for determining and transmitting map information based on an embodiment of the disclosure.

FIG. 8 illustrates an operation of determining and transmitting map information according to an embodiment of the disclosure. Referring to FIG. 5, when the host 102 and the memory system 110 are operatively engaged with each other, metadata (L2P MAP) stored in the memory device 150 may be transmitted to the host memory 106. In FIG. 8, it is assumed that the metadata (L2P MAP) is stored in the host memory 106.

Referring to FIG. 8, when a read command is generated by the processor 104 in the host 102, the read command is transmitted to the host controller interface 108. After receiving the read command, the host controller interface 108 can transmit a logical address corresponding to the read command to the host memory 106. Based on the metadata (L2P MAP) stored in the host memory 106, the host controller interface 108 may recognize a physical address corresponding to the logical address.

The host controller interface 108 transmits a read command (Read CMD) along with a physical address to the controller 130 (see FIGS. 1 to 3) in the memory system 110. The data input/output control circuitry 198 shown in FIG. 1 may receive the read command (Read CMD) transferred from the host controller interface 108 and access the memory device 150 based on the read command and the logical address (or the physical address). As described with reference to FIG. 1, when the data input/output control circuitry 198 can use the physical address transferred from the host controller interface 108, the data input/output control circuitry 198 may perform a fast read operation (i.e., 1st type read operation) without address translation regarding the inputted logical address. If the physical address inputted from the host controller interface 108 is not valid, the data input/output control circuitry 198 can perform address translation regarding the logical address inputted from the host controller interface 108 for read operation corresponding to the read command. A general read operation (i.e., 2nd type read operation) may be performed based on the translated physical address. Accordingly, the data input/output control circuitry 198 may transmit to the host memory 106 a piece of data stored in a specific location corresponding to the physical address in the memory device 150 through the fast read operation (i.e., 1st type read operation) or the general read operation (i.e., 2nd type read operation).

The process performed by the controller for reading some pieces of data from the memory device 150 including nonvolatile memory cells may take much longer than the process performed by the host controller interface for reading data from the host memory 106 that is a volatile memory. In a procedure performed by the controller 130, it may not be necessary that the controller 130 reads and loads metadata relevant to an inputted logical address from the memory device 150 for finding out the physical address. As a result, the procedure of reading a piece of data stored in the memory system 110 by the host 102 may be faster than the general read operation. Hereinafter, a read operation without controller's address translation is referred as to the fast read operation (i.e., 1st type read operation) which is distinguished from the general read operation (i.e., 2nd type read operation) including controller's address translation.

The data input/output control circuitry 198 can determine whether the fast read operation (1st type read operation) or the general read operation (2nd type read operation) has been performed in response to the read command (Read CMD) provided from the host 102. In addition, when the data input/output control circuitry 198 performs the address translation, map information used for the address translation may be notified to the information collection circuitry 192 as a candidate for upload map information (Map Upload Info).

In an embodiment, the controller 130 may recognize a piece of the map information used to perform the address translation by setting a count associated with the piece of map information and then increasing or managing the count. The piece of the map information used to perform the address translation can be recognized as the upload map information. The information collection circuitry 192 may increase the count corresponding to the piece of map information and select the piece of map information frequently or recently used by the data input/output control circuitry 198. The selected piece of map information can be transmitted to the host memory 106. The data input/output control circuitry 198 can transmit, to the information collection circuitry 192, information regarding what kind of read operation is performed in response to the read command (Read CMD) transferred from the host 102. Based on this information, the information collection circuitry 192 operating in a background operation may determine which piece of map information is to be transmitted to the host 102.

When there is no command transmitted from the host 102, the data input/output control circuitry 198 may be in an idle state. When the data input/output control circuitry 198 enters the idle state, the data input/output control circuitry 198 may notify the operation determination circuitry 196 that the data input/output control circuitry 198 is in the idle state. In an embodiment, the operation determination circuitry 196 may monitor an operation (or an operational state) of the data input/output control circuitry 198 to determine whether the data input/output control circuitry 198 is ready to send the piece of map information.

When the data input/output controller 198 is in an idle state, the operation determination circuitry 196 may transmit the piece of map information prepared or selected by the information collection circuitry 192 to the host memory 106. Since the operation determination circuitry 196 transmits the piece of map information to the host memory 106 while the data input/output control circuitry 198 is in an idle state, disruption can be reduced or minimized in performing a read operation of the memory system 110 in response to the read command (Read CMD) transferred from the host 102.

FIG. 9 illustrates sleep mode entry and exit operations in a data processing system in accordance with an embodiment of the disclosure.

Referring to FIG. 9, a host 102 and a memory system 110 may be interconnected with each other. The host 102 may be understood as a computing device, and implemented in the form of a mobile device, a computer, a server or the like. The memory system 110 interconnected with the host 102 may receive a command from the host 102 and store or output data in response to the received command.

The memory system 110 may include a nonvolatile memory device including nonvolatile memory cells. For example, the memory system 110 may be implemented in the form of a flash memory, a solid state drive (SSD), or the like.

The memory system 110 may include a volatile memory device for temporarily storing internal data INDATA generated during processing of an operation on the nonvolatile memory device. For example, the memory system 110 may generate mapping data as the internal data INDATA, the mapping data being used to perform mapping (such as logical address to physical address mapping) to connect a file system used by the host 102 to a storage space of the nonvolatile memory device. Furthermore, the memory system 110 may generate read/write/erase count data as the internal data INDATA in order to manage the reliability and lifetime of the nonvolatile memory device.

When no write or read operation is scheduled to be performed on the memory system 110 for a predetermined time or more, the host 102 may request the memory system 110 to enter a sleep mode in order to reduce power consumption of the memory system 110.

In an embodiment, the host 102 may generate a sleep command SLEEP COMMAND and transfer the sleep command SLEEP COMMAND to the memory system 110 in order to request the memory system 110 to enter the sleep mode. Herein, the sleep command SLEEP COMMAND may be referred as to a hibernation request which is generated by, and inputted from, the host 102.

In an embodiment, when the sleep command SLEEP COMMAND is received from the host 102, the memory system 110 may output internal data INDATA stored in a volatile memory VOLATILE MEMORY2 of the memory system 110 to the host 102 in response to the sleep command SLEEP COMMAND. At this time, although not illustrated in detail in FIG. 9, the memory system 110 may include a first volatile memory to which power is supplied in the sleep mode and a second volatile memory to which power is suspended in the sleep mode. Therefore, the memory system 110 may output a first portion of the internal data INDATA stored in the second volatile memory VOLATILE MEMORY2 to the host 102 in response to the sleep command SLEEP COMMAND, and not output a second portion of the internal data INDATA stored in the first volatile memory device to the host 102.

In an embodiment, after outputting the internal data INDATA stored in the volatile memory VOLATILE MEMORY2 to the host 102, the memory system 110 may acknowledge entry into the sleep mode by sending an ACK SLEEP MODE ENTRY message to the host 102 and then enter the sleep mode. While in the sleep mode, the memory system 110 may supply power to the first volatile memory device therein and suspend power to the second volatile memory VOLATILE MEMORY2. At this time, the second volatile memory VOLATILE MEMORY2 to which power is suspended in response to the entry into the sleep mode may lose all of the first portion of the internal data INDATA stored therein, and the first volatile memory device to which power is supplied may retain the second portion of the internal data INDATA stored therein.

In an embodiment, the host 102 may store the internal data INDATA received from the memory system 110 in an internal memory INTERNAL MEMORY of the host 102 while the memory system 110 is in the sleep mode.

In an embodiment, when the host 102 intends to request the memory system 110 which has entered the sleep mode to exit from the sleep mode, the host 102 may generate a wakeup command WAKEUP COMMAND and transfer the wakeup command WAKEUP COMMAND to the memory system 110. The host 102 may include the internal data INDATA stored in the internal memory INTERNAL MEMORY in the wakeup command WAKEUP COMMAND, and communicate the wakeup command WAKEUP COMMAND with the internal data INDATA to the memory system 110.

In an embodiment, when the memory system 110 receives the wakeup command WAKEUP COMMAND from the host 102, the memory system 110 may exit from the sleep mode, and supply power to the second volatile memory VOLATILE MEMORY2 to which power has been suspended during the sleep mode interval. Then, the memory system 110 may store the internal data INDATA which has been received with the wakeup command WAKEUP COMMAND from the host 102 in the second volatile memory VOLATILE MEMORY2, and transfer an acknowledgment for the exit from the sleep mode ACK SLEEP MODE EXIT to the host 102.

Figure 10:
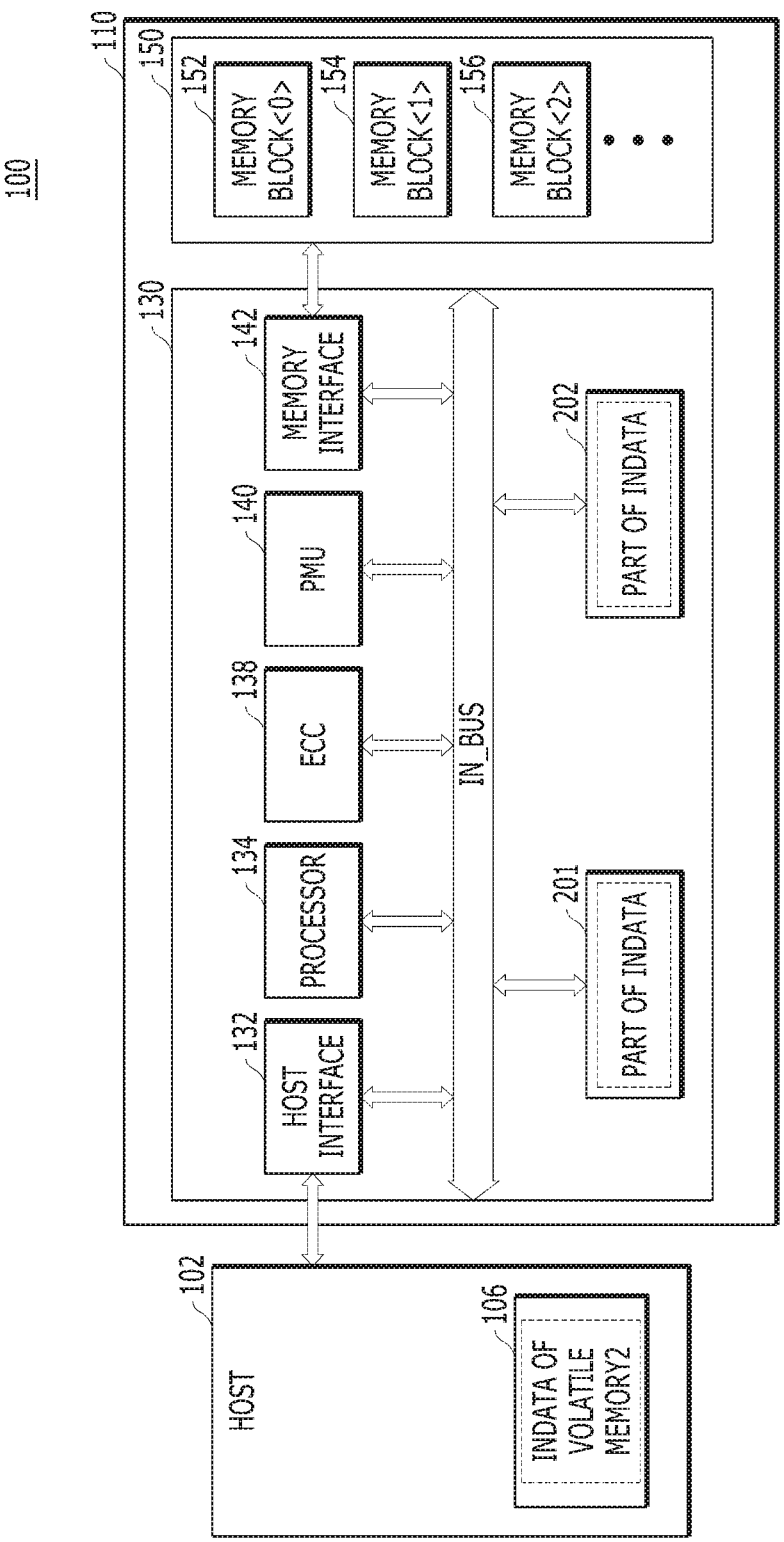
FIG. 10 illustrates a data processing system including a memory system in accordance with an embodiment of the disclosure.

Referring to FIG. 10, a data processing system 100 in accordance with an embodiment of the disclosure is described. The data processing system 100 may include a host 102 engaged or operating with a memory system 110.

The host 102 may include, for example, a portable electronic device such as a mobile phone, an MP3 player, or a laptop computer, or an electronic device such as a desktop computer, a game player, a television (TV), a projector, or the like.

The host 102 may include at least one operating system (OS), which can generally manage and control functions and operations performed in the host 102. The OS can provide interoperability between the host 102 engaged with the memory system 110 and a user using the memory system 110. The OS may support functions and operations corresponding to the user's requests. By the way of example but not limitation, the OS can be classified into a general operating system or a mobile operating system according to mobility of the host 102. The general operating system may be a personal operating system or an enterprise operating system according to system requirements or a user's environment. The personal operating system, including for example Windows and Chrome, may support services for general purposes. But the enterprise operating systems can be specialized for securing and supporting high performance, including Windows servers, Linux, Unix, and the like. Further, the mobile operating system may include Android, iOS, Windows mobile, or the like. The mobile operating system may support services or functions for mobility (e.g., a power saving function). The host 102 may include a plurality of operating systems. The host 102 may execute multiple operating systems interlocked with the memory system 110, according to a user's requirements. The host 102 may transmit a plurality of commands corresponding to the user's requests into the memory system 110, thereby performing operations corresponding to commands within the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) or a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), or a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems discussed above in the examples.

By the way of example but not limitation, the controller 130 and the memory device 150 may be integrated into a single semiconductor device. The controller 130 and memory device 150 may be integrated into an SSD; when the memory system 110 is used as an SSD, the operating speed of the host 102 connected to the memory system 110 can be improved compared to if the host 102 was connected to a hard disk. The controller 130 and the memory device 150 may also be integrated into one semiconductor device to form a memory card, such as a PC card (PCMCIA), a compact flash card (CF), a memory card such as a smart media card (SM, SMC), a memory stick, a multimedia card (MMC, RS-MMC, MMCmicro), a SD card (SD, miniSD, microSD, SDHC), a universal flash memory, or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while electrical power is not supplied to it. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a plurality of memory blocks 152, 154, 156. In addition, the memory device 150 may be a non-volatile memory device, for example a flash memory, and the flash memory may be embodied in a two-dimensional or a three-dimensional stack structure.

The controller 130 may control overall operations of the memory device 150, such as read, write, program, and erase operations. For example, the controller 130 may control the memory device 150 in response to a request from the host 102. The controller 130 may provide data read from the memory device 150 to the host 102. The controller 130 may also store data provided by the host 102 into the memory device 150.

The controller 130 may include a host interface (I/F) 132, a processor 134, an error correction code (ECC) component 138, a power management unit (PMU) 140, a memory interface (I/F) 142, and memories 201 and 202, all operatively coupled via an internal bus.

The host interface 132 may process commands and data provided by the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (DATA), small computer system interface (SCSI), enhanced small disk interface (ESDI), and integrated drive electronics (IDE). In accordance with an embodiment, the host interface 132 is a component for exchanging data with the host 102, which may be implemented through execution by a processor of firmware called a host interface layer (HIL) stored on a non-transitory computer-readable media.

The ECC component 138 can correct error bits of the data to be processed in (e.g., outputted from) the memory device 150, which may include an ECC encoder and an ECC decoder. Here, the ECC encoder can perform error correction encoding of data to be programmed into the memory device 150 to generate encoded data into which one or more parity or check bits is added and store the encoded data in memory device 150. The ECC decoder can detect and correct errors contained in data read from the memory device 150 when the controller 130 reads the data stored in the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bits which were generated during the ECC encoding process for correcting one or more error bits of the read data. When the number of the error bits is greater than or equal to a threshold number of correctable error bits, the ECC component 138 might not correct error bits but instead may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC component 138 may include all circuits, modules, systems or devices for performing the error correction operation based on at least one of the above described codes.

The PMU 140 may manage electrical power provided in the controller 130. In an embodiment, the PMU 140 may selectively supply power to first and second memories 201 and 202 during the sleep mode where entry and exit of the sleep mode is decided by the host 102. For example, during the sleep mode interval, the PMU 140 may supply power to the first memory 201 and suspend power to the second memory 202.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data being provided to or received from the memory device 150 under the control of the processor 134 when the memory device 150 is a flash memory and, in particular, when the memory device 150 is a NAND flash memory. The memory interface 142 can provide an interface for handling commands and data between the controller 130 and the memory device 150, for example, operations of NAND flash interface, in particular, operations between the controller 130 and the memory device 150. In accordance with an embodiment, the memory interface 142 can be implemented as a component for exchanging data with the memory device 150 through execution by a processor of firmware, called a Flash Interface Layer (FIL), stored on a non-transitory computer-readable media.

The memories 201 and 202 may support operations performed by the memory system 110 and the controller 130. The memories 201 and 202 may store temporary or transactional data generated by or provided for operations in the memory system 110 and the controller 130. The controller 130 may control the memory device 150 in response to a request from the host 102. The controller 130 may deliver data read from the memory device 150 to the host 102. The controller 130 may store data received from the host 102 within the memory device 150. The memories 201 and 202 may be used to store data used to perform operations such as read operations or program/write operations for the controller 130 and the memory device 150.

The memories 201 and 202 may be respectively implemented as volatile memories. The memories 201 and 202 may be implemented with a static random access memory (SRAM), a dynamic random access memory (DRAM), or both. Although FIG. 10 illustrates the memories 201 and 202 as disposed within the controller 130, an embodiment is not limited thereto, and the memories 201 and 202 may be located within or external to the controller 130. For instance, the memories 201 and 202 may be embodied by an external volatile memory having a memory interface transferring data and/or signals between the memories 201 and 202 and the controller 130.

The memories 201 and 202 can store data necessary for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memories 201 and 202 may include a program memory, a data memory, a write buffer/cache, a read buffer cache, a data buffer/cache, a map buffer/cache, and the like.

In the embodiment of FIG. 10, the first memory 201 and the second memory 202 may be configured as memories which are physically separated from each other and included in the memory system 110. In another embodiment, the first memory 201 and the second memory 202 may instead be configured as respective separate regions in one memory divided into two or more regions, unlike the configuration of FIG. 10. However, the first memory 201 and the second memory 202 differ from each other in that respective power thereto is supplied or suspended independently during the sleep mode interval determined by the host 102. In an embodiment, in the sleep mode interval, power may be supplied to the first memory 201 and suspended to the second memory 202. At this time, because the first and second memories 201 and 202 are both volatile memories, data stored in the first memory 201 may be continuously retained while in the sleep mode interval, and the data stored in the second memory 202 may be lost while in the sleep mode interval.

The processor 134 may be implemented with a microprocessor or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. In accordance with an embodiment, the processor 134 may use or execute firmware stored in non-transitory computer readable media to control the overall operations of the memory system 110. Herein, the firmware may be referred to as a flash translation layer (FTL). The FTL may operate as an interface between the host 102 and the memory device 150. The host 102 may transmit requests for write and read operations to the memory device 150 through the FTL.

The FTL may manage operations of address mapping, garbage collection, wear-leveling, and the like. Particularly, the FTL may load, generate, update, or store map data. Therefore, the controller 130 may map a logical address received from the host 102 to a physical address of the memory device 150 using the map data. Because of the address mapping operation, the memory device 150 may look like a general storage device to perform a read or write operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programed page) to take into account characteristic of a flash memory device. Further, the controller 130 may store map data of the new data into the FTL.

For example, when performing an operation requested by the host 102 in the memory device 150, the controller 130 uses the processor 134 implemented in a microprocessor or central processing unit (CPU) or the like. The processor 134 engaged with the memory device 150 can handle instructions or commands corresponding to command received from the host 102. The controller 130 can perform a foreground operation as a command operation, corresponding to an command received from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 using the processor 134. By way of example but not limitation, the background operation for the memory device 150 may include copying and storing data stored in a memory block among the memory blocks 152, 154, 156 in the memory device 150 to another memory block, e.g., a garbage collection (GC) operation. The background operation may include moving or swapping data stored in at least one of the memory blocks 152, 154, 156 into at least another of the memory blocks 152, 154, 156, e.g., a wear leveling (WL) operation. During a background operation, the controller 130 may use the processor 134 to store the map data stored in the controller 130 to at least one of the memory blocks 152, 154, 156 in the memory device 150, e.g., a map flush operation. A bad block management operation of checking or searching for bad blocks among the memory blocks 152, 154, 156 is another example of a background operation that may be performed by the processor 134.

In the memory system 110, the controller 130 performs a plurality of command operations corresponding to a plurality of commands entered from the host 102. For example, when performing a plurality of program operations corresponding to a plurality of program commands, a plurality of read operations corresponding to a plurality of read commands, and a plurality of erase operations corresponding to a plurality of erase commands sequentially, randomly, or alternatively, the controller 130 can determine which channel(s) or way(s) among a plurality of channels (or ways) connecting the controller 130 to a plurality of memory dies included in the memory 150 is/are proper or appropriate for performing each operation. The controller 130 can send or transmit data or instructions via determined channels or ways for performing each operation. The plurality of memory dies included in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command entered from the host 102, the controller 130 may select at least one channel or way based on the status of each channel or each way so that instructions and/or operation results with data may be delivered via selected channel(s) or way(s).

By the way of example but not limitation, the controller 130 can recognize statuses regarding a plurality of channels (or ways) associated with a plurality of memory dies included in the memory device 150. The controller 130 may determine the state of each channel or each way as one of a busy state, a ready state, an active state, an idle state, a normal state, and/or an abnormal state. The controller's determination of which channel or way an instruction (and/or a data) is delivered through can be associated with a physical block address, e.g., which die(s) the instruction (and/or the data) is delivered into. The controller 130 can refer to descriptors delivered from the memory device 150. The descriptors can include a block or page of parameters that describe something about the memory device 150, which is data with a predetermined format or structure. For instance, the descriptors may include device descriptors, configuration descriptors, unit descriptors, and the like. The controller 130 can refer to, or use, the descriptors to determine which channel(s) or way(s) an instruction or a data is exchanged via.

A management unit (not shown) may be included in the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Meanwhile, a program operation, a read operation and an erase operation of the controller 130 will be described below.

First, the controller 130 may store program data corresponding to a program command received from the host 102 in a buffer/cache included in the memories 201 and 202 of the controller 130, and then store the data stored in the buffer/cache in the memory blocks 152, 154 and 156 included in the memory device 150. Also, the controller 130 may update map data corresponding to the program operation, and then may store the updated map data in the memory blocks 152, 154 and 156 included in the memory device 150.

When a read command is received from the host 102, the controller 130 may read data corresponding to the read command from the memory device 150 by checking map data of the data corresponding to the read command, may store the read data in the buffer/cache included in the memories 201 and 202 of the controller 130, and then may provide the data stored in the buffer/cache to the host 102.

When an erase command is received from the host 102, the controller 130 may perform an erase operation of checking a memory block corresponding to the erase command, erasing data stored in the checked memory block, updating map data corresponding to the erased data, and then storing the updated map data in the memory blocks 152, 154 and 156 included in the memory device 150.

Map data may include logical/physical (L2P: logical to physical) address information and physical/logical (P2L: physical to logical) address information on data stored in memory blocks by a program operation.

Data corresponding to a command may include user data and metadata. The metadata may include map data generated in the controller 130 that corresponds to user data is stored in the memory device 150. Also, the metadata may include information on command data corresponding to a command received from the host 102, information on a command operation corresponding to the command, information on the memory blocks of the memory device 150 for which the command operation is to be performed, and information on map data corresponding to the command operation. In other words, the metadata may include information and data for the command operation, other than user data corresponding to the command received from the host 102.

That is to say, when a write command is received from the host 102, the controller 130 performs a program operation corresponding to the write command. At this time, the controller 130 may store user data corresponding to the write command in at least one among the memory blocks 152, 154 and 156 of the memory device 150 (for example, empty memory blocks, open memory blocks or free memory blocks for which an erase operation is performed, among the memory blocks). Also, the controller 130 may store logical to physical address mapping information (an L2P map) and physical to logical address mapping information (a P2L map) regarding the user data stored in memory blocks in empty memory blocks, open memory blocks, or free memory blocks among the memory blocks of the memory device 150, in the form of a map table or a map list.

User data to be stored in the memory device 150 may be divided by the unit of a segment having a preset size. The preset size may be the same as a minimum data size required for the memory system 110 to interoperate with the host 102. According to an embodiment, a size of a data segment as the unit of user data may be determined according to a configuration and a control method in the memory device 150. While storing data segments of user data in the memory blocks of the memory device 150, the controller 130 may generate or update a map address corresponding to a stored data segment. When meta segments each corresponding to the unit of metadata including a map address (for example, logical to physical (L2P) segments and physical to logical (P2L) segments as map segments of map data) are generated by the controller 130 or map segments stored in memory blocks are loaded to the memories 201 and 202 and are then updated, the map segments may be stored in the memory blocks of the memory device 150.

Referring to FIGS. 9 and 10, the memory system 110 may generate the internal data INDATA during processing of an operation on the memory device 150. At this time, the internal data INDATA may be meta data which is generated in the memory system 110 because the meta data is required for performing a data write/read operation between the host 102 and the memory device 150. For example, map data including L2P (Logical to Physical) address mapping information and P2L (Physical to Logical) address mapping information on data stored in the memory blocks 152, 154 and 156 may be included in the internal data INDATA. Furthermore, read/write/erase count data which are required to ensure the reliability of data stored in the memory blocks 152, 154 and 156 or to decide a time point of a background operation may be included in the internal data INDATA. On the other hand, write/read data which are directly inputted from the host 102, stored in the memory blocks 152, 154 and 156, and then outputted to the host 102 may not be included in the internal data INDATA, because the write/read data are not generated by the memory system 110.

The memory system 110 may store the internal data INDATA in at least any one of the first and second memories 201 and 202. For example, as illustrated in the drawings, a first part PART1 of the internal data INDATA may be stored in the first memory 201, and a second part PART2 of the internal data INDATA may be stored in the second memory 202.

When no write or read operation is scheduled to be performed on the memory system 110 for a predetermined time or more, the host 102 may request the memory system 110 to enter the sleep mode, in order to reduce power consumption of the memory system 110.

When the request for the entry into the sleep mode is received from the host 102, the memory system 110 may output the second part PART2 of the internal data INDATA stored in the second memory 202 to the host 102, and then suspend (that is, stop supplying) power to the second memory 202.

After requesting the memory system 110 to enter the sleep mode, the host 102 may store the second part PART2 of the internal data INDATA received from the memory system 110 in the internal memory 106.

The host 102 may at a later time request the memory system 110, which has entered the sleep mode, to exit from the sleep mode. At this time, the host 102 may output the second part PART2 of the internal data INDATA stored in the internal memory 106 to the memory system 110 while requesting the memory system 110 to exit from the sleep mode.

When the request for the exit from the sleep mode is received from the host 102, the memory system 110 may supply power to the second memory 202. Then the memory system 110 may store the second part PART2 of the internal data INDATA in the second memory 202, the second part PART2 of the internal data INDATA being received with the request for the exit from the sleep mode from the host 102.

FIGS. 11A to 11E illustrate sleep mode entry and exit operations in a data processing system in accordance with the embodiment of the disclosure.

The sleep mode entry and exit operations of the data processing system 100, which is described with reference to FIGS. 11A and 11B, may be a detailed version of the sleep mode entry and exit operations of the data processing system 100 described with reference to FIGS. 9 and 10. Thus, the following descriptions will be focused on contents which can technically distinguish between the sleep mode entry and exit operations to be described with reference to FIGS. 11A and 11B and the operations described with reference to FIGS. 9 and 10.

In an embodiment, the host 102 may generate a sleep command SLEEP COMMAND and transfer the sleep command SLEEP COMMAND to the memory system 110 to request the memory system 110 to enter the sleep mode.

When the sleep command SLEEP COMMAND is received from the host 102, the memory system 110 may check the size of internal data INDATA stored in the second volatile memory VOLATILE MEMORY2 within the memory system 110. That is, the memory system 110 may compare the size of the internal data INDATA stored in the second volatile memory VOLATILE MEMORY2 with a reference size REF SIZE. This is because, in an embodiment, the size of data which the memory system 110 can transfer to the host 102 at one time in response to the sleep command SLEEP COMMAND may be limited to a prearranged amount. That is, in order to store the data transferred from the memory system 110 in the internal memory INTERNAL MEMORY of the host 102, a protocol prearranged between the host 102 and the memory system 110 needs to be used as it is, and the prearranged protocol may include the size of data which can be transferred at one time (for example, in a single message). The reference size REF SIZE may correspond to the size of data which the memory system 110 can transfer to the host 102 at one time in response to the sleep command SLEEP COMMAND.

Therefore, when the sleep command SLEEP COMMAND is received from the host 102, the memory system 110 may decide whether to divide the internal data INDATA stored in the second volatile memory VOLATILE MEMORY2 according to the comparison result between the size of the internal data INDATA stored in the second volatile memory VOLATILE MEMORY2 and the reference size REF SIZE. When the size of the internal data INDATA stored in the second volatile memory VOLATILE MEMORY2 is equal to or less than the reference size REF SIZE (SIZE OF INDATA⇐REF SIZE), the memory system 110 may not divide the internal data INDATA stored in the second volatile memory VOLATILE MEMORY2. On the other hand, when the size of the internal data INDATA stored in the second volatile memory VOLATILE MEMORY2 exceeds the reference size REF SIZE (SIZE OF INDATA>REF SIZE), the memory system 110 may divide the internal data INDATA stored in the second volatile memory VOLATILE MEMORY2.

Figure 11A:
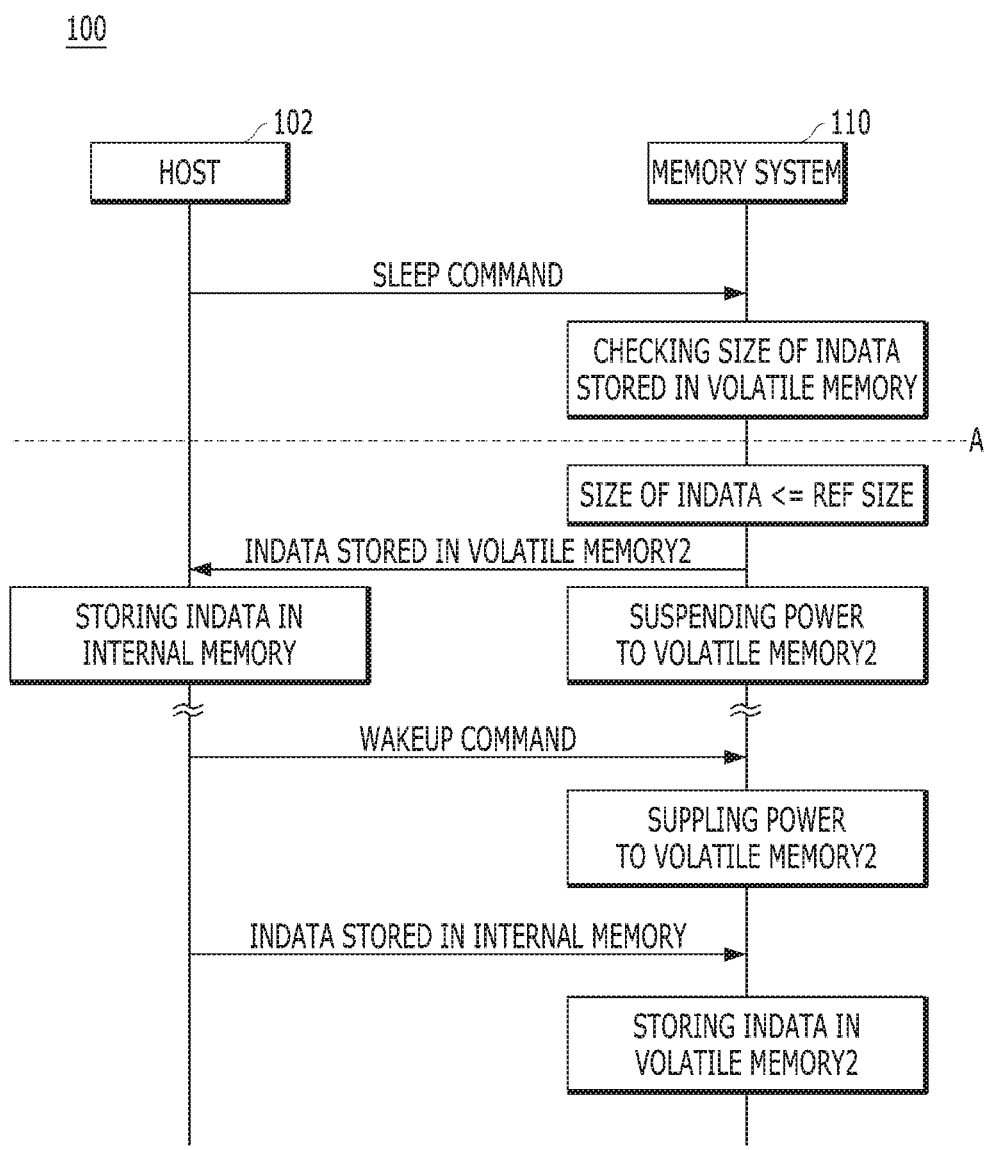
FIGS. 11A, 11B, 11C, 11D, and 11E illustrate sleep mode entry and exit operations in the data processing system in accordance with the embodiment of the disclosure.

FIG. 11A illustrates the memory system 110 entering and exiting the sleep mode when the size of the internal data INDATA stored in the second volatile memory VOLATILE MEMORY2 is equal to or less than the reference size REF SIZE (SIZE OF INDATA⇐REF SIZE).

First, the memory system 110 may output the internal data INDATA stored in the second volatile memory VOLATILE MEMORY2 to the host 102, and then acknowledge entry into the sleep mode to the host 102 (ACK SLEEP MODE ENTRY) and enter the sleep mode.

While in the sleep mode, the memory system 110 may supply power to a first volatile memory device therein, and suspend power to the second volatile memory VOLATILE MEMORY2. As a result, the second volatile memory VOLATILE MEMORY2 to which power is suspended during the sleep mode may lose all of the internal data INDATA stored therein, and the first volatile memory device to which power is supplied may retain the data stored therein.

The host 102 may store the internal data INDATA received from the memory system 110 in the internal memory INTERNAL MEMORY of the host 102 during the time period when the memory system 110 is entering, in, and exiting the sleep mode.

To request the memory system 110, which has entered the sleep mode, to exit from the sleep mode, the host 102 may generate a wakeup command WAKEUP COMMAND and transfer the wakeup command WAKEUP COMMAND to the memory system 110. The host 102 may include the internal data INDATA stored in the internal memory INTERNAL MEMORY in the wakeup command WAKEUP COMMAND, and output the wakeup command WAKEUP COMMAND with the internal data INDATA to the memory system 110.

Thus, when the wakeup command WAKEUP COMMAND is received from the host 102, the memory system 110 may exit from the sleep mode and supply power POWER to the second volatile memory VOLATILE MEMORY2 to which power has been suspended in the sleep mode interval. Then, the memory system 110 may store the internal data INDATA received with the wakeup command WAKEUP COMMAND from the host 102 into the second volatile memory VOLATILE MEMORY2, and transfer an acknowledgment for the exit from the sleep mode (ACK SLEEP MODE EXIT) to the host 102.

Figure 11B:
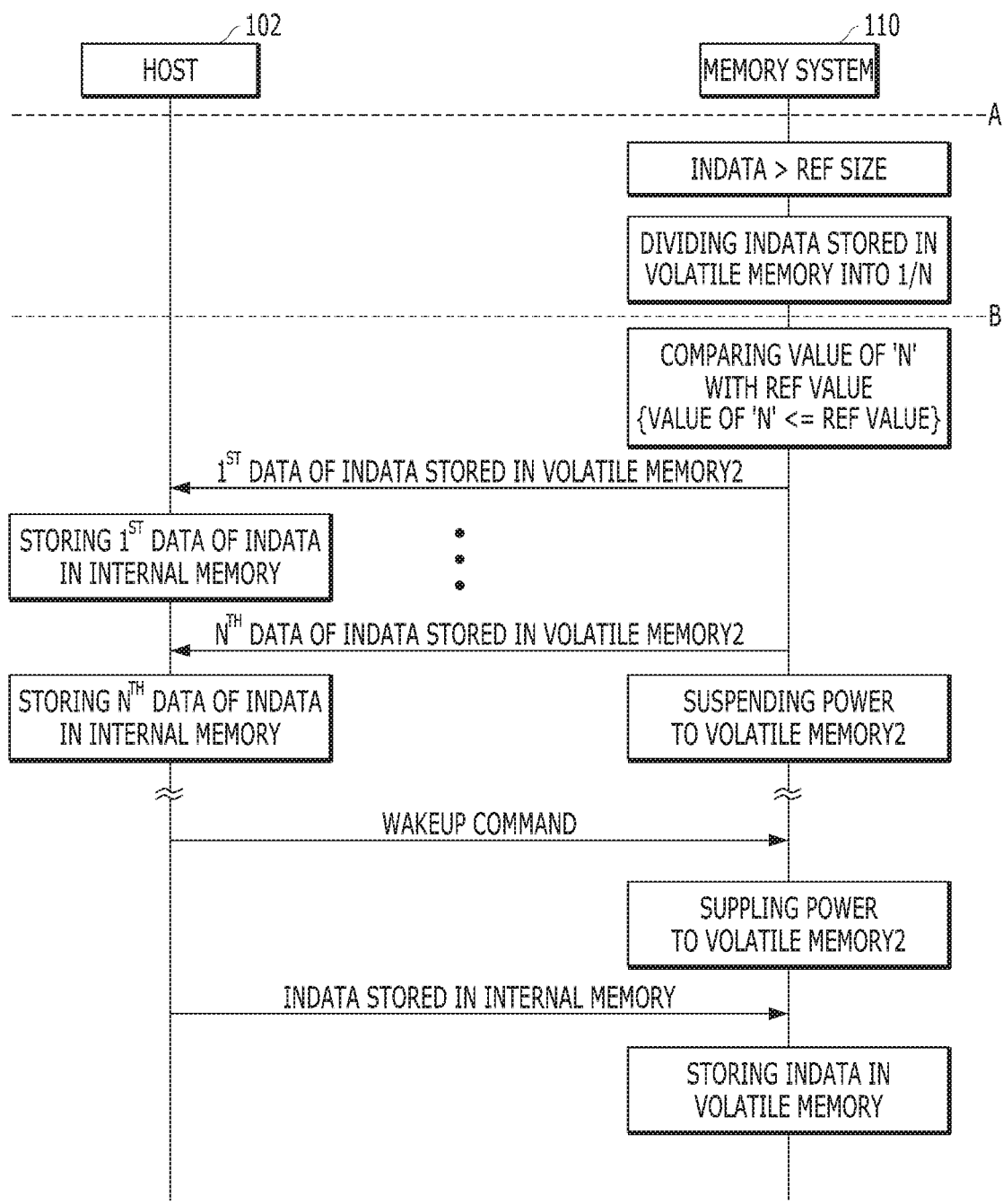

FIG. 11B illustrates an operation in which the memory system 110 enters and exits from the sleep mode when the size of the internal data INDATA stored in the second volatile memory VOLATILE MEMORY2 within the memory system 110 exceeds the reference size REF SIZE (SIZE OF INDATA>REF SIZE), on the contrary to the descriptions of FIG. 11A. Operations above a line A in the operation of FIG. 11B may be performed in the same manner as shown above the line A in FIG. 11A.

First, the memory system 110 may divide the internal data INDATA stored in the second volatile memory VOLATILE MEMORY2 into N portions of data (DIVIDING INDATA STORED IN VOLATILE MEMORY2 INTO N), where N may be a natural number equal to or more than 2. Then, the memory system 110 may compare the value of N with a reference value REF VALUE (COMPARING VALUE OF 'N' WITH REF VALUE). That is because the entire size of data which the memory system 110 can transfer to the host 102 in response to the sleep command SLEEP COMMAND may have a prearranged limit. That is, in order to store the data transferred from the memory system 110 in the internal memory INTERNAL MEMORY of the host 102, a protocol prearranged between the host 102 and the memory system 110 needs to be used as it is, and the prearranged protocol may include a limit on the entire size of data which can be transferred. At this time, the size may correspond to the reference value REF VALUE capable of defining the entire size of data which the memory system 110 can transfer to the host 102 in response to the sleep command SLEEP COMMAND. For reference, as described above, the size of data which the memory system 110 can transfer to the host 102 at a time in response to the sleep command SLEEP COMMAND has been defined as the reference size REF SIZE. Furthermore, the reason to divide the internal data INDATA stored in the second volatile memory VOLATILE MEMORY2 into N portions of data is that the size of the internal data INDATA is larger than the reference size REF SIZE. Therefore, suppose that the internal data INDATA is divided by the reference size REF SIZE when the internal data INDATA is divided into N portions of data. Therefore, the reference value REF VALUE compared with N may define the entire size of data which the memory system 110 can transfer to the host 102 in response to the sleep command SLEEP COMMAND.

FIG. 11B illustrates the case in which the value of N is equal to or less than the reference value REF VALUE (VALUE OF 'N'⇐REF VALUE).

Specifically, when the value of N is equal to or less than the reference value REF VALUE (VALUE OF 'N'⇐REF VALUE), the memory system 110 may sequentially output the N portions of divided internal data INDATA from a first portion 1ST PORTION OF INDATA to an Nth portion NTH PORTION OF INDATA to the host 102 as responses to the sleep command SLEEP COMMAND, respectively, and then acknowledge the entry into the sleep mode to the host 102 (ACK SLEEP MODE ENTRY) and enter the sleep mode.

While entering the sleep mode, the memory system 110 may supply power to the first volatile memory device therein, and suspend power to the second volatile memory VOLATILE MEMORY2. At this time, the second volatile memory VOLATILE MEMORY2 to which power is suspended during the sleep mode may lose all of the internal data INDATA stored therein, and the first volatile memory device to which power is supplied may retain the data stored therein.

The host 102 may store the internal data INDATA received from the memory system 110 in the internal memory INTERNAL MEMORY of the host 102 between the first time point that the host 102 generates the sleep command SLEEP COMMAND and outputs the sleep command SLEEP COMMAND to the memory system 110 until after the memory system 110 exits the sleep mode.

To request the memory system 110, which has entered the sleep mode SLEEP MODE, to exit from the sleep mode, the host 102 may generate the wakeup command WAKEUP COMMAND and transfer the wakeup command WAKEUP COMMAND to the memory system 110. The host 102 may include the internal data INDATA stored in the internal memory INTERNAL MEMORY in the wakeup command WAKEUP COMMAND, and output the wakeup command WAKEUP COMMAND with the internal data IN DATA to the memory system 110.

Thus, when the wakeup command WAKEUP COMMAND is received from the host 102, the memory system 110 may exit from the sleep mode, and supply power to the second volatile memory VOLATILE MEMORY2 to which power has been suspended during the sleep mode interval. Then, the memory system 110 may store the internal data INDATA received with the wakeup command WAKEUP COMMAND from the host 102 in the second volatile memory VOLATILE MEMORY2, and transfer an acknowledgment for the exit from the sleep mode (ACK SLEEP MODE EXIT) to the host 102.

Figure 11C:
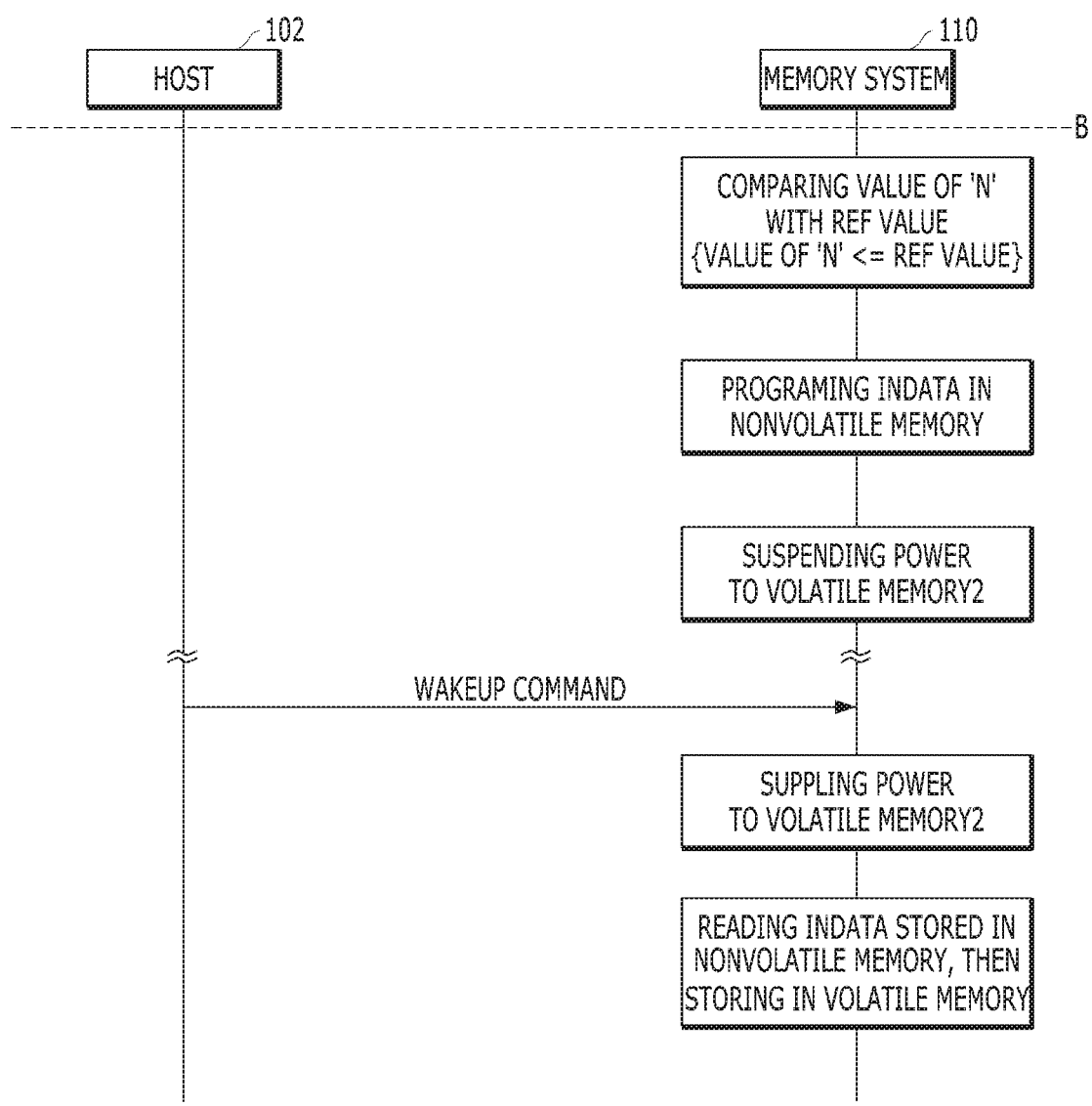

FIG. 11C illustrates the case in which the value of N exceeds the reference value REF VALUE (VALUE OF 'N'>REF VALUE), on the contrary to the descriptions of FIG. 11B. Operations above a line B in the operation of FIG. 11C may be performed in the same manner as shown above the line B in FIG. 11B (including the operations shown above the line A in FIG. 11A).

Specifically, when the value of N exceeds the reference value REF VALUE (VALUE OF 'N'>REF VALUE), the memory system 110 may program the internal data INDATA stored in the second volatile memory VOLATILE MEMORY2 to a nonvolatile memory device NONVOLATILE MEMORY, and then acknowledge an entry into the sleep mode to the host 102 (ACK SLEEP MODE ENTRY) and enter the sleep mode. That is, the memory system 110 may not output any data to the host 102 in response to the sleep command SLEEP COMMAND, but may acknowledge the entry into the sleep mode to the host 102. Because the host 102 receives no data from the memory system 110 in response to the sleep command SLEEP COMMAND, the host 102 does not store any corresponding data in the internal memory INTERNAL MEMORY.

While in the sleep mode, the memory system 110 may supply power to the first volatile memory device therein, and suspend power to the second volatile memory VOLATILE MEMORY2. At this time, the second volatile memory VOLATILE MEMORY2 to which power is suspended during the sleep mode may lose all of the internal data INDATA stored therein, and the first volatile memory device to which power is supplied may retain the data stored therein.

To request the memory system 110 which has entered the sleep mode to exit from the sleep mode SLEEP MODE, the host 102 may generate the wakeup command WAKEUP COMMAND and transfer the wakeup command WAKEUP COMMAND to the memory system 110. At this time, since the host 102 has never received any data from the memory system 110 as a response to the sleep command SLEEP COMMAND, the host 102 may not include data in the wakeup command WAKEUP COMMAND outputted to the memory system 110.

When the wakeup command WAKEUP COMMAND is received from the host 102, the memory system 110 may exit from the sleep mode, and supply power to the second volatile memory VOLATILE MEMORY2 to which power has been suspended during the sleep mode interval. Then, the memory system 110 may read the internal data INDATA, which has been programmed to the nonvolatile memory device NONVOLATILE MEMORY at the sleep mode entry time, from the nonvolatile memory device NONVOLATILE MEMORY and store the read data in the second volatile memory VOLATILE MEMORY2, and transfer an acknowledgment for the exit from the sleep mode (ACK SLEEP MODE EXIT) to the host 102.

Figure 11D:
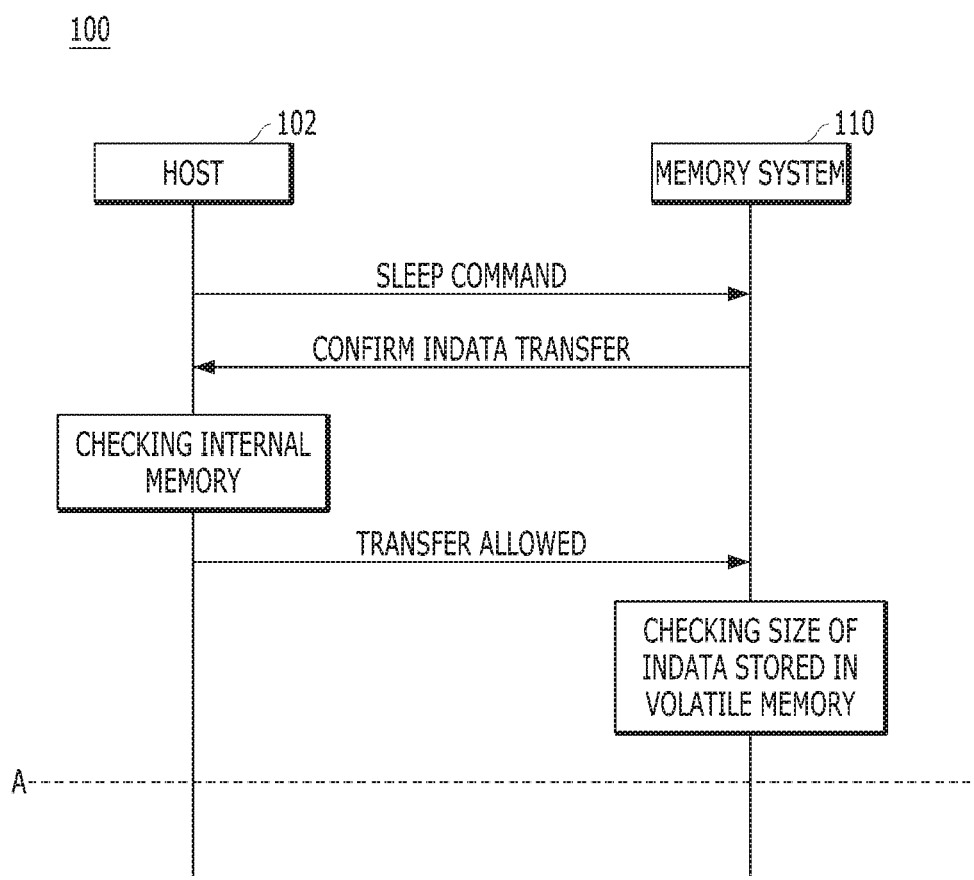

Referring to FIG. 11D, in an embodiment, when the sleep command SLEEP COMMAND is received from the host 102, the memory system 110 may request confirmation from the host 102 that transfer of the internal data INDATA to the host 102 is supported (CONFIRM INDATA TRANSFER) before transferring the internal data INDATA stored in the second volatile memory VOLATILE MEMORY2 to the host 102.

The host 102 may check the state of the internal memory INTERNAL MEMORY when a request to confirm support for the transfer of the internal data INDATA is received from the memory system 110 between the first time point that the host 102 generates the sleep command SLEEP COMMAND and outputs the sleep command SLEEP COMMAND to the memory system 110 and the second time point that the acknowledgment for the entry into the sleep mode is received from the memory system 110 (CHECKING INTERNAL MEMORY). According to a result obtained by checking the state of the internal memory INTERNAL MEMORY, the host 102 may allow the memory system 110 to transfer the internal data INDATA (TRANSFER ALLOWED), or not allow the memory system 110 to transfer the internal data INDATA (TRANSFER NOT ALLOWED).

When the host 102 confirms to the memory system 110 (TRANSFER ALLOWED) that the memory system 110 is allowed to transfer the internal data INDATA to the host 102, the memory system 110 may output the internal data INDATA stored in the second volatile memory VOLATILE MEMORY2 to the host 102 by using the operations described with reference to FIGS. 11A to 11C as it is. That is, the operations described with reference to FIGS. 11A to 11C may be applied as an operation below a line A in the operation of FIG. 11D.

Figure 11E:
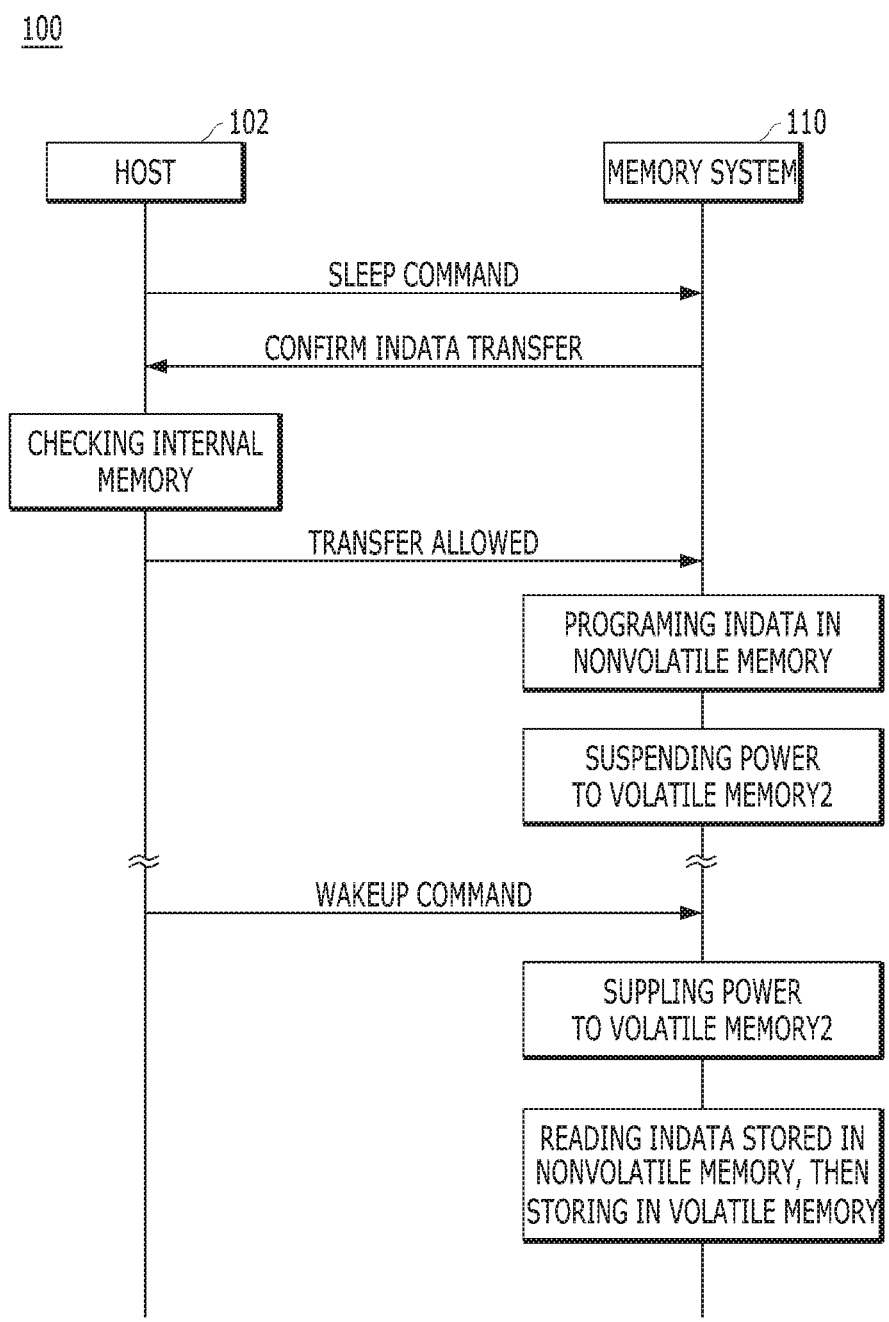

FIG. 11E illustrates the case in which the host 102 indicates to the memory system 110 that memory system 110 is not allowed to transfer the internal data to the host 102 (TRANSFER NOT ALLOWED), to the contrary to the case of FIG. 11D.

When not allowed to transfer the internal data INDATA to the host 102, the memory system 110 may program the internal data INDATA stored in the second volatile memory VOLATILE MEMORY2 to the nonvolatile memory device NONVOLATILE MEMORY, and then acknowledge an entry into the sleep mode to the host 102 (ACK SLEEP MODE ENTRY) and enter the sleep mode. That is, the memory system 110 may not output any data to the host 102 in response to the sleep command SLEEP COMMAND, but acknowledge the entry into the sleep mode to the host 102. Furthermore, since the host 102 receives no data from the memory system 110 in response to the sleep command SLEEP COMMAND, the host 102 may not store such data in the internal memory INTERNAL MEMORY.

While in the sleep mode, the memory system 110 may supply power to the first volatile memory device therein, and suspend power to the second volatile memory VOLATILE MEMORY2. During this time, the second volatile memory VOLATILE MEMORY2 to which power is suspended may lose all of the internal data INDATA stored therein, and the first volatile memory device to which power is supplied may retain the data stored therein.

To request the memory system 110 which has entered the sleep mode to exit from the sleep mode, the host 102 may generate the wakeup command WAKEUP COMMAND and transfer the wakeup command WAKEUP COMMAND to the memory system 110. At this time, since the host 102 has never received any data from the memory system 110 in response to the sleep command SLEEP COMMAND, the host 102 may not include data in the wakeup command WAKEUP COMMAND outputted to the memory system 110.

When the wakeup command WAKEUP COMMAND is received from the host 102, the memory system 110 may exit from the sleep mode, and supply power to the second volatile memory VOLATILE MEMORY2 to which power has been suspended in the sleep mode interval. Then, the memory system 110 may read the internal data INDATA, which has been programmed to the nonvolatile memory device NONVOLATILE MEMORY at the sleep mode entry time, from the nonvolatile memory device NONVOLATILE MEMORY and store the read data in the second volatile memory VOLATILE MEMORY2, and transfer an acknowledgment for the exit from the sleep mode (ACK SLEEP MODE EXIT) to the host 102.

In accordance with the above-described an embodiment, when the memory system is controlled to enter the sleep mode, the internal data stored in the volatile memory device of the memory system to which power is suspended in the sleep mode may be transferred to the host and stored in the internal memory of the host. Furthermore, when the memory system is controlled to exit from the sleep mode, the internal data stored in the internal memory of the host may be received from the host and stored in the volatile memory of the memory system. This operation can significantly reduce the entry and exit latency of the sleep mode, compared to the case in which the internal data stored in the volatile memory device of the memory system are programmed to/read from the nonvolatile memory device in the sleep mode entry/exit interval. Through this operation, the operation performance of the memory system can be improved.

Figure 12:
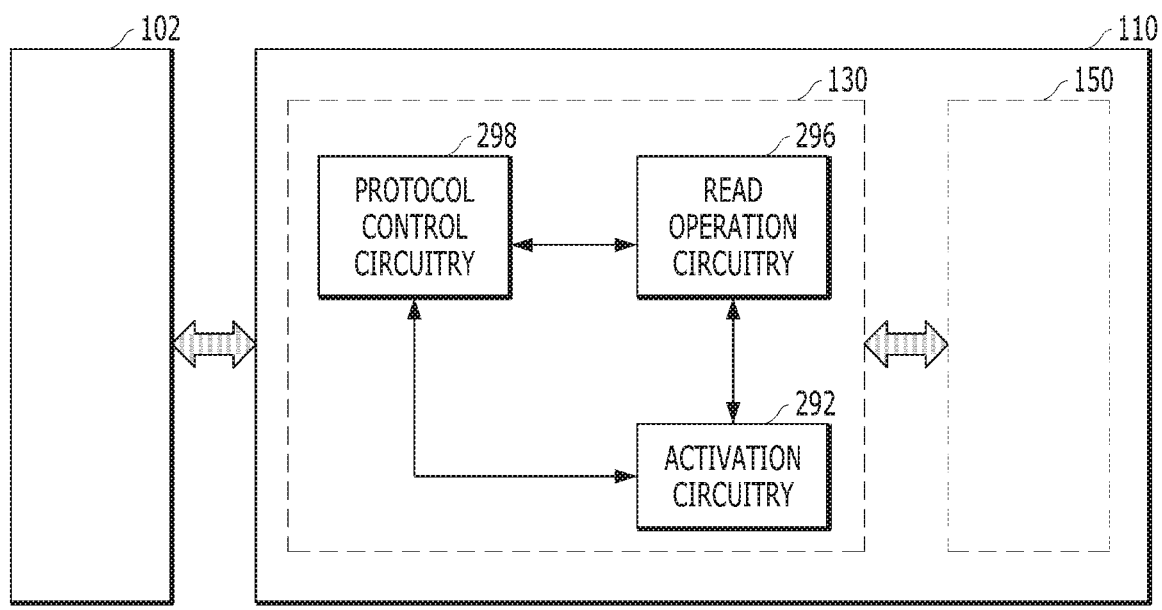
FIG. 12 illustrates an example of an apparatus for determining and transmitting map information in accordance with an embodiment of the disclosure.

FIG. 12 illustrates a second example of an apparatus for determining and transmitting map information to be shared between the host 102 and the memory system 110 according to an embodiment of the disclosure.

Referring to FIG. 12, the memory system 110 may include a controller 130 and a memory device 150. The controller 130 may include protocol control circuitry 298, read operation circuitry 296, and activation circuitry 292. Here, the protocol control circuitry 298 may perform some of operations carried out by the host interface 132 described with reference to FIGS. 2 to 3. The protocol control circuitry 298 may control data communication between the host 102 and the memory system 110. For example, the protocol control circuitry 298 may control an input buffer for storing commands, addresses, data or etc. transferred from the host 102 and an output buffer for storing a piece of data outputted to the host 102. The protocol control circuitry 298 may estimate or predict whether the controller 130 is going to entry in an idle state, and may find a time point at which the activation circuitry 292 transmits a piece of map information to the host 102. The time point at which the map information is transmitted may be determined based on data communication between the protocol control circuitry 298 and the host 102, which will be described below with reference to FIGS. 14 to 16.

An operation corresponding to the read command received through the protocol control circuitry 298 may be performed by the read operation circuitry 296. Here, the read operation circuitry 296 may correspond to the data input/output control circuitry 198 described with reference to FIG. 1. In FIG. 12, a read operation corresponding to a read command will be described. In response to the read command transmitted from the host 102, the read operation circuitry 296 may perform either a fast read operation or a general read operation.

While the read operation circuitry 296 performs the fast read operation or the general read operation, or after the read operation circuitry 296 performs the fast read operation or the general read operation, the activation circuitry 292 can select or determine a piece of map information to be transmitted to the host 102, in response to the read operation performed by the read operation circuitry 296.

The activation circuitry 292 and the read operation circuitry 296 can work independently of each other. The activation circuitry 292 may select and determine a piece of map information as a background operation, while the read operation circuitry 296 performs a read operation as a foreground operation. In an embodiment, the activation circuitry 292 may generate a piece of information having a specific data structure which corresponds to the existing metadata or the existing map information. For example, the map information may be divided into plural units (or segments), each unit transmitted to the host 102 at one time. The controller 130 may divide all pieces of map information, which can be used for address translation, into plural units of map information, which can be transmitted to the host 102. Accordingly, the number of pieces of information (e.g., the number of counts) generated by the activation circuitry 292 can be determined. In an embodiment, each count may be set or allocated for each piece of data having a predetermined size (e.g., a few bits, a few bytes or etc.) or each unit of map information. For the information generated or controlled by the activation circuitry 292, a space in the memory 144 (see FIGS. 2 to 3) may be allocated. For example, a space of 400 bytes based on a size of each index (for example, 4 bytes) and the number of the indices (for example, 100) for each unit of map information may be allocated.

The memory system 110 may increase a count regarding each unit of map information used for a read operation (address translation) in response to a read command transferred from the host. If the count may be compared with a predetermined criterion or a reference value, it is determined which unit of map information is transmitted. In an embodiment, the controller 130 can use an identifier indicating whether corresponding unit of map information is transmitted. With the identifier, the activation circuitry 292 may check which unit of map data is added or removed in a group of candidates to be transmitted to the host 102. For example, it is assumed that 80 pieces among total 100 pieces of map information are used for plural read operations. The activation circuitry 292 may generate information having a size of 320 bytes based on a size of index (e.g., 4 bytes) and the number of information pieces (e.g., 80). Thus, a small space (e.g., 320 bytes) in the memory 144 may be occupied. Since the information generated by the activator 292 occupies a small amount of resources in the controller 130, it is possible to reduce interference of data input/output operations performed by the memory system 110.

In an embodiment, after the read operation (e.g., SCSI CMD operation) performed by the read operation circuitry 296 is completed, the activation circuitry 292 may operate independently in the background. The activation circuitry 292 may set an additional information (e.g., counts) having a specific data structure and increase a count associated with a unit of map information used for address translation of the read operation. When the count exceeds the predetermined criterion, the activation circuitry 292 can determine that it is necessary to transmit a unit of map information corresponding to the host 102. Thereafter, the activation circuitry 292 may load and store the corresponding map information in a buffer (e.g., a queue) that can be outputted to the host 102.

When the unit of map information to be outputted to the host 102 is selected and determined, the activation circuitry 292 may reset or initialize the count corresponding to the unit of map information. This initialization can dynamically reflect a usage pattern or an access pattern regarding data stored in the memory system 110, to reduce address translation performed by read operation circuitry 296 during read operations. Further, it can be avoided that the memory system 110 send the unit of map information which the host memory 106 has stored to the host 102. Accordingly, overheads caused by sharing the map information between the memory system 110 and the host 102 can be reduced, and it is more effective to improve data input/output performance of the memory system 110. After the protocol control circuitry 298 confirms that the controller 130 is in the idle state, the controller 130 may output a selected unit of map information stored in the buffer to the host 102.

Figure 13:
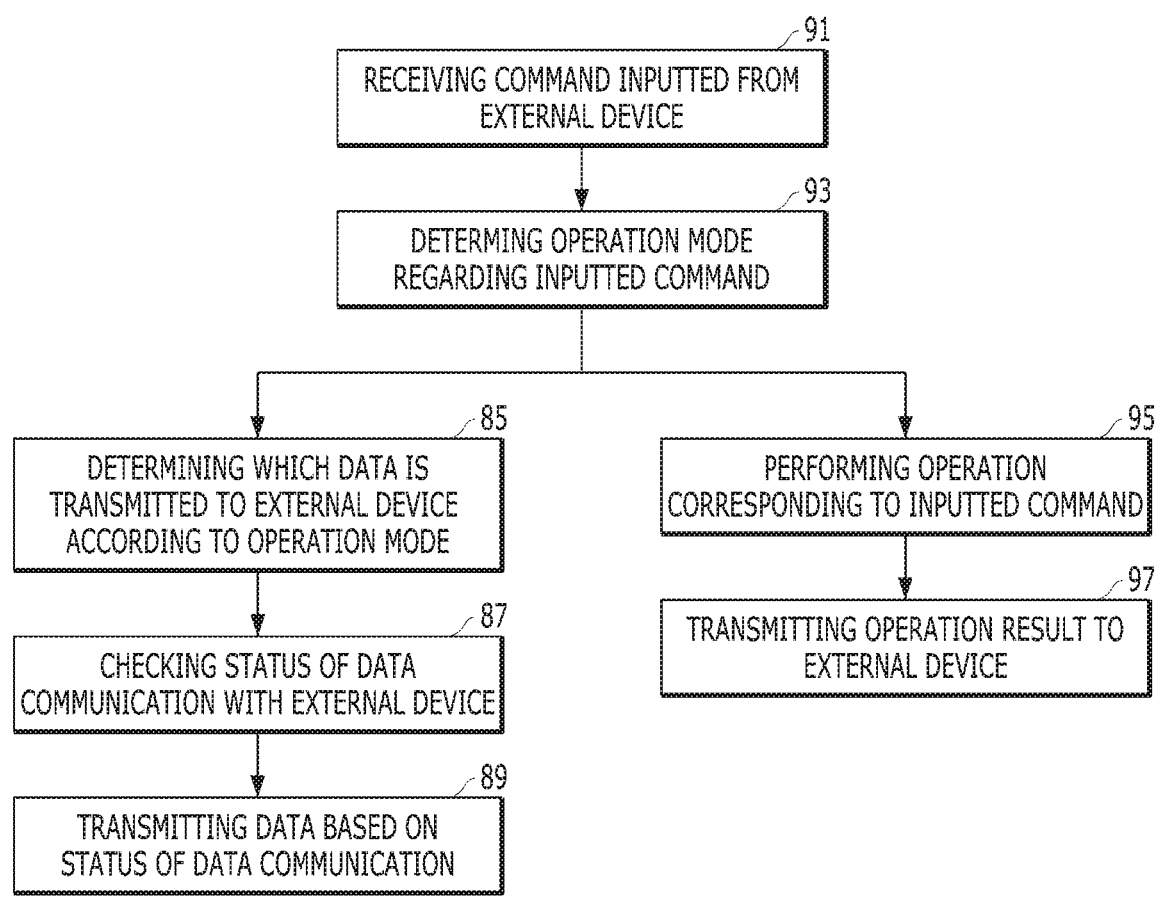
FIG. 13 shows an example method for operating a memory system based on an embodiment of the disclosure.

FIG. 13 illustrates an operation of a memory system according to an embodiment of the disclosure.

Referring to FIG. 13, a method for operating a memory system may include receiving a command inputted from an external device (step 91) and determining an operation mode regarding inputted command (step 93). Referring to FIGS. 1 to 9, an example of the command inputted from the external device may include a read command inputted from the host 102. The operation mode regarding the inputted command may be different in response to the logical address or the physical address inputted along with the read command. For example, the operation mode may be divided into a fast read operation and a general read operation.

When the operation mode of the command received by the memory system is determined (step 93), two operations, e.g., a foreground operation and a background operation, may be performed separately and independently. After the operation mode of the command is determined, the foreground operation including an operation corresponding to the command may be performed according to the operation mode (step 95). For example, either the fast read operation or the general read operation may be performed in the memory system 110 shown in FIGS. 1-3 and 9.

Thereafter, an operation result, i.e., a result of the foreground operation, may be transmitted to the external device (step 97). For example, either the fast read operation or the general read operation may be performed, and a piece of data read from the memory device 150 may be then transferred into the host 102.

In a step 85, as a background operation, information to be transmitted to the external device may be determined in response to the determined operation mode. For example, the transmitted information is determined according to which one of the fast read operation or the normal read operation was performed in response to a read command inputted from the host 102, or according to which map information corresponding to the general read operation is used for address translation. Depending on whether map information or the like is used for the address translation or whether map information is valid or updated, it is possible for the controller 130 to determine or select which map information is transferred into the host 102. After determining or selecting a unit of map information to be transmitted to the host 102, the controller 130 can reset or initialize data such as counts regarding the selected or determined map information.

In the background operation, when information to be transmitted to the external device is determined (step 85), the controller 130 may check an operation status of data communication with the external device (step 87). If the data communication is actively performed between the external device and the memory system 110, the controller 130 might not transmit the information to the external device. The controller 130 can delay a process for transmitting the selected or determined information to the external device to avoid interruption to transmit a piece of data as a result of data input/output (I/O) operation. Accordingly, the data input/output (I/O) speed of the memory system 110 might be not slowed down.

Thereafter, in response to an operation state of the data communication, the memory system 110 may transmit the selected or determined information to the external device (step 89). For example, when the memory system 110 is in an idle state, the memory system 110 may transmit a unit of map information, which has selected, collected or determined in advance, to the host 102.

As described above, the memory system 110 can separately and independently perform the foreground operation for data input/output (I/O) operation and the background operation to share map information with the host 102 so that a data input/output rate (e.g., I/O throughput) of the memory system 110 might be not decreased.

Figure 14:
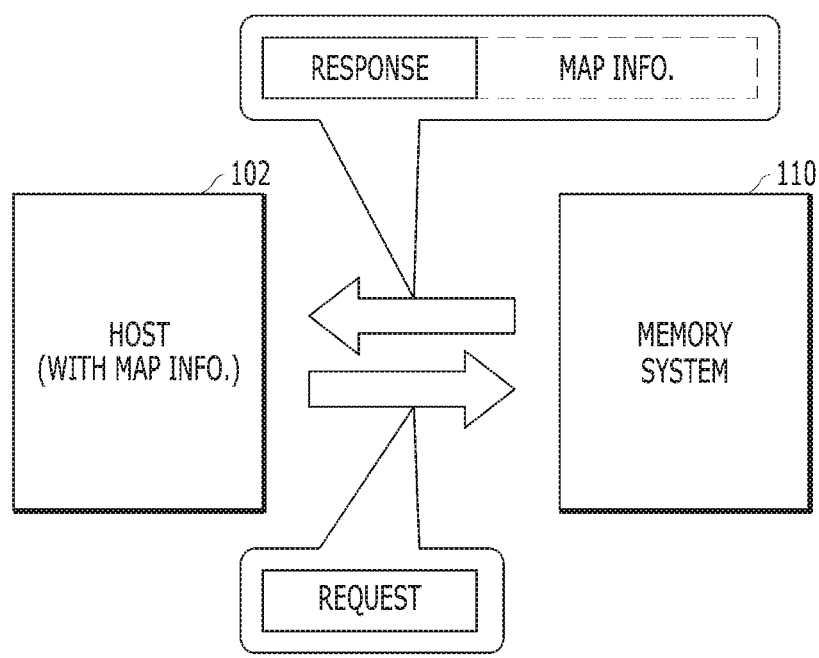
FIG. 14 describes an example of a transaction between a host and a memory system in a data processing system based on an embodiment of the disclosure.

FIG. 14 illustrates a second example of a transaction between a host and a memory system in a data processing system according to an embodiment of the disclosure.

Referring to FIG. 14, the memory system 110 may transfer map information (MAP INFO) to the host 102. The host 102 may request the map information (MAP INFO) from the memory system 110. The memory system 110 may use a response RESPONSE regarding the command of the host 102 to transfer the map information (MAP INFO). Herein, the response RESPONSE is a kind of messages or packets which is transmitted after the memory system completely performs an operation in response to a command inputted from the host 102.

In an embodiment, there may be no particular limitation on a response for transmitting map information. For example, the memory system 110 may transmit the map information to the host 102 by using a response corresponding to a read command, a write command, or an erase command.

The memory system 110 and the host 102 may exchange a command or a response with each other in a specific format set according to a predetermined protocol. For example, a format of the response RESPONSE may include a basic header, a result or a state according to success or failure of the command inputted from the host 102, and additional information indicating an operational state of the memory system 110. The memory system 110 may add or insert map information into the format of the response RESPONSE to transmit the map information to the host 102.

Figure 15:
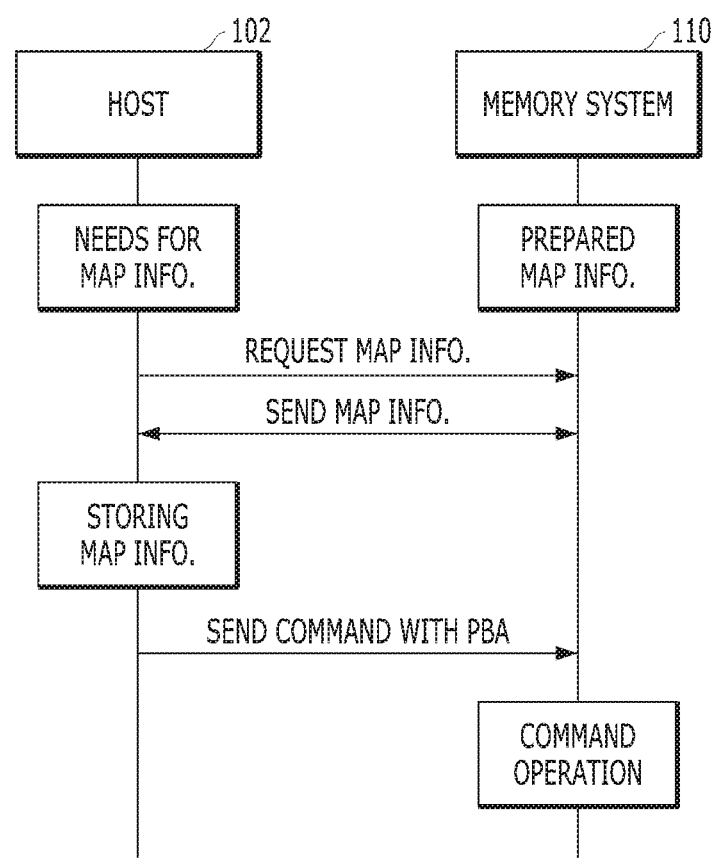
FIG. 15 illustrates an example operation of a host and a memory system based on an embodiment of the disclosure.

FIG. 15 illustrates a second operation between a host and a memory system according to an embodiment of the disclosure. FIG. 15 illustrates an operation where the host 102 first requests map information to the memory system 110 and then the memory system 110 transmits map information in response to a request of the host 102.

Referring to FIG. 15, needs for map information may occur at the host 102, or the memory system 110 may select or determine map information transmitted to the host 102 to prepare transfer of map information. For example, if the host 102 can allocate a space to store map information, or if the host 102 expects faster data input/output (I/O) of the memory system 110 in response to host's command, the host 102 can request the map information to the memory system 110. Needs may arise. In addition, needs for the map information may also be generated in the host 102 at user's request.

The host 102 may request map information to the memory system 110, and the memory system 110 may prepare map information in response to a request of the host 102 beforehand. In an embodiment, the host 102 may specifically request specific map information such as a specific range of map information to the memory system 110. In another embodiment, the host 102 may generally request map information from the memory system 110, and the memory system 110 may determine which map information is provided to the host 102.

After the memory system 110 may transfer prepared map information to the host 102, the host 102 may store transferred map information in an internal storage space, e.g., the host memory 106 described with reference to FIG. 4.

Using the stored map information, the host 102 may add the physical address PBA in a format of command COMMAND transmitted to the memory system 110 and transmit the format of command COMMAND including the physical address PBA. Then, the memory system 110 may use the physical address PBA inputted with the command COMMAND from the host 102 to perform an operation corresponding to the command COMMAND.

Figure 16:
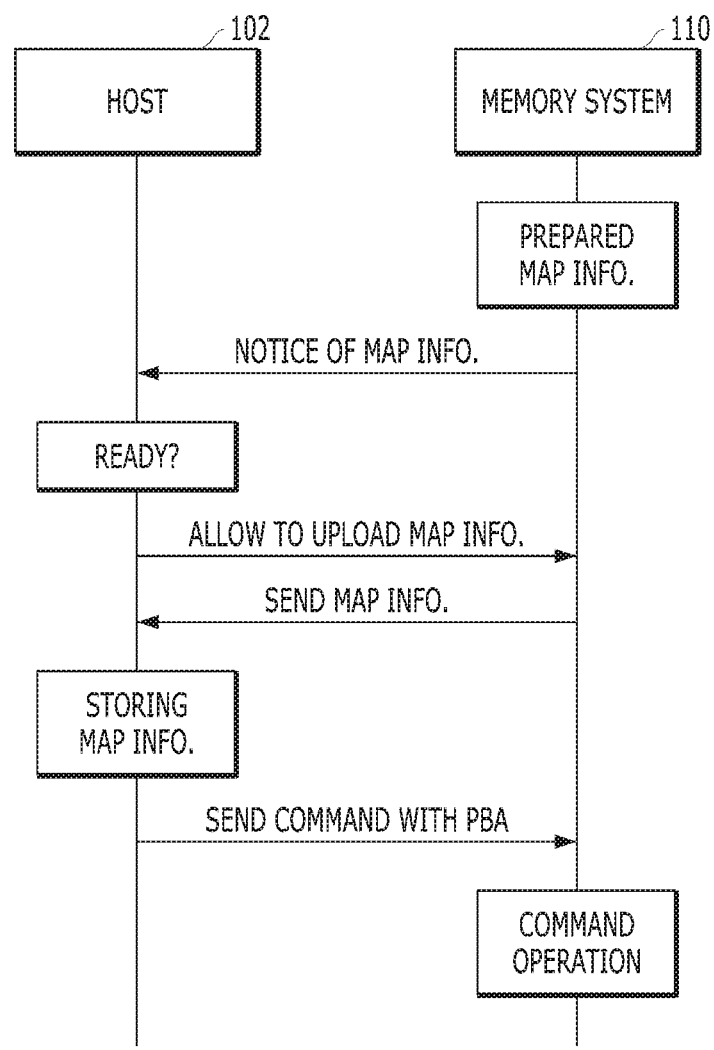
FIG. 16 shows an example operation of a host and a memory system based on an embodiment of the disclosure.

FIG. 16 illustrates a third operation between a host and a memory system based on an embodiment of the disclosure. In FIG. 16, the memory system 110 transmits an inquiry to the host 102 before transmitting map information. The host 102 determines whether to allow the transmission of the memory system 110 and sends the determination to the memory system 110. The memory system 110 transmits the map information based on the determination received from the host 102 and the host 102 receives the map information from the memory system 110.

Referring to FIG. 16, the memory system 110 may notify the host 102 of transmitting map information after determining which map information is transmitted. The host 102 can determine whether the host 102 can store the map information associated with the notification regarding transmission of the map information, which is delivered from the memory system 110. If the host 102 can receive and store the map information transmitted from the memory system 110, the host 102 can allow the memory system 110 to transfer the map information. In an embodiment, the memory system 110 may prepare map information to be transmitted, and then transmit the prepared map information to the host 102.

The host 102 may store the received map information in an internal storage space (e.g., the host memory 106 described with reference to FIG. 4). The host 102 may include a physical address PBA into a command to be transmitted to the memory system 110 after performing a mapping operation based on the stored map information.

The memory system 110 may check whether the physical address PBA is included in the command transmitted from the host 102, and apply the physical address PBA to perform an operation corresponding to the command.

Regarding the transmission of the map information, the host 102 can initiatively determine a transfer timing of map information between the host 102 and the memory system 110 described with reference to FIG. 15. But, the memory system 110 can initiatively determine a transfer timing of map information between the host 102 and the memory system 110 described with reference to FIG. 16 may be performed. According to an embodiment, it can be different how the memory system 110 performs the transmission of the map information. According to an operational condition or environment, the memory system 102 and the host 110 may selectively use a method for transmitting map information described with reference to FIGS. 15 and 16.

Figure 17:
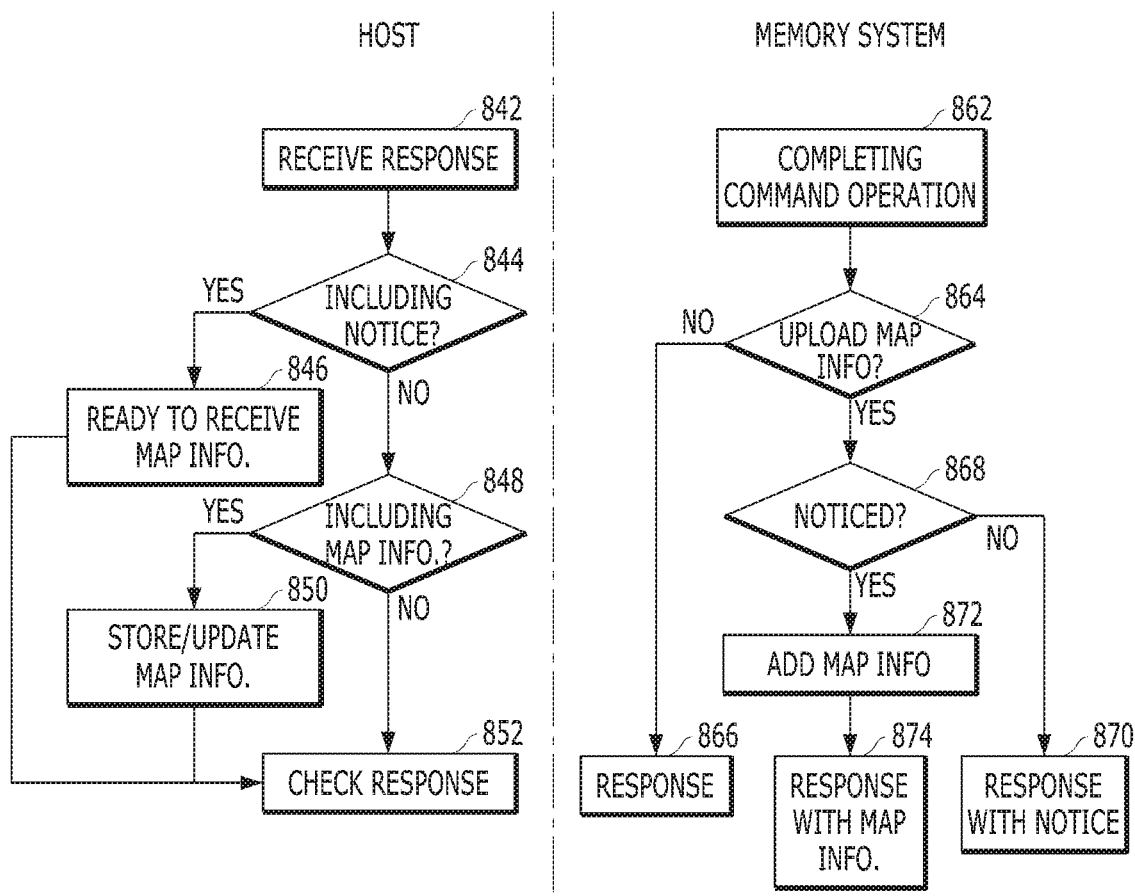
FIG. 17 illustrates an example operation of a host and a memory system based on an embodiment of the disclosure.

FIG. 17 illustrates a fourth operation between a host and a memory system according to an embodiment of the disclosure. FIG. 17 illustrates a case where the memory system attempts to transmit map information to the host while the host and the memory system are operatively engaged with each other.

Referring to FIG. 17, the memory system may determine whether an operation corresponding to a command transmitted from a host is completed (step 862). After the operation corresponding to the command is completed, the memory system may check whether there is map information to be transmitted to the host before transmitting a response corresponding to the command (step 864). If there is no map information to be transmitted to the host (NO in step 864), the memory system may transmit a response RESPONSE including information (e.g., success or failure) regarding whether the operation corresponding to the command sent from the host has completed (step 866).

When the memory system recognizes map information to be transmitted to the host (YES of step 864), the memory system may check whether a notice NOTICE for transmitting the map information has been made (step 868). The notification may be similar to that described with reference to FIG. 16. When the memory system wants to send the map information but the notification regarding the memory system sending the map information to the host has not been made in advance (NO of step 868), the memory system can add the notice NOTICE to the response RESPONSE. In addition, the memory system may transmit the response RESPONSE with the notice NOTICE to the host (step 870).

When the notice NOTICE for inquiring transmission of the map information has already been made (YES of step 868), the memory system may add the map information to the response (step 872). Thereafter, the memory system may transmit a response including the map information (step 874). According to an embodiment, the host can send a permission for transmitting the map information to the memory system before the memory system transmits the map information to the host.

The host may receive at least one of the response RESPONSE, the response including the notice (RESPONSE WITH NOTICE) and the response including the map information (RESPONSE WITH MAP INFO.), which are transmitted by the memory system (step 842).

The host may verify whether the received response includes the notice (step 844). If the received response includes the notice (YES of step 844), the host can prepare to receive and store map information that can be delivered later (step 846). Thereafter, the host may check the response corresponding to a command previously transmitted to the memory system (step 852). For example, the host can check the response to confirm whether an operation corresponding to a command previously sent is succeeded or failed in the memory system.

When the received response does not include the notice (NO of step 844), the host may determine whether the response includes map information (step 848). When the response does not include map information (NO of step 848), the host may check the response corresponding to the command previously transmitted to the memory system (step 852).

When the received response includes map information (YES at step 848), the host may store the map information included in the response within a storage space or update the map information already stored in the storage space (step 850). Then, the host may check the response corresponding to the command previously transmitted to the memory system (step 852).

Figure 18:
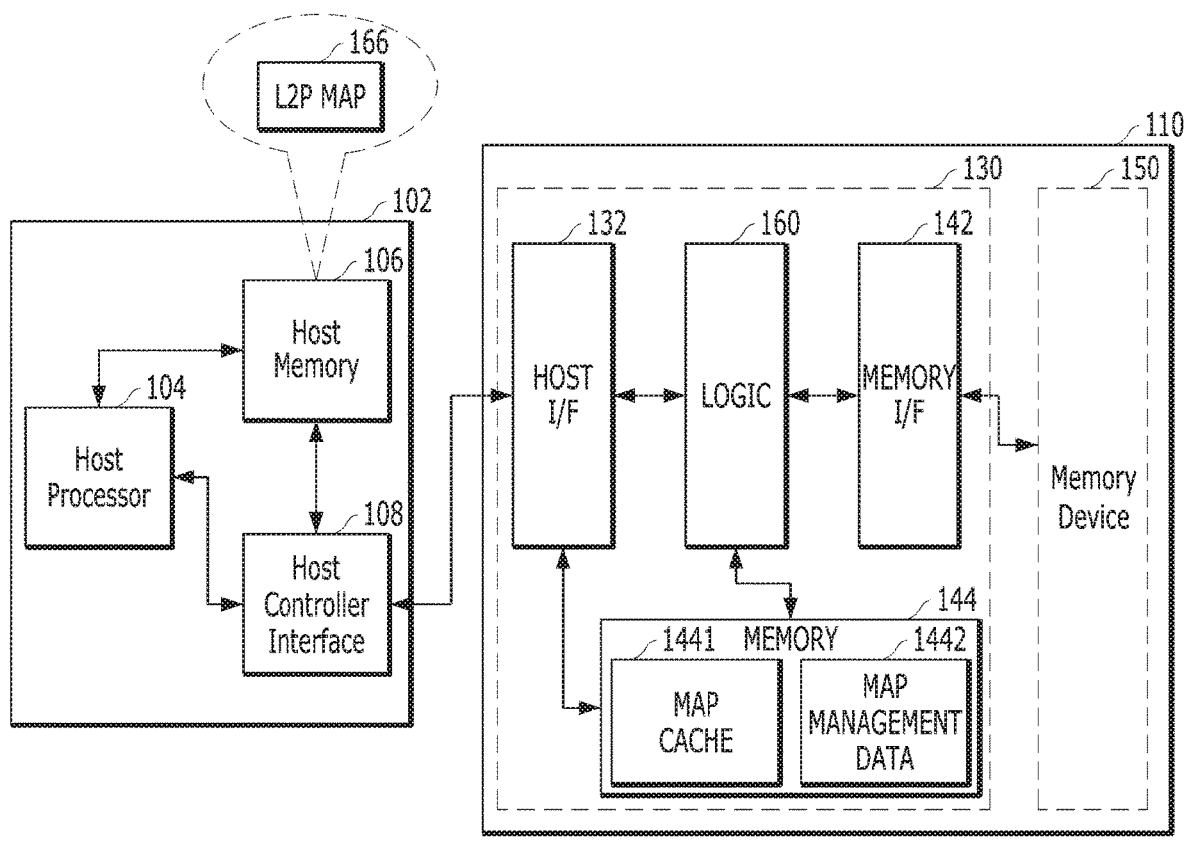
FIG. 18 illustrates a host including a host memory as a cache device for storing meta data and a memory system.

FIG. 18 illustrates a host including a host memory used as a cache device for storing meta data, and a memory system.

Referring to FIG. 18, the host 102 may include a host processor 104, a host memory 106 and a host controller interface 108. The memory system 110 may include a controller 130 and a memory device 150. The controller 130 and the memory device 150 which are described with reference to FIG. 3 may be similar to the controller 130 and the memory device 150 which are described with reference to FIGS. 1 to 3.

Hereafter, the following descriptions will be focused on contents which can technically distinguish the controller 130 and the memory device 150 which are described with reference to FIG. 18, and the controller 130 and the memory device 150 which have been described with reference to FIGS. 1 to 3. In particular, a logic block 160 within the controller 130 may correspond to a flash translation layer (FTL) 140 described with reference to FIGS. 1 to 3. In an embodiment, however, the logic block 160 within the controller 130 may further perform a role and function which are not included in the FTL 140.

The host 102 may include the host processor 104 having higher performance and the host memory 106 having a higher capacity, than the memory system 110 interconnected to the host 102. The host processor 104 and the host memory 106 are less spatially limited unlike the memory system 110, and can be upgraded in hardware, if necessary. Therefore, the memory system 110 may utilize resources of the host 102 to increase operation efficiency.

As the amount of data which can be stored in the memory system 110 is increased, the amount of meta data corresponding to the data stored in the memory system 110 is also increased. Since the space of the memory 144 in which the controller 130 can load meta data is limited, the increase in the amount of meta data imposes a burden on the operation of the controller 130. For example, since the internal space of the memory 144 in which the meta data can be allocated is limited, the controller 130 may load a part of the meta data, but not all of the meta data. If a position to be accessed by the host 102 is not included in the loaded part of the meta data, the controller 130 needs to re-store the loaded part of the meta data in the memory device 150 when the loaded part of the meta data has been updated. Furthermore, the controller 130 reads meta data from the memory device 150. The meta data may correspond to the position to be accessed by the host 102. Such operations are necessarily performed in order for the controller 130 to perform a read or write operation requested by the host 102, but degrade the operation performance of the memory system 110.

In an embodiment, the storage space of the host memory 106 may be several tens to several thousands of times greater than that of the memory 144 which can be used by the controller 130. Therefore, the memory system 110 may transfer meta data 166 (e.g., logical-to-physical (L2P) map data) used by the controller 130 to the host memory 106, such that the host memory 106 can be used as a cache memory for an address translation process performed by the memory system 110. In this case, the host 102 may not transfer a logical address with a command to the memory system 110, but translates a logical address into a physical address based on the meta data 166 stored in the host memory 106. Further, the host 102 may transfer the physical address with the command to the memory system 110. The memory system 110 may omit the process of translating a logical address into a physical address, and access the memory device 150 based on the transferred physical address. In this case, since the above-described operation burden which occurs while the controller 130 uses the memory 144 may be removed, the operation efficiency of the memory system 110 may be significantly improved.

Although the memory system 110 transfers the meta data 166 to the host 102, the memory system 110 may manage the source of the meta data 166. In other words, the memory system 110 may update, erase and generate the meta data 166. The controller 130 may perform a background operation such as garbage collection or wear levelling according to an operation state of the memory device 150, and decide a physical position (i.e, physical address) at which data transferred from the host 102 is to be stored in the memory device 150. Thus, the physical address corresponding to the data within the memory device 150 may be changed. Therefore, the source of the meta data 166 may be managed by the memory system 110.

That is, when the memory system 110 determines that the meta data 166 transferred to the host 102 needs to be corrected and updated during the process of managing the meta data 166, the memory system 110 may request the host 102 to update the meta data 166. The host 102 may update the meta data 166 stored in the host memory 106 in response to a request of the memory system 110. Through the update operation, the meta data 166 stored in the host memory 106 may be maintained at the latest status. Although the host controller interface 108 translates an address to be transferred to the memory system 110 using the meta data 166 stored in the host memory 106, no problems occur in the operation.

The meta data 166 stored in the host memory 106 may include first mapping information for checking a physical address corresponding to a logical address. In some an embodiment, the meta data 166 for associating the logical address with the physical address may include the first mapping information for checking the physical address corresponding to the logical address and second mapping information for checking the logical address corresponding to the physical address. The meta data 166 may include the first mapping information between the two pieces of information. The second mapping information may be mainly used for an internal operation of the memory system 110, and may not be used for an operation in which the host 102 stores data in the memory system 110 or reads data corresponding to a specific logical address from the memory system 110. In an embodiment, the memory system 110 may not transfer the second mapping information to the host 102.

The controller 130 may store the first or second mapping information in the memory device 150 while managing (i.e., generating, deleting or updating) the first or second mapping information. Since the host memory 106 is a volatile memory device, the meta data 166 stored in the host memory 106 may disappear when a specific event occurs, for example, when power supplied to the host 102 and the memory system 110 is removed. Therefore, the controller 130 may not only retain the meta data 166 stored in the host memory 106 at the latest status, but also store the latest first or second mapping information in the memory device 150.

When the memory system 110 transfers a map segment to the host 102 whenever map data regarding the map segment is changed, it may cost a lot of money and take a lot of time. In order to address these concerns, the memory system 110 manages the map segment and transfers the map segment to the host 102, using a read request count and a map miss count. Therefore, the memory system 110 may selectively transmit a map segment, including a logical address which is frequently referred to, to the host 102. In this regard, the embodiment will be briefly described with reference to FIG. 19.

Figure 19:
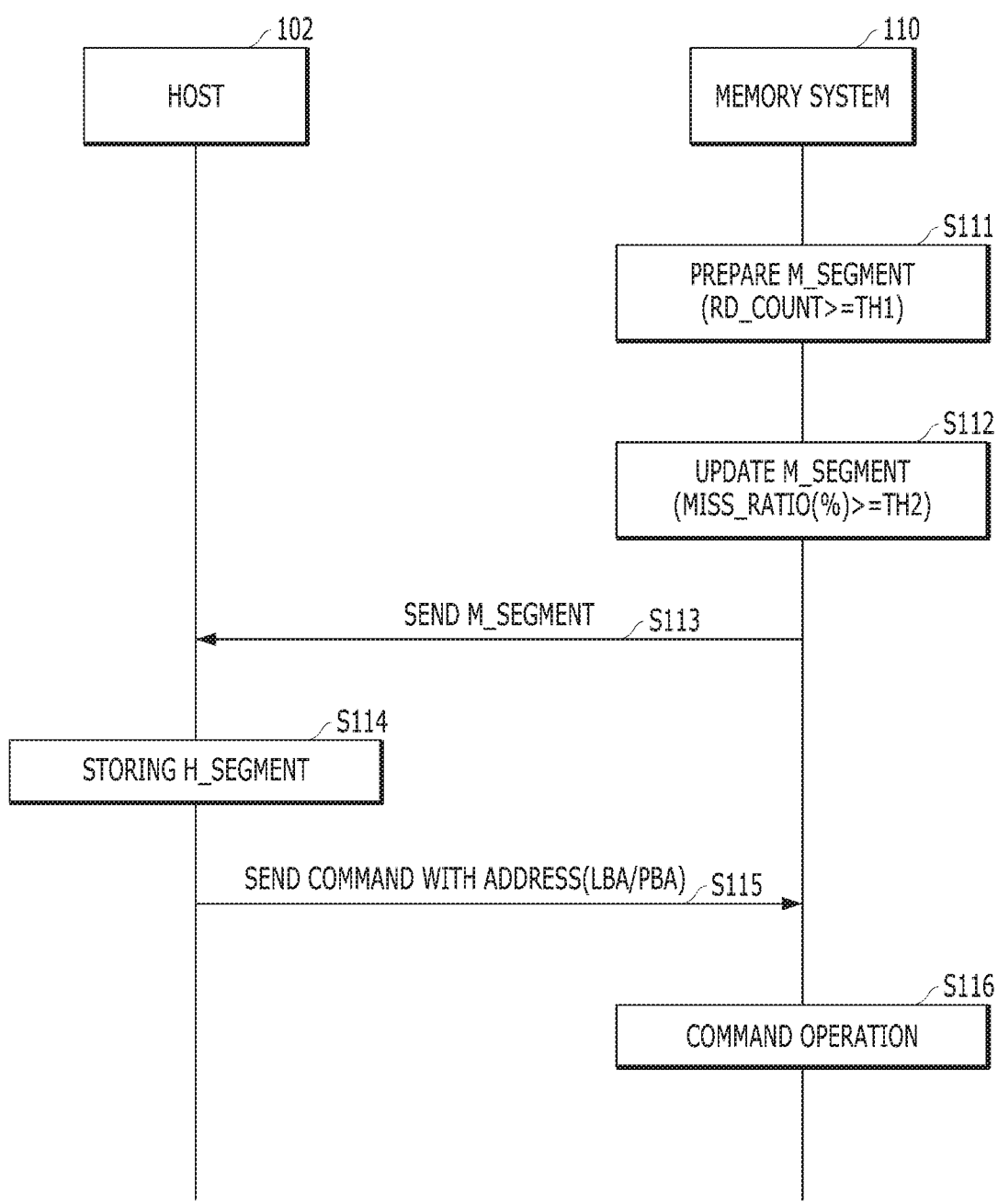
FIG. 19 is a diagram illustrating a method for sharing map data in accordance with an embodiment of the disclosure.

FIG. 19 illustrates a process in which the memory system 110 requests the host 102 to transfer map data, and the host 102 receives the map data in response to the request of the memory system 110.

Referring to FIG. 19, one or more memory map segments M_SEGMENT which are accessed by the host 102 at a high frequency may be prepared in the memory 144, to improve the read performance of the memory system 110, in step S111. That is, the memory system 110 may increase a read count RD_CNT for the memory map segment M_SEGMENT based on a logical address in a read request from the host 102. Furthermore, the memory system 110 may increase a total read count ALL_RD_CNT whenever a read request is transferred from the host 102. The memory system 110 may prepare a memory map segment M_SEGMENT whose read count RD_CNT is greater than or equal to a first threshold TH1.

In steps S112 and S113, when a map miss ratio MISS_RATIO is greater than or equal to a second threshold TH2, the memory system 110 may send the sorted memory map segment M_SEGMENT to the host 102. The map miss ratio MISS_RATIO may indicate a percentage calculated based on the total read count ALL_RD_CNT and a map miss count MISS_CNT. The map miss count MISS_CNT may be counted when the memory system 110 cannot find mapping information corresponding to a logical address LBA received from the host 102 from the map cache 1441. That is, the map miss count MISS_CNT may indicate the number of times that a read request which does not include a valid physical address is received.

A reason why the memory system 110 uses the map miss ratio to provide the sorted memory map segment M_SEGMENT to the host 102 is as follows. When the sorted memory map segment M_SEGMENT is unconditionally provided to the host 102 because the access frequency by the host 102 is high, an upload process may be continuously added to cause an overhead related to the data transmitting and receiving process between the host 102 and the memory system 110. Therefore, the performance of the data processing system may be degraded.

In step S114, the host 102 may store one or more memory map segments M_SEGMENT received from the memory system 110 as a host map segment H_SEGMENT in the internal storage space thereof (for example, the host memory 106 of FIG. 2).

In step S115, the host 102 may add a physical address PBA into a command transmitted to the memory system 110 based on the map information. In the mapping operation, the host 102 can search for and find the physical address PBA in the map information stored in host map segment H_SEGMENT, based on a logical address corresponding to a command transmitted into the memory system 110. When the physical address exists and is found, the host 102 may transmit the command with the logical address and the physical address into the memory system 110.

In step S116, the memory system 110 may perform the corresponding operation using the command and the logical and physical addresses LBA and PBA.

Figure 20:
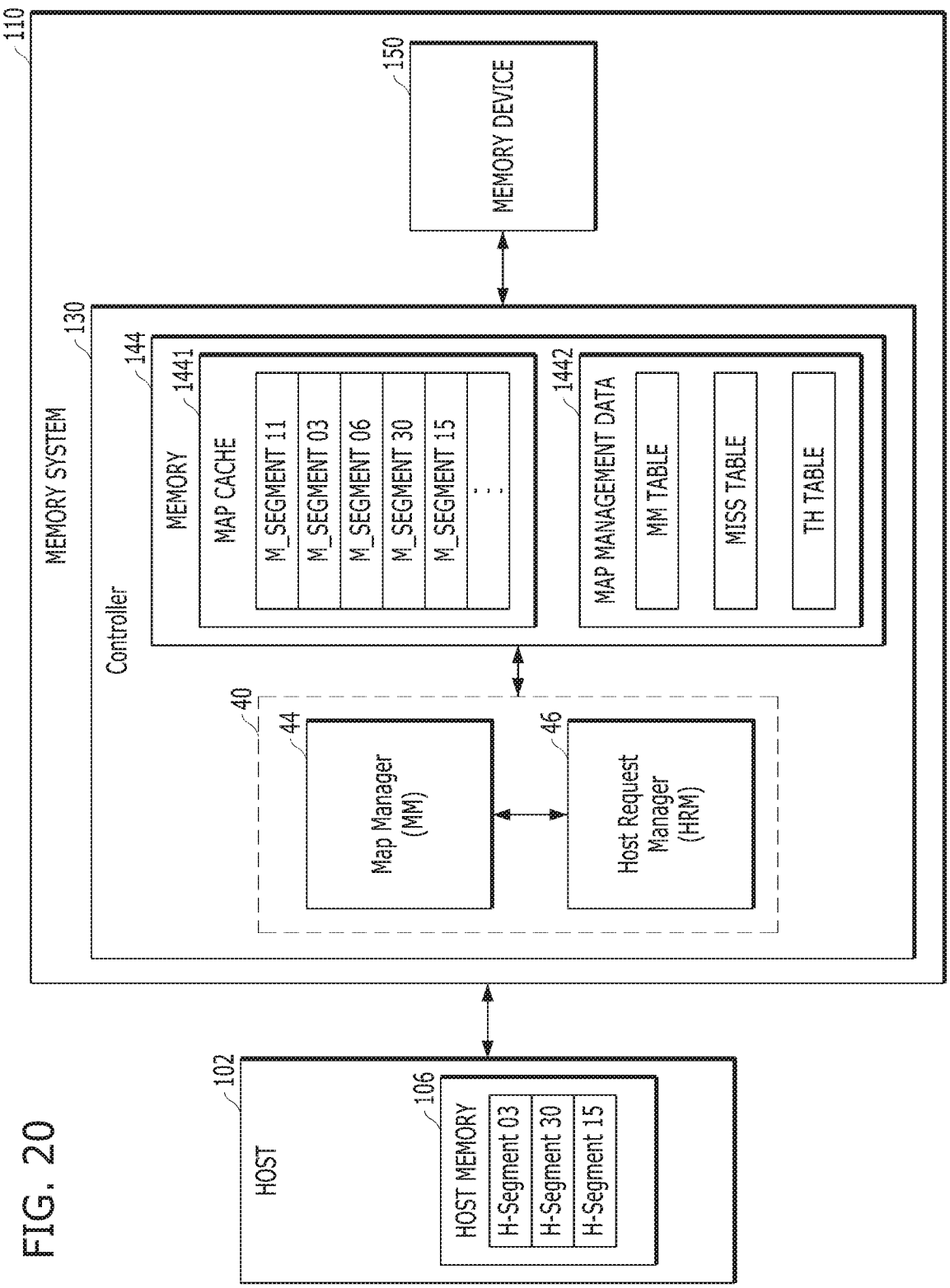

FIGS. 20 and 21 are diagrams illustrating an operation of a data processing system in accordance with an embodiment of the disclosure.

Before the operation of FIGS. 20 and 21 is described, the data processing system 100 may include the host 102 and the memory system 110. The host 102 and the memory system 110 may be interconnected to each other. The host 102 may be considered as a computing device, and implemented in the form of a mobile device, a computer, or a server. The memory system 110 may receive a command from the host 102, and store or output data in response to the received command.

The memory system 110 may include the memory device 150 including a storage space having nonvolatile memory cells and the controller 130 for controlling the memory device. For example, the memory system 110 may be implemented in the form of a flash memory, or a solid state drive (SSD).

In order to store data requested by the host 102 in the storage space including the nonvolatile memory cells, the memory system 110 may perform mapping between a file system used by the host 102 and the storage space including the nonvolatile memory cells. For example, an address based on the file system used by the host 102 may be referred to as a logical address, and an address in the memory device 150 including the nonvolatile memory cells may be referred to as a physical address.

For example, the controller 130 may store a plurality of map data L2P in the memory 144 and a plurality of memory blocks of the memory device 150. The plurality of map data L2P may be used to indicate a mapping relationship between a logical address and a physical address. In an embodiment, one logical address may be associated with one physical address (or physical location), or associated with a plurality of physical addresses (or physical locations). The map data L2P may be associated with one or more physical addresses corresponding to one logical address. The plurality of map data L2P may constitute one map segment.

The map segment may be considered as the unit of map information transferred between the controller 130 and the memory device 150. For example, when the controller 130 requires a physical address corresponding to a specific logical address, the controller 130 may request map data L2P for the corresponding logical address from the memory device 150. In this case, the controller 130 may not request one map data L2P, but may request a map segment as a plurality of map data L2P for a preset range of logical addresses including the corresponding logical address. Further, the memory device 150 may transmit the corresponding map segment to the controller 130. When specific map data L2P is updated, the controller 130 may update the map data L2P in the map segment loaded to the memory 144, and then program the updated map segment to the memory device 150 at a specific time point.

In an embodiment, the size of the map segment may differ depending on a method for deciding a physical address within the memory system 110, a method for programming data within the memory system 110, the size of blocks within the memory system 110, and the size of each page.

When the host 102 provides a logical address with a read request to the controller 130, the controller 130 may retrieve a physical address corresponding to the logical address based on one or more map segments stored therein, and then output data stored at the retrieved physical address to the host 102.

If the physical address retrieving operation performed by the controller 130 can be performed by the host 102, the time required for the controller 130 to output data corresponding to the read request provided by the host 102 may be shortened. The host 102 may store map data or directly access map data in order to retrieve a physical address and to provide the retrieved physical address to the controller 130.

Referring to FIG. 20, the controller 130 may include a map manager (MM) 44, a host request manager (HRM) 46 and the memory 144. The controller 130 may provide a memory map segment M_SEGMENT, which is selected from among a plurality of memory map segments by the MM 44, to the host 102.

The HRM 46 may increase a total read count ALL_RD_CNT whenever receiving a read request related to each of the memory map segments from the host 102. The HRM 46 updates the total read count ALL_RD_CNT of a map miss information table MISS TABLE in map management data 1442 through the MM 44. The total read count ALL_RD_CNT may indicate the number of read commands transferred from an external device (for example, host) during a preset operation interval. The preset operation interval may correspond to an interval for calculating the map miss ratio MISS_RATIO, and may correspond to an interval for deciding map data or a map segment which is transferred to the host 102.

In order to selectively provide one or more memory map segments to the host 102, the MM 44 may manage a plurality of memory map segments using map management data 1442. A reason why the MM 44 manages the plurality of memory map segments through the map management data 1442 is that it may be difficult for the host 102 to allocate the entire storage space within the host memory 106 in order to store the entire map data managed by the memory system 110. The storage capacity of the host memory 106 included in or used by the host 102 is greater than the storage capacity of the memory 144 used by the controller 130, but a region allocated for the memory system 110 within the host memory 106 may be limited. Therefore, the memory system 110 sorts a memory map segment including a logical address which is accessed by the host 102 at a high frequency. When the memory map segment is unconditionally provided to the host 102 because the access frequency by the host 102 is high, an upload process is continuously added. Thus, the performance may be degraded. Therefore, the map management data 1442 may be used to determine whether to upload the memory map segment, in consideration of the map miss ratio.

Referring to FIG. 21, the map management data 1442 may include a map management table MM TABLE, a map miss information table MISS TABLE and a threshold information table TH TABLE.

The map management table MM TABLE may include a field for identifier information (i.e., M_SEGMENT LIST) indicating memory map segments in response to respective indexes, a field for a read count RD_CNT corresponding to each of the memory map segments M_SEGMENT loaded to the memory 144, and a field for a candidate flag CND_FLAG.

The read count RD_CNT may indicate a value obtained by counting read commands for logical addresses in the memory map segment. That is, the MM 44 may increase the read count of the memory map segment based on a logical address in a read request of the host 102, received through the host I/F 132. The read count RD_CNT may be distinguished from the read count for each of the memory blocks within the memory device 150, which is increased when a read operation is performed on the memory block, and indicates the operation state of the memory block.

The candidate flag CND_FLAG indicates information for representing a memory map segment sorted through the read count RD_CNT in order to upload the memory map segment to the host 102. In the embodiment, the candidate flag CND_FLAG may be expressed as one-bit data, i.e. a value of 0 or 1. For example, the candidate flag CND_FLAG is changed from '0' to '1' or from '1' to '0'. In the embodiment, when the candidate flag is '1', it may indicate that the corresponding memory map segment is a memory map segment to be uploaded to the host 102.

The map miss information table MISS TABLE may include a field for the total read count ALL_RD_CNT, a field for the map miss count MISS_CNT and a field for the map miss ratio (%) MISS_CNT_RATIO.

The total read count ALL_RD_CNT may indicate the total read count obtained by counting read requests related to the respective memory map segments received from the host 102. The total read count ALL_RD_CNT may be increased by the HRM 46 whenever a read request is received from the host 102.

The map miss count MISS_CNT may be counted when the MM 44 cannot find mapping information corresponding to a logical address LBA received from the host 102 from the map cache 1441.

The map miss ratio MISS_RATIO is a percentage calculated by the MM 44 using the total read count ALL_RD_CNT and the map miss count MISS_CNT. That is, the map miss ratio MISS_RATIO is a percentage calculated to indicate the ratio of the map miss count MISS_CNT to the total read count ALL_RD_CNT.

The threshold information table TH TABLE may include a first threshold and a second threshold. The first threshold for the read count (i.e., RD_CNT TH (TH1)) may serve as a reference value for sorting a memory map segment to be transferred to the host 102. The second threshold for the map miss ratio (i.e., MISS_CNT TH (TH2)) may serve as a reference value for deciding whether to upload the sorted memory map segment.

Referring back to FIG. 20, the MM 44 may prepare one or more memory map segments M_SEGMENT accessed by the host 102 at high frequency, in order to improve the read performance of the memory system 110. That is, the MM 44 may calculate a read count RD_CNT for each of the memory map segments M_SEGMENT based on a logical address associated with the read request from the host 102. The MM 44 may prepare the memory map segment M_SEGMENT by comparing the read count RD_CNT to the first threshold TH1 in each random period.

For example, as shown in FIG. 21, when the first threshold TH1 is 500, the MM 44 checks whether the read count RD_CNT of a memory map segment 11 corresponding to an index 1 is greater than or equal to the first threshold TH1. Since the check result indicates that the read count RD_CNT of the memory map segment 11 is 30, the memory map segment 11 cannot be selected as a memory map segment to be uploaded to the host 102.

On the other hand, when the first threshold TH1 is 500, the MM 44 checks whether the read count RD_CNT of a memory map segment 03 corresponding to an index 2 is greater than or equal to the first threshold TH1. Since the check result indicates that the read count RD_CNT of the memory map segment 03 is 2000, the memory map segment 03 may be selected as a memory map segment to be uploaded to the host 102. Therefore, the candidate flag value is changed from 0 to 1.

Through such an operation, the MM 44 sorts a memory map segment 13, a memory map segment 30 and a memory map segment 15 into memory map segments to be uploaded to the host 102, in order to prepare the memory map segments.

When determining that there is a memory map segment M_SEGMENT to be uploaded to the host 102 after an operation for the read request is completed, the MM 44 checks whether the map miss ratio (%) MISS_RATIO is greater than or equal to the second threshold TH2. When the map miss ratio MISS_RATIO is greater than or equal to the second threshold TH2, the MM 44 may provide the sorted memory map segments M_SEGMENT to the host 102. The reason to decide whether to upload the memory map segments through the map miss ratio (%) MISS_RATIO is that, when the memory map segments are unconditionally provided to the host 102 because the access frequency by the host 102 is high, the upload process is continuously added to degrade the performance. For example, when the second threshold is 25% and the current map miss ratio (is 30%, the map hit ratio is low because the current map miss ratio (%) is greater than or equal to the second threshold TH2. Therefore, the MM 44 may transfer the one or more memory map segments M_SEGMENT to the host 102.

Figure 22:
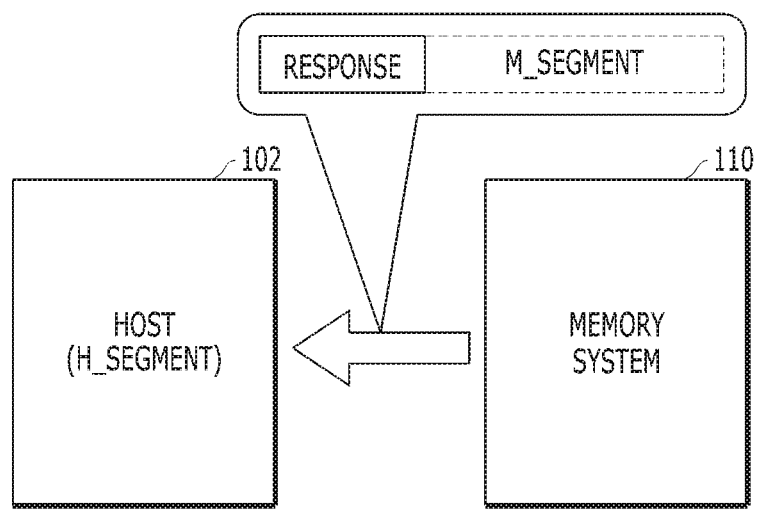
FIG. 22 is a diagram illustrating a transaction between a host and a memory system in a data processing system in accordance with the embodiment of the disclosure.

When a notice that the MM 44 will transfer the memory map segment M_SEGMENT to the host 102 is not sent in advance even though the MM 44 intends to transmit the memory map segment M_SEGMENT, the MM 44 may add the notice to a response RESPONSE and transfer the response RESPONSE to the host 102, as shown in FIG. 22.

When the notice that the MM 44 will transfer the map data has been already sent, the MM 44 may add the memory map segment M_SEGMENT to the response RESPONSE. The MM 44 may transmit the response RESPONSE including the memory map segment M_SEGMENT.

Then, the MM 44 not only resets the total read count ALL_RD_CNT and the map miss count MISS_CNT, but also resets the candidate flag CND_FLAG indicating a candidate memory map segment M_SEGMENT to be uploaded to the host 102.

On the other hand, when the map miss ratio (%) MISS_RATIO is less than the second threshold TH2, the MM 44 may transmit a response RESPONSE including information on whether an operation corresponding to a command from the host 102 has been completed (i.e., success or fail).

The host 102 may include the host processor 104, the host memory 106 and the host controller interface 108. The host processor 104 may receive one or more of a response RESPONSE from the memory system 110 through the host controller interface 108, a response with a notice RESPONSE WITH NOTICE and a response with map data RESPONSE WITH MAP INFO. The host processor 104 may check whether the notice is included in the received response. When the notice is included in the received response, the host 102 may prepare to receive and store a memory map segment M_SEGMENT which may be transferred later. Then, the host processor 104 may check a response corresponding to a previous command. For example, the host processor 104 may check the response to determine whether the previous command succeeded or failed. When no notice is included in the received response, the host processor 104 may check whether the memory map segment M_SEGMENT is included in the response. When the memory map segment M_SEGMENT is not included in the received response, the host processor 104 may check the response corresponding to the previous command. When the memory map segment M_SEGMENT is included in the received response, the host processor 104 may store the memory map segment M_SEGMENT in the response as a host map segment H_SEGMENT in the host memory 106, or update the host map segment H_SEGMENT which is already stored in the host memory 106. The host processor 104 may check the response corresponding to the previous command. For example, the host processor 104 may check the response to determine whether the previous command succeeded or failed.

FIG. 22 is a diagram illustrating a transaction between the host 102 and the memory system 110 in the data processing system in accordance with the embodiment of the disclosure.

Referring to FIG. 22, the memory system 110 may transfer a memory map segment M_SEGMENT to the host 102. The memory system 110 may transfer the memory map segment M_SEGMENT using a response RESPONSE to the host 102.

The response for transferring map data may not be specifically limited. For example, the memory system 110 may transfer the memory map segment M_SEGMENT to the host 102, using a response corresponding to a read request, a response corresponding to a write command, or a response corresponding to an erase command.

The memory system 110 and the host 102 may exchange requests and responses based on a unit format which is set according to a preset protocol. For example, the response RESPONSE may include a header, information indicating a success or fail on a request provided by the host 102, and additional information indicating the state of the memory system 110. The memory system 110 may include map data in the response RESPONSE and transfer the response RESPONSE to the host 102. This configuration will be described in detail with reference to FIGS. 23 and 24.

Figure 23:
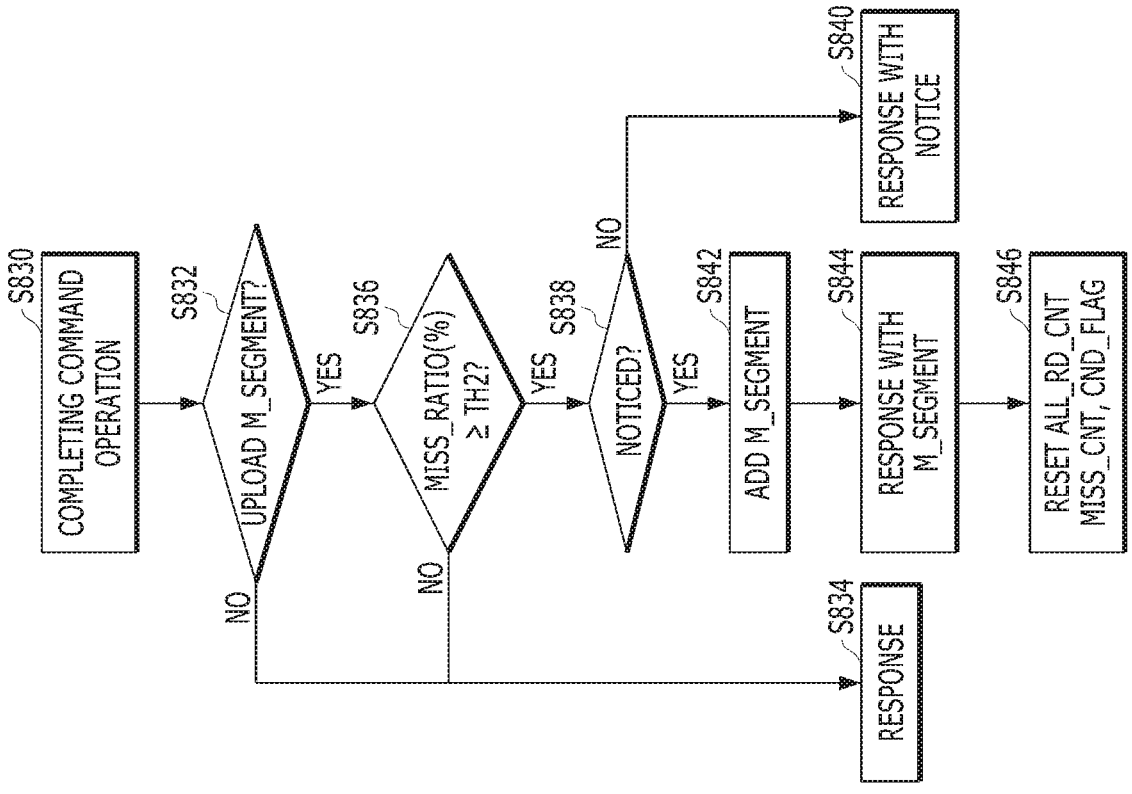
FIG. 23 is a flowchart illustrating an operation of a host and a memory system in accordance with an embodiment of the disclosure.
Figure 23:
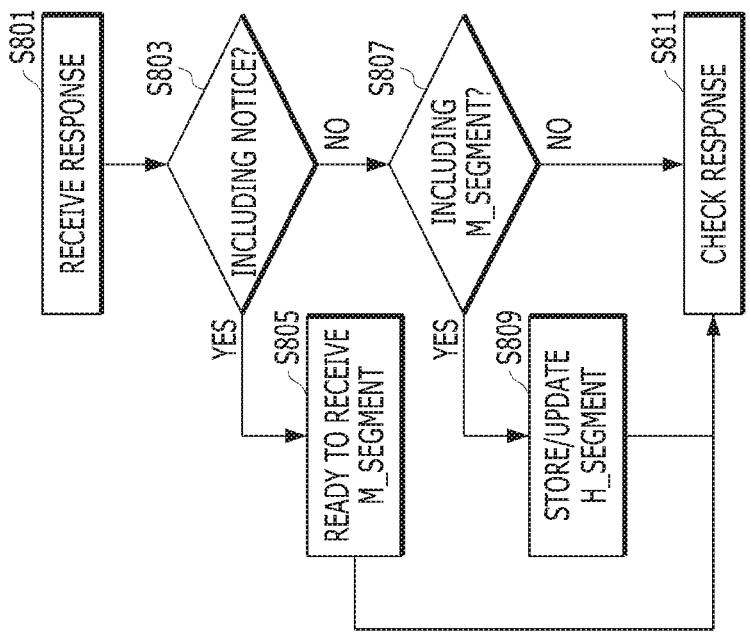

FIG. 23 is a flowchart illustrating an operation of the host and the memory system in accordance with an embodiment of the disclosure. Steps S830 to S846 illustrate the case in which the memory system 110 provides a memory map segment M_SEGMENT after completing an operation corresponding to a request from the host 102. Steps S801 to S811 illustrate the case in which the host 102 stores a memory map segment M_SEGMENT received with a response from the memory system 110.

Referring to FIG. 23, the controller 130 may check whether an operation corresponding to a command from the host 102 is completed, in step S830. After the operation corresponding to the command is completed, the controller 130 may check whether there is a memory map segment M_SEGMENT to be transmitted to the host 102, before transmitting the response RESPONSE corresponding to the command, in step S832. The method for sorting memory map segments M_SEGMENT to be provided to the host 102 will be described with reference to FIG. 24.

When there is no memory map segment M_SEGMENT to be provided to the host 102 ("NO" in step S832), the controller 130 may transmit a response RESPONSE including information on whether the operation corresponding to the command from the host 102 has been completed (i.e., success or fail), in step S834.

When there is a memory map segment M_SEGMENT to be provided to the host 102 ("YES" in step S832), the MM 44 checks whether the map miss ratio (%) MISS_RATIO is greater than or equal to the second threshold TH2, in step S836.

When the map miss ratio (%) MISS_RATIO is less than the second threshold TH2 ("NO" in step S836), the controller 130 may transmit the response RESPONSE including the information on whether the operation corresponding to the command transmitted from the host 102 has been completed (i.e., success or fail), in step S834.

On the other hand, when the map miss ratio (%) MISS_RATIO is greater than or equal to the second threshold ("YES" in step S836), the controller 130 may check whether a notice NOTICE that the controller 130 will transmit the memory map segment M_SEGMENT to the host 102 was sent, in step S838. The notice NOTICE may be similar to that described with reference to FIG. 22. For example, when the second threshold TH2 of the map miss ratio (%) MISS_RATIO is 25% and the current map miss ratio (%) MISS_RATIO is 30%, the map hit ratio is low because the current map miss ratio (%) MISS_RATIO is greater than or equal to the second threshold TH2. Therefore, the controller 130 may transfer one or more memory map segments M_SEGMENT to the host 102.

When the notice that the controller 130 will transmit the memory map segment M_SEGMENT to the host 102 was not sent in advance ("NO" in step S838) even though the controller 130 intends to transmit the memory map segment M_SEGMENT, the controller 130 may add the notice NOTICE to the response RESPONSE and transfer the response to the host 102, in step S840.

When the notice that the controller 130 will transmit the memory map segment M_SEGMENT to the host 102 has been already sent ("YES" in step S838), the controller 130 may add the memory map segment M_SEGMENT to the response in step S842. In step S844, the controller 130 may transmit the response including the memory map segment M_SEGMENT.

Then, in step S846, the controller 130 not only resets the total read count ALL_RD_CNT and the map miss count MISS_CNT, but also resets the candidate flag CND_FLAG indicating a candidate memory map segment M_SEGMENT to be uploaded to the host 102.

In step S801, the host processor 104 of the host 102 may receive one or more of the response RESPONSE from the memory system 110, a response with a notice RESPONSE WITH NOTICE, and a response with map data RESPONSE WITH MAP INFO.

In step S803, the host processor 104 may check whether the notice is included in the received response. If the notice is included in the received response ("YES" in step S803), the host 102 may prepare to receive and store a memory map segment M_SEGMENT which may be transmitted later, in step S805.

In step S811, the host processor 104 may check a response corresponding to a previous command. For example, the host processor 140 may check the response to check whether the previous command is a success or fail.

When the notice is not included in the received response ("NO" in step S803), the host processor 104 may check whether the memory map segment M_SEGMENT is included in the response, in step S807.

When the memory map segment M_SEGMENT is not included in the received response ("NO" in step S807), the host processor 104 may check the response corresponding to the previous command in step S811.

When the memory map segment M_SEGMENT is included in the received response ("YES" in step S803), the host processor 104 may store the memory map segment M_SEGMENT in the response as a host map segment H_SEGMENT in the host memory 106, or update the host map segment H_SEGMENT which is already stored in the host memory 106, in step S809. For example, as shown in FIG. 20, the host 102 may store a memory map segment 03, a memory map segment 30, and a memory map segment 15, which are received from the memory system, as a host map segment 03, a host map segment 30, and a host map segment 15, respectively. When a host map segment corresponding to the memory map segment is present in the host memory, the host 102 may update the host map segment.

Then, in step S811, the host processor 104 may check the response corresponding to the previous command. For example, the host processor 140 may check the response to check whether the previous command is a success or fail.

Figure 24:
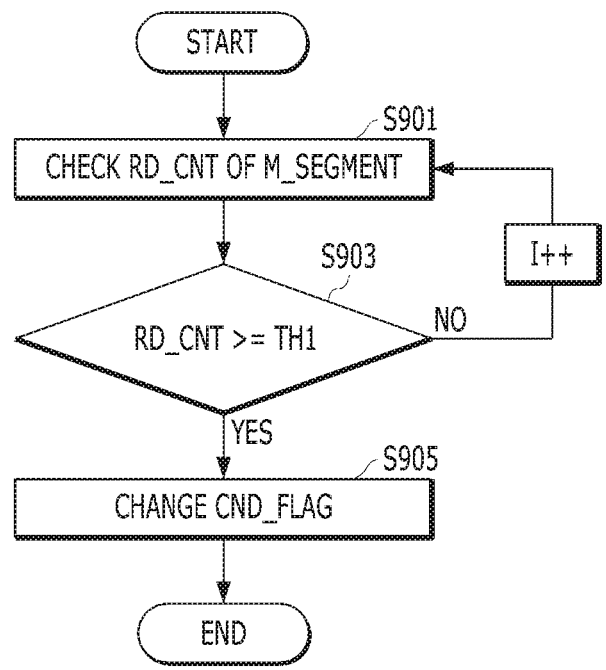
FIG. 24 is a flowchart illustrating a method for sorting candidate memory map segments in accordance with an embodiment of the disclosure.

FIG. 24 is a flowchart illustrating a method for sorting candidate memory map segments in accordance with an embodiment of the disclosure.

Referring to FIG. 24, the memory map segment M_SEGMENT to be provided to the host 102 may indicate a segment which has not been provided to the host 102 in each random period and whose read count is greater than or equal to the first threshold TH1, or a segment whose mapping information has been changed by a command operation or internal operation and whose read count is greater than or equal to the first threshold TH1.

In step S901, the controller 130 checks the read count RD_CNT corresponding to each of the memory map segments stored in the map management table MM TABLE. The read count RD_CNT may indicate information counted when the MM 44 receives a read request for logical addresses included in each of the memory map segments from the host 102.

In step S903, the MM 44 sequentially checks whether the read counts RD_CNT of the respective memory map segments are greater than or equal to the first threshold TH1. That is, the MM 44 checks whether the read count of a memory map segment corresponding to an index 1 is greater than or equal to the first threshold TH1.

When the check result indicates that the read count RD_CNT of the memory map segment corresponding to the index 1 is less than the first threshold TH1 ("NO" in step S903), the MM 44 increases the index information of the memory map segment by '1' (I++), and performs step S901 again. For example, when the first threshold TH1 is 500, the MM 44 checks whether the read count RD_CNT of the memory map segment 11 corresponding to the index 1 is greater than or equal to the first threshold TH1. Since the check result indicates that the read count RD_CNT of the memory map segment 11 is 30, the memory map segment cannot be selected as a memory map segment to be uploaded to the host 102.

On the other hand, when the read count RD_CNT of the memory map segment corresponding to the index 1 is greater than or equal to the first threshold TH1 ("YES" in step S903), the MM 44 may change a candidate flag corresponding to the memory map segment in step S905. For example, the candidate flag may be expressed as 1-bit data, and changed from '0' to '1' or from '1' to '0'. In the embodiment, when the candidate flag is '1', it may indicate that the corresponding memory map segment is a memory map segment to be uploaded to the host 102. For example, when the first threshold TH1 is 500, the MM 44 checks whether the read count RD_CNT of the memory map segment 03 corresponding to the index 2 is greater than or equal to the first threshold TH1. Since the check result indicates that the read count RD_CNT of the memory map segment 03 is 2000, the memory map segment 03 may be selected as a memory map segment to be uploaded to the host 102.

Figure 25:
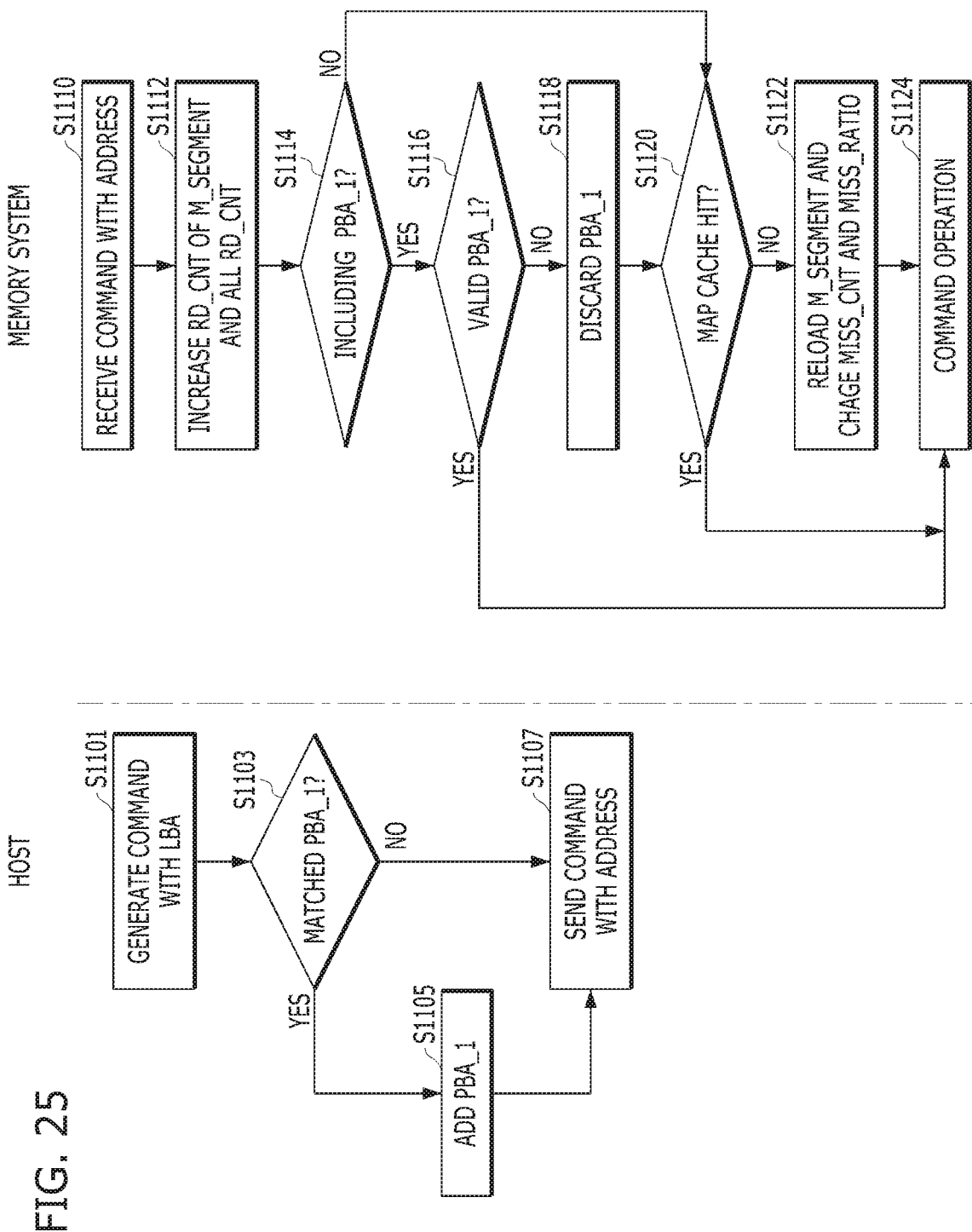
FIG. 25 is a flowchart illustrating operations of a host and a memory system in accordance with the embodiment of the disclosure.

FIG. 25 is a flowchart illustrating operations of the host and the memory system in accordance with the embodiment of the disclosure.

Steps S1101 to S1107 illustrate an operation of the host 102 which provides the memory system 110 with a request REQUEST including a command, and logical and physical addresses LBA/PBA. Steps S1110 to 1124 illustrate a specific operation of the memory system 110 which receives the request.

Referring to FIG. 25, the host processor 104 may generate a command and a logical address LBA in step S1101.

In step S1103, the host processor 104 may determine whether a physical address PBA_1 corresponding to the logical address LBA is included in a host map segment cached in the host memory 106.

When there is no physical address corresponding to the logical address LBA ("NO" in step S1103), the host processor 104 may provide a request including the command and the logical address LBA to the memory system 110 in step S1107.

When there is a physical address corresponding to the logical address ("YES" in step S1103), the host processor 104 may add the physical address PBA_1 to the command and the logical address LBA in step S1105. In step S1107, the host processor 104 may send the command with the logical/physical addresses LBA/PBA to the memory system 110. That is, when there is the physical address corresponding to the logical address LBA based on the memory map segment M_SEGMENT received from the memory system 110, the host processor 104 may provide a request including the command and the physical address PBA_1 to the memory system 110.

In step S1110, the controller 130 may receive the request from the outside through the host I/F 132. The request received from the outside may include the command and the logical address LBA or the logical/physical addresses LBA/PBA_1.

In step S1112, the controller 130 may increase the total read count ALL_RD_CNT and the read count RD_CNT of the memory map segment M_SEGMENT including the logical address LBA.

In step S1114, the controller 130 may determine whether the physical address PBA_1 is included in the received request.

When the physical address PBA_1 is not included in the received request ("NO" in step S1114), the controller 130 may retrieve the physical address PBA_1 corresponding to the logical address included in the received request in step S1120.

When the physical address PBA_1 is included in the received request ("YES" in step S1114), the controller 130 may determine whether the physical address PBA_1 is valid, in step S1116.

A reason why the controller 130 checks whether the physical address PBA_1 is valid is that the memory map segment M_SEGMENT managed by the memory system 110 may be changed and updated after the memory system 110 provides the memory map segment M_SEGMENT to the host 102. Therefore, when the host map segment H_SEGMENT is not matched with the memory map segment M_SEGMENT, the physical address PBA_1 received from the host 102 cannot be used. Therefore, the MM 44 may determine whether the physical address PBA_1 in the received request REQUEST is valid.

For example, when the memory map segment M_SEGMENT is changed after being provided to the host 102, the controller 130 may store time stamp information (not illustrated) in the memory 144, to indicate that the corresponding memory map segment M_SEGMENT was changed. The time stamp information may include first time information indicating that the memory map segment M_SEGMENT has been recently changed and second time information changed before the first time information, or may include time information indicating that the memory map segment M_SEGMENT has been recently changed. The MM 44 may determine the time sequence using the time stamp information, and thus determine whether the physical address is valid. When receiving the logical address LBA and the physical address PBA_1 from the host 102, the MM 44 may determine whether the memory map segment M_SEGMENT including the logical address LBA was changed, and thus determine whether the physical address PBA_1 is valid. The method for determining whether the physical address PBA_1 received from the host 102 is valid may be implemented differently depending on the configuration of the memory system 110.

When the physical address PBA_1 in the received request is valid ("YES" in step S1116), the controller 130 may perform an operation corresponding to the request using the physical address PBA_1 in step S1124.

When the physical address PBA_1 in the received request is not valid ("NO" in step S1116), the controller 130 may discard the physical address PBA_1 in step S1118.

In step S1120, the controller 130 may retrieve a physical address PBA_2 corresponding to the logical address LBA from the map cache 1441, based on the logical address LBA in the received request.

When the memory map segment M_SEGMENT including the logical address LBA in the received request is present in the map cache 1441 (i.e., map cache hit) ("YES" in step S1120), the MM 44 may perform an operation corresponding to the request of the host 102 using the physical address PBA_2 in step S1124. That is, when the physical address PBA_1 corresponding to the logical address LBA can be used because the memory map segment M_SEGMENT including the logical address LBA is present in the map cache 1441, the controller 130 may determine that a map hit MAP HIT occurred.

When the memory map segment including the logical address LBA in the received request is not present in the map cache 1441 (i.e., map cache miss) ("NO" in step S1120), the controller 130 may reload the memory map segment M_SEGMENT including the logical address LBA from the memory device 150, and change the map miss ratio (%) MISS_RATIO, in step S1122. That is, when the memory map segment M_SEGMENT is reloaded from the memory device 150, the MM 44 may determine that a map miss MAP MISS occurred. Therefore, the controller 130 may increase the map miss count MISS_CNT. Furthermore, the controller 130 may change the map miss ratio (%) MISS_RATIO according to the map miss count MISS_CNT and the read count RD_CNT. That is, the map miss ratio (%) MISS_RATIO may be decreased when the read count RD_CNT is increased, and increased when the map miss count is increased as a map miss occurs whenever the read command is inputted. In an embodiment, the MM 44 may reset the map miss ratio (%) in a predetermined period.

In step S1124, the controller 130 may perform an operation corresponding to the request using a physical address PBA_3 corresponding to the logical address LBA in the memory map segment M_SEGMENT reloaded from the memory device 150.

Figure 26:
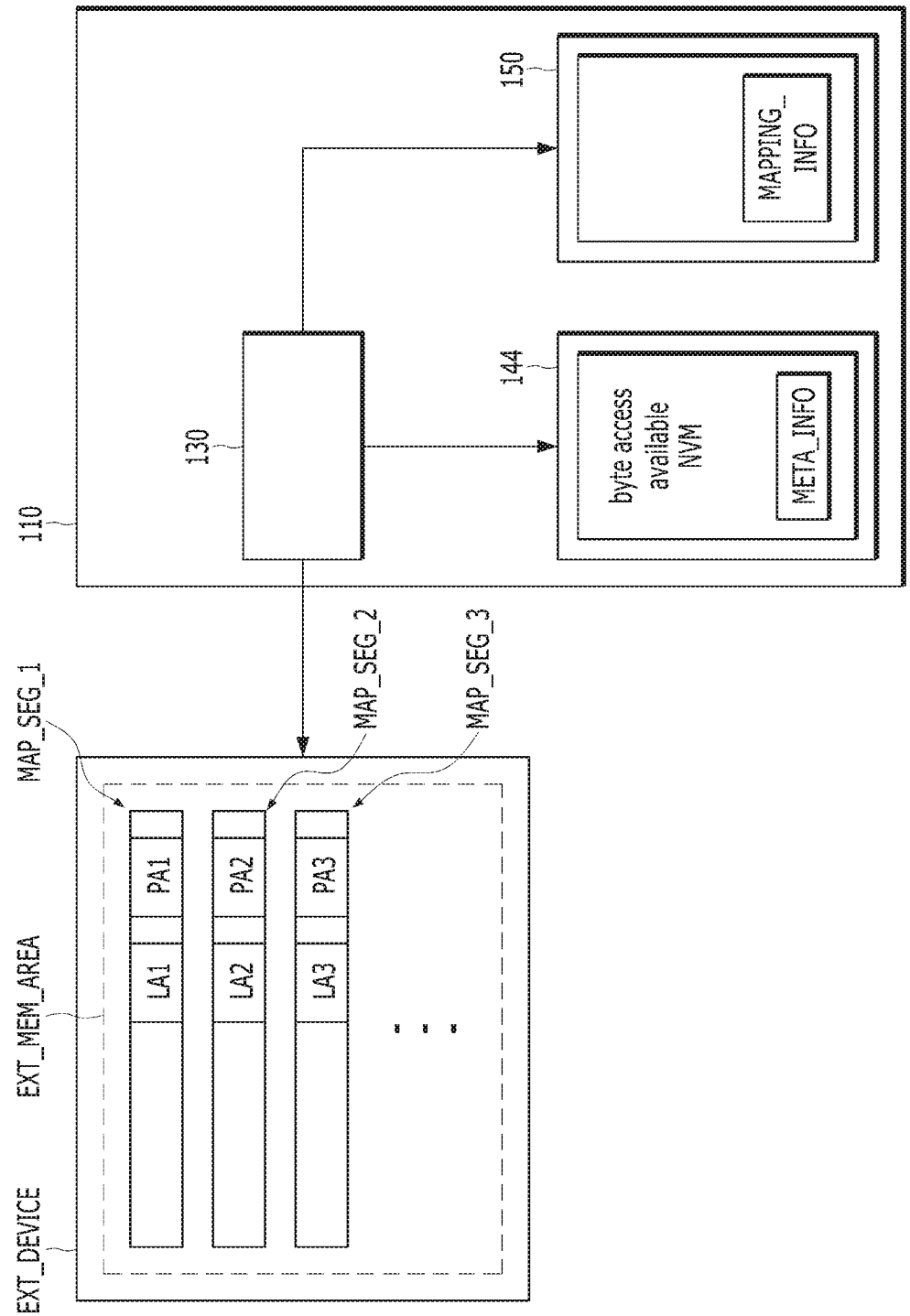
FIG. 26 is a diagram illustrating an example of operations of a memory system in accordance with an embodiment of the disclosure and an external device.

FIG. 26 is a diagram illustrating operations of the memory system 110 in accordance with an embodiment of the disclosure and an external device EXT_DEVICE.

Referring to FIG. 26, the controller 130 may cause all or some of mapping information between logical addresses and physical addresses, to be stored in a memory area EXT_MEM_AREA of the external device EXT_DEVICE.

A logical address is an address which is requested to the memory system 110 by the host 102 of FIG. 1. A physical address is an actual address where data is stored in the memory device 110. A physical address may include information on at least one among a die, a plane, a memory block and a page where the associated data is stored.

Mapping information between a logical address and a physical address may mean correspondence between the logical address and the physical address. A unit by which the logical address and the physical address correspond to each other may be a page, a sector, or a block.

The memory device 110 may store data at a physical address corresponding to a logical address of the host 102, and may store mapping information between the logical address and the physical address. The memory device 110 may store the mapping information between the logical address and the physical address, in the form of a mapping table.

The controller 130 may load all or some of mapping information between logical addresses and physical addresses, and may cache them in the working memory 125 of the controller 130.

The memory area EXT_MEM_AREA may store one or more mapping segments including MAP_SEG_1, MAP_SEG2, and MAP_SEG_3. One mapping segment may include at least one pair of a logical address and a physical address corresponding to each other. For example, the mapping segment MAP_SEG_1 may include a pair of a logical address LA1 and a physical address PAL The mapping segment MAP_SEG_2 may include a pair of a logical address LA2 and a physical address PA2. Pairs of logical addresses and physical addresses in the mapping segments MAP_SEG_1 to MAP_SEG_3 may be referred to by the host 102.

The memory area EXT_MEM_AREA may be positioned in the external device EXT_DEVICE of the memory system 110. For example, the external device EXT_DEVICE may be a device such as an SRAM, a DRAM, an SDRAM and a NAND flash memory which is included in the host 102. For another example, the external device EXT_DEVICE may be a separate storage device which is disposed externally to the host 102.

The controller 130 may perform various operations for controlling the memory area EXT_MEM_AREA described above.

For instance, the controller 130 may determine whether to activate the memory area EXT_MEM_AREA.

If the memory area EXT_MEM_AREA is activated, the host 102 may refer to the mapping information stored in the memory area EXT_MEM_AREA when transmitting a command to the controller 130. The host 102 may check a value of a physical address corresponding to a logical address in a command to be transmitted to the controller 130, using the mapping information. The mapping information may be stored in the memory area EXT_MEM_AREA, and may include the value of the corresponding physical address in the corresponding command. When receiving the corresponding command, the controller 130 may use the physical address included in the corresponding command, without the need of separately searching for the physical address mapped to the logical address included in the corresponding command. Therefore, the controller 130 may quickly process the command received from the host 102.

If the memory area EXT_MEM_AREA is deactivated, the host 102 does not refer to the mapping information stored in the memory area EXT_MEM_AREA when transmitting a command to the controller 130. In this case, the controller 130 needs to separately search for a physical address mapped to a logical address in the corresponding command.

For another instance, the controller 130 may control synchronization between the mapping segments stored in the memory area EXT_MEM_AREA and the aforementioned mapping information.

All or some of the mapping information may be changed by a program operation or a background operation (e.g., garbage collection, read reclaim, or wear leveling). Thus, if mapping segments corresponding to changed parts of the mapping information are stored in the memory area EXT_MEM_AREA, the controller 130 needs to update information of the mapping segments corresponding to the changed parts of the mapping information, through synchronization.

If the host 102 refers to a mapping segment which is not synchronized, the host 102 is likely to transmit a command including information on a physical address, which is not actually mapped to a logical address, to the controller 130. In this case, overhead may incur due to an operation in which the controller 130 determines the matching of the corresponding physical address. In this case, a speed at which the controller 130 processes the command received from the host 102 may decrease.

The controller 130 may perform such synchronization at various times. For instance, the controller 130 may perform the synchronization at every interval, which may be preset. For another instance, the controller 130 may perform the synchronization each time a particular event (e.g., when mapping information is changed) occurs.

In order to perform such synchronization, the controller 130 may store meta-information META_INFO on the mapping segments stored in the memory area EXT_MEM_AREA. The meta-information META_INFO may mean information indicating states of the mapping segments stored in the memory area EXT_MEM_AREA.

Instead of being stored in an SRAM, a DRAM or the memory device 110, the meta-information META_INFO may be stored in the separate meta-information memory device 150 of the memory system 110.

In this case, the meta-information memory device 150 may include a nonvolatile memory (e.g., a phase-change RAM (PCRAM) or a NOR flash device) capable of being read and written in the unit of byte, and the meta-information META_INFO may be stored in the corresponding nonvolatile memory.

The reason why the meta-information META_INFO is stored in a nonvolatile memory capable of being read and written in the unit of byte is as follows.

Since the meta-information META_INFO indicates the states of the mapping segments stored in the memory area EXT_MEM_AREA, it should match the states of the mapping segments currently stored in the memory area EXT_MEM_AREA.

However, when an unexpected sudden power-off (SPO) occurs in the memory system 110, the meta-information META_INFO may be lost or an error may occur in the meta-information META_INFO. In this case, the synchronization between the mapping segments stored in the memory area EXT_MEM_AREA and the mapping information fails.

Such synchronization failure may become serious, specifically, in the case where an SPO does not occur in the external device EXT_DEVICE in which the memory area EXT_MEM_AREA is positioned but occurs in only the memory system 110.

If SPOs occur in both the memory system 110 and the external device EXT_DEVICE, the host 102 may reset the memory area EXT_MEM_AREA and then notify the controller 130 of the reset of the memory area EXT_MEM_AREA so that synchronization is performed.

If an SPO does not occur in the external device EXT_DEVICE but occurs in only the memory system 110, the previously stored mapping segments may remain in the memory area EXT_MEM_AREA as they are, but the mapping information stored in the memory system 110 may be reset or be rolled back to mapping information at a specific time before occurrence of the SPO. As a consequence, synchronization between the mapping segments stored in the memory area EXT_MEM_AREA and the mapping information may be broken.

If this situation occurs, the controller 130 needs to reset the memory area EXT_MEM_AREA after boot-up and then check again the state of the memory area EXT_MEM_AREA from the beginning, or needs to check the matching of the memory area EXT_MEM_AREA each time a command is received from the host 102. Due to this fact, a speed at which the controller 130 processes a command received from the host 102 may slow down, thereby degrading the entire performance of the memory system 110.

Therefore, the meta-information META_INFO should be stored in a nonvolatile memory so that the meta-information META_INFO is prevented from being lost even when a situation such as an SPO occurs.

The meta-information META_INFO needs to be stored as fast as possible. This is because, if an SPO occurs even while the meta-information META_INFO is stored in the nonvolatile memory, since the possibility for the meta-information META_INFO to be lost or for an error to occur in the meta-information META_INFO still exists, the possibility for an SPO to occur when the meta-information META_INFO is stored needs to be minimized.

The write speed of a nonvolatile memory capable of being read from and written to in byte unit is faster than that of a nonvolatile memory such as a NAND flash device capable of being read to and written from in a page unit. The nonvolatile memory with byte unit read and write capability has less possibility for an SPO to occur during a write operation than the nonvolatile memory with page unit read and write capability. Thus, it is advantageous that the meta-information META_INFO is stored in a nonvolatile memory capable of being read to and written from in a byte unit.

Examples of the meta-information META_INFO which is stored in a nonvolatile memory with byte unit read and write capability are described below in detail. Examples of a time at which the meta-information META_INFO is updated is described in detail with reference to FIGS. 27 and 28, and examples of a type of information included in the meta-information META_INFO is described in detail with reference to FIGS. 29 to 31.

In an embodiment, a time at which the meta-information META_INFO is updated and a type of information which is included in the meta-information META_INFO do not need to be necessarily fixed, and may be dynamically changed.

Figure 27:
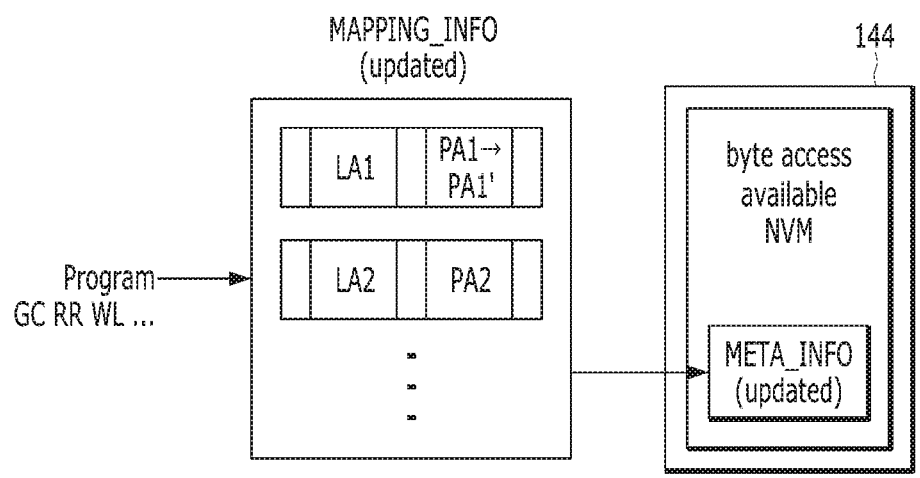
FIGS. 27 and 28 are diagrams illustrating examples in which meta-information is updated in accordance with an embodiment of the disclosure.
Figure 28:
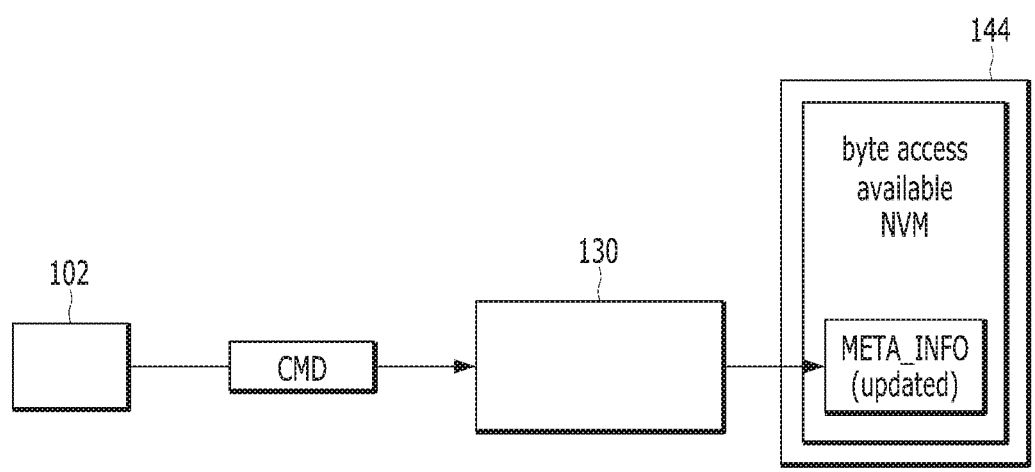

FIGS. 27 and 28 are diagrams illustrating examples in which meta-information META_INFO is updated in accordance with an embodiment of the disclosure.

Referring to FIG. 27, the meta-information META_INFO may be updated when mapping information MAPPING_INFO is updated. The controller 130 may perform such update.

For instance, mapping information may be updated when a program operation is performed or a background operation (e.g., garbage collection (GC), read reclaim (RR), or wear leveling (WL)) is performed.

When the mapping information MAPPING_INFO is updated in this way, the meta-information META_INFO stored in the meta-information memory device 150 may also be updated. In the example of FIG. 27, if a physical address corresponding to a logical address LA1 is updated from PA1 to PA1', the meta-information META_INFO stored in the meta-information memory device 150 may also be updated.

Referring to FIG. 28, the controller 130 may update the meta-information META_INFO when a command which instructs an operation for the memory area EXT_MEM_AREA is received from the host 102.

The corresponding command may be one among 1) a command which instructs an operation of storing some of mapping information in the memory area EXT_MEM_AREA; 2) a command which instructs activation and/or deactivation of a sub area included in the memory area EXT_MEM_AREA; and 3) a command which instructs a reset operation for the memory area EXT_MEM_AREA.

In the case where the meta-information META_INFO is updated as illustrated in FIGS. 27 and 28, since the meta-information META_INFO is stored in the nonvolatile memory in the meta-information memory device 150, the meta-information META_INFO is maintained even in a power-off state. Hence, the controller 130 does not need to perform an additional operation for maintaining the meta-information META_INFO, even upon occurrence of an SPO.

Figure 29:
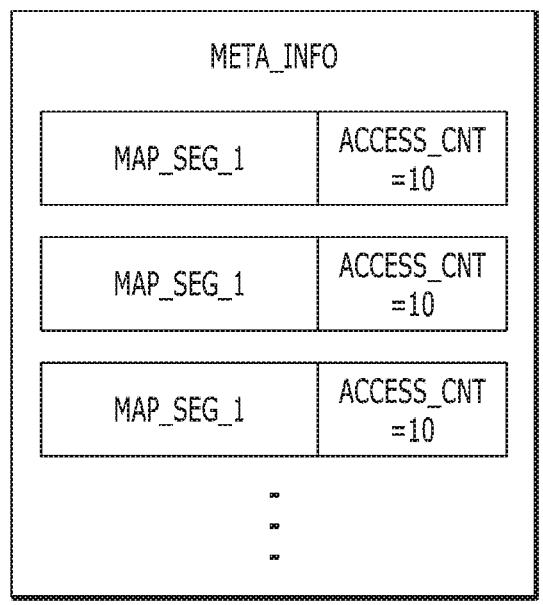
FIGS. 29 to 31 are diagrams illustrating examples of information in meta-information in accordance with an embodiment of the disclosure.
Figure 30:
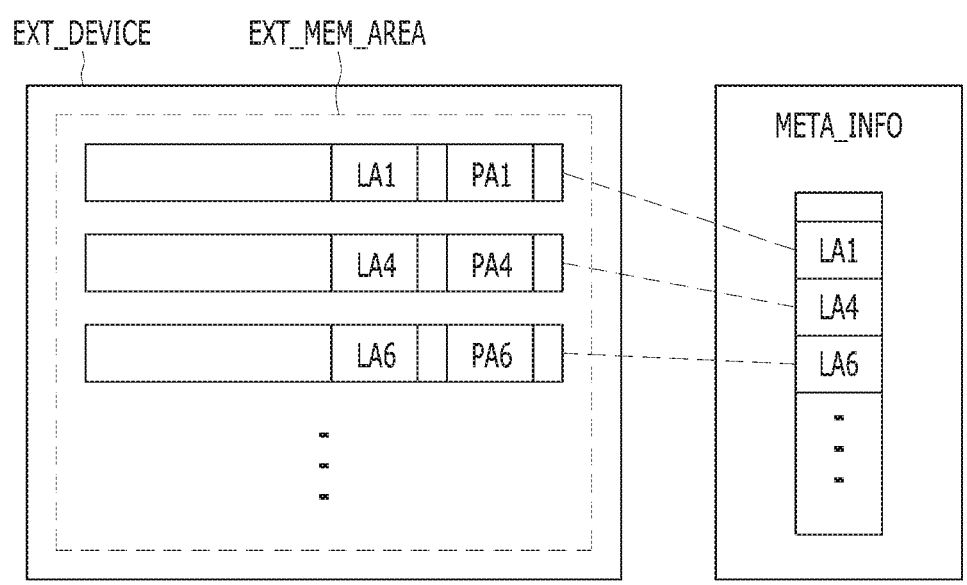
Figure 31:
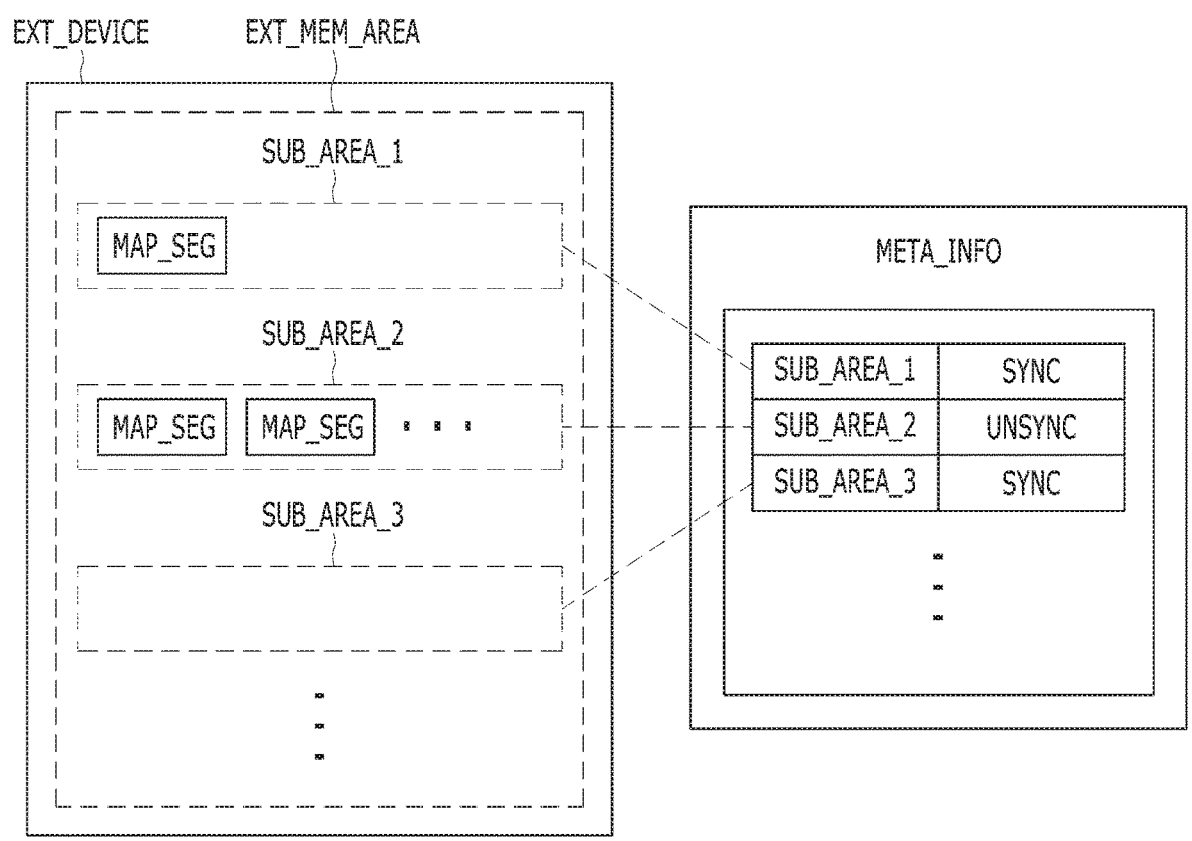

FIGS. 29 to 31 are diagrams illustrating examples of information in the meta-information META_INFO in accordance with an embodiment of the disclosure.

Referring to FIG. 29, the meta-information META_INFO may include information on an access count ACCESS_CNT for each of the mapping segments stored in the memory area EXT_MEM_AREA. The controller 130 may update the information on an access count ACCESS_CNT for each of the mapping segments, to the meta-information META_INFO.

For instance, the meta-information META_INFO may store an access count ACCESS_CNT of the mapping segment MAP_SEG_1 (which is 10 here), an access count ACCESS_CNT of the mapping segment MAP_SEG_2 (which is 1 here) and an access count ACCESS_CNT of the mapping segment MAP_SEG_3 (which is 15 here).

The information on an access count ACCESS_CNT for each of the mapping segments may indicate which mapping segment is hot and which mapping segment is cold among the mapping segments.

Based on the information on an access count ACCESS_CNT, the controller 130 may check a frequency at which a mapping segment stored in the memory area EXT_MEM_AREA is accessed by the host 102.

If a frequency at which a mapping segment stored in the memory area EXT_MEM_AREA is accessed by the host 102 is greater than or equal to a threshold frequency, the controller 130 may continuously activate the memory area EXT_MEM_AREA.

If a frequency at which a mapping segment stored in the memory area EXT_MEM_AREA is accessed by the host 102 is less than the threshold frequency, the controller 130 may deactivate the memory area EXT_MEM_AREA or may change the mapping segment stored in the memory area EXT_MEM_AREA.

Referring to FIG. 30, the meta-information META_INFO may include information on which part of the mapping information is stored in the memory area EXT_MEM_AREA. The controller 130 may update information on a part of a mapping segment among the mapping information, to the meta-information META_INFO.

For instance, mapping information between a logical address LA1 and a physical address PA1, between a logical address LA4 and a physical address PA4 and between a logical address LA6 and a physical address PA6 is stored in the memory area EXT_MEM_AREA.

The meta-information META_INFO may include information that the mapping information corresponding to the logical address LA1, the logical address LA4 and the logical address LA6 is stored in the memory area EXT_MEM_AREA.

Referring to FIG. 31, the meta-information META_INFO may include synchronization information on each of sub areas included in the memory area EXT_MEM_AREA. The controller 130 may update the synchronization information on each of the sub areas included in the memory area EXT_MEM_AREA, to the meta-information META_INFO.

The memory area EXT_MEM_AREA may include one or more sub areas. For instance, the memory area EXT_MEM_AREA may include a sub area SUB_AREA_1, a sub area SUB_AREA_2 and a sub area SUB_AREA_3. Each of SUB_AREA_1 and SUB_AREA_2 may include at least one mapping segment MAP_SEG. However, SUB_AREA_3 may not include any mapping segment MAP_SEG.

The controller 130 may determine which sub area is to be synchronized, based on the synchronization information on the respective sub areas in the meta-information META_INFO.

In the example of FIG. 31, the meta-information META_INFO indicates that the sub area SUB_AREA_1 and the sub area SUB AREA_3 are in a synchronization-completed state SYNC and the sub area SUB_AREA_2 is in a synchronization-uncompleted state UNSYNC. Therefore, the controller 130 may perform a synchronization task for only the mapping segment MAP_SEG in the sub area SUB_AREA_2, by referring to the meta-information META_INFO.

An SPO may occur even while the meta-information META_INFO is updated to the meta-information memory device 150. Thus, the controller 130 needs to check whether an SPO has occurred while updating the meta-information META_INFO to the meta-information memory device 150.

If an SPO has occurred while the meta-information META_INFO is updated to the meta-information memory device 150, the meta-information META_INFO stored is highly unlikely to accurately reflect a current state of the memory area EXT_MEM_AREA. Therefore, the controller 130 may change the meta-information META_INFO to match the current state of the memory area EXT_MEM_AREA.

Figure 32:
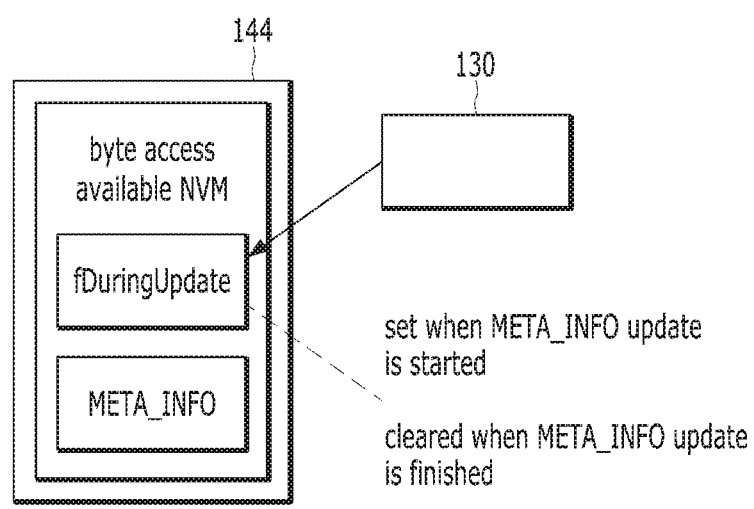
FIG. 32 is a diagram illustrating an example of flag information indicating that meta-information is being updated, in accordance with an embodiment of the disclosure.

To this end, FIGS. 31 and 32 illustrate an example in which flag information indicating whether the meta-information META_INFO is being updated to the meta-information memory device 150 is used.

FIG. 32 is a diagram illustrating an example of flag information indicating that meta-information is being updated, in accordance with an embodiment of the disclosure.

Referring to FIG. 32, not only the meta-information META_INFO but also flag information indicating whether the meta-information META_INFO is being updated (fDuringUpdate) may be stored in the nonvolatile memory. The nonvolatile memory is capable of being read and written in the unit of byte, which is included in the meta-information memory device 150. The controller 130 may generate the flag information fDuringUpdate indicating whether the meta-information META_INFO is being updated. Further, the controller 130 may store the flag information (fDuringUpdate) in the meta-information memory device 150.

Specifically, the controller 130 may set the corresponding flag information (fDuringUpdate) before updating the meta-information META_INFO to the meta-information memory device 150. Further, the controller 130 may clear the corresponding flag information (fDuringUpdate) when the update of the meta-information META_INFO is completed. For example, a value of 1 indicates that the corresponding flag information is in the set state and a value of 0 indicates that the corresponding flag information is in the clear state. This indicating convention may be reversed.

Therefore, if an SPO occurs while the meta-information META_INFO is updated to the meta-information memory device 150, since the corresponding flag information (fDuringUpdate) is not cleared by the controller 130, such flag information is in the set state. Thus, by checking that the corresponding flag information (fDuringUpdate) is set, the controller 130 may determine that an SPO has occurred while the meta-information META_INFO is updated.

Various methods may be used by the controller 130 to change (or update) the meta-information META_INFO to match the current state of the memory area EXT_MEM_AREA.

For instance, the controller 130 may change the meta-information META_INFO by checking a state of the memory area EXT_MEM_AREA through a command received from the host 102. However, if this method is used, an overhead to perform an operation for checking a state of the entire memory area EXT_MEM_AREA increases.

For another instance, the controller 130 may transmit a signal which instructs an operation of resetting the memory area EXT_MEM_AREA, to the host 102. In this case, the controller 130 only needs to initialize the meta-information META_INFO stored in the meta-information memory device 150, without the need of separately checking a current state of the memory area EXT_MEM_AREA. The host 102 may receive the corresponding signal and may reset the memory area EXT_MEM_AREA.

Figure 33:
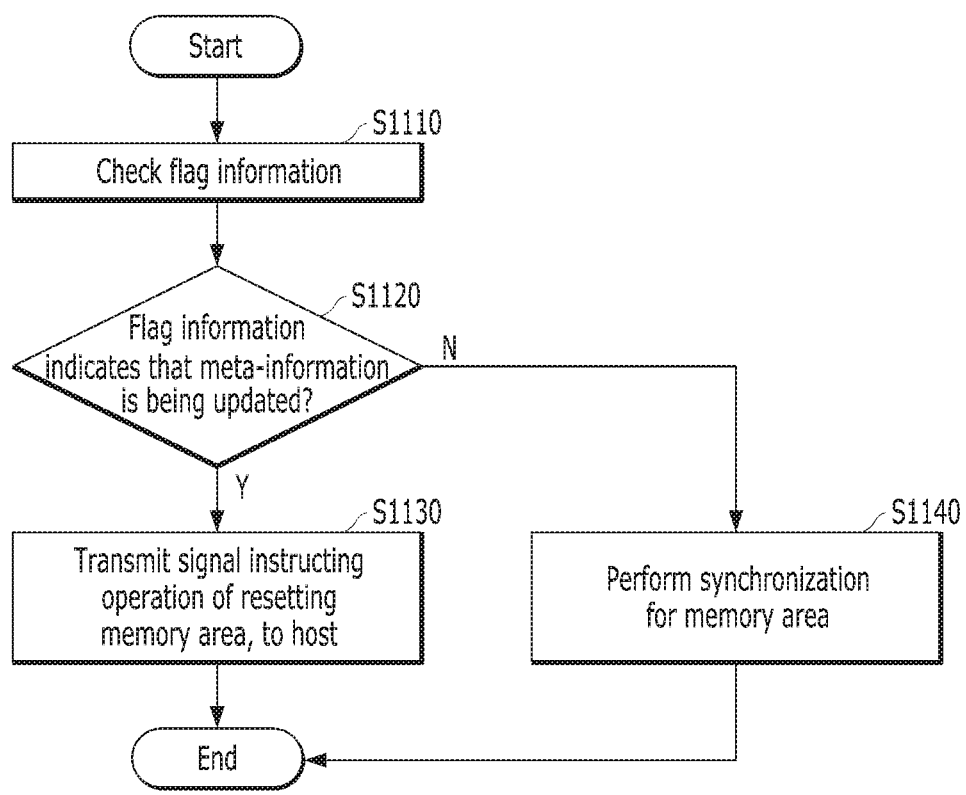
FIG. 33 is a flow chart illustrating a method for operating a memory controller depending on the flag information of FIG. 32.

FIG. 33 is a flow chart illustrating a method for operating the controller 130 depending on the flag information of FIG. 32.

Referring to FIG. 33, the controller 130 checks the flag information (fDuringUpdate) which is stored in the meta-information memory device 150 (S1110).

The controller 130 determines whether the corresponding flag information (fDuringUpdate) indicates that the meta-information META_INFO is being updated (S1120).

When it is determined that the corresponding flag information (fDuringUpdate) indicates that the meta-information META_INFO is being updated (S1120-Y), the controller 130 may determine that an SPO has occurred while the meta-information META_INFO is updated. Therefore, the controller 130 may transmit a signal which instructs an operation of resetting the memory area EXT_MEM_AREA, to the host 102, to match a current state of the memory area EXT_MEM_AREA (S1130).

When it is determined that the corresponding flag information (fDuringUpdate) does not indicate that the meta-information META_INFO is being updated (S1120-N), the controller 130 may determine that update of the meta-information META_INFO is properly completed. Therefore, the controller 130 may perform synchronization for the memory area EXT_MEM_AREA according to the updated meta-information META_INFO (S1140).

The above-described operation of the controller 130 may be controlled by the control circuit 123, and may be performed in such a manner that the processor 124 executes (or drives) firmware in which all operations of the controller 130 are programmed.

Based on an embodiment above described, the memory system may transmit the map information to the host. After processing the command transmitted by the host, the memory system may utilize a response associated with the command in order to transmit the map information. In addition, the memory system may transmit the map information to the host, and then generate and store a log or a history regarding the transmitted map information. Even if power is resumed after the power is not supplied to the host and the memory system, the memory system may transmit map information to the host using the log or the history above described. The host may transmit a command with logical and physical addresses to the memory system after performing a mapping operation or an address translation based on the transmitted map information. Through the command with the logical and physical addresses, data input/output (I/O) performance of the memory system can be improved or enhanced.

According to an embodiment of the disclosure, a data processing system, a method for operating the data processing system and a method of controlling an the operation in the data processing system can provide a memory system which is capable of performing a data input/output operation corresponding to a request delivered from a host (or a computing device) and an operation for sharing map information between the host (or the computing device) and the memory system. The data input/output operation can be performed independently from the operation for sharing map information between the host and the memory system. Accordingly, the operation for sharing the map information does not interrupt the data input/output operation of the memory system. Thus, it is possible not to deteriorate the performance of the memory system (e.g., input/output (I/O) throughput).

In an embodiment of the disclosure, a memory system can avoid the degradation of data I/O throughput of the memory system for determining which map information is transmitted from the memory system to an external device (e.g., a host or a computing device) and transmitting the determined map information to the external device. Thus, it is possible to enhance or improve operational efficiency of the memory system.

Further, according to an embodiment of the disclosure, a memory system can determine which map information is shared with a host (or a computing device) based on user's usage pattern of a data processing system including the memory system and the host (or the computing device), so that operational efficiency of the data processing system can be improved.

When controlling the memory system to enter the sleep mode, the data processing system may transfer, to the host, the internal data stored in the volatile memory of the memory system, where the volatile memory will have power suspended in the sleep mode, and store the internal data in the internal memory of the host. Furthermore, when controlling the memory system to exit from the sleep mode, the data processing system may receive the internal data stored in the internal memory of the host, and store the internal data in the volatile memory of the memory system, where the volatile memory had power restored as part of exiting the sleep mode. Through this operation, the entry and exit latencies of the sleep mode can be significantly reduced compared to when the internal data stored in the volatile memory of the memory system are programmed to and read from the nonvolatile memory at entry and exit, respectively, of the sleep mode. Therefore, the operation performance of the memory system can be improved.

As is apparent from the above description, according to an embodiment of the disclosure, it is possible to provide a memory system, a memory controller and a meta-information storage device capable of quickly processing a command received from a host even when an SPO occurs.

Also, according to an embodiment of the disclosure, it is possible to provide a memory system, a memory controller and a meta-information storage device capable of allowing a host to quickly refer to necessary mapping information.

While the disclosure has been described with respect to the specific an embodiment, it will be apparent to those skilled in the art that various changes and modifications may be made without departing from the spirit and scope of the invention as defined in the following claims.

What is claimed is:

1. A memory system, comprising:
    a memory device configured to store a piece of data in a location which is distinguished by a physical address; and
    a controller configured to generate a piece of map data associating a logical address, inputted along with a request from an external device, with the physical address and to determine a timing of transferring the piece of map data into the external device to avoid decreasing an input/output throughput of the memory system,
    wherein the controller is configured to select plural pieces of map data to be transferred, to send an inquiry to the external device when an amount of the plural pieces of map data is larger than a size of map data transferred one time to the external device, and to determine how many the controller transfers of some of the plural pieces of map data to the external device based on a request corresponding to the inquiry.

2. The memory system according to claim 1, wherein the controller is configured to determine a map miss count based on whether the physical address associated with the logical address, which is inputted from the external device, is loaded in a cache memory, to calculate a map miss ratio based on a total read count and the map miss count and to determine the timing of transferring the piece of map data based on the map miss ratio.

3. The memory system according to claim 2, wherein the controller is configured to select the piece of map data, which would be transferred, based on a read count corresponding to a map segment including the piece of map data.

4. The memory system according to claim 1, wherein the controller is configured to synchronize the piece of map data stored in the memory device with the piece of map data which is previously transferred to the external device.

5. The memory system according to claim 4, wherein the controller is configured to monitor whether the piece of map data stored in the memory device is updated after the piece of map data is transferred to the external device and to determine the timing of transferring the piece of map data based on a monitoring result.

6. The memory system according to claim 5, wherein, the controller is configured to use a flag for indicating whether the piece of map data is updated, and the flag is individually assigned for a map segment including plural pieces of map data.

7. The memory system according to claim 1, wherein the controller is configured to receive a hibernation request inputted from the external device, to transfer the piece of map data to the external device before transferring a response corresponding to the hibernation request to the external device, and to transfer the response including whether an operation status of the memory system enters into a sleep mode to the external device.

8. The memory system according to claim 1, wherein the controller is configured to perform a data input/output operation based on the request, wherein the data input/output operation is parallelly or independently performed by a multi-processor with the determining the timing of transferring the piece of map data to the external device.

9. The memory system according to claim 1, wherein the controller is configured to monitor a usage frequency regarding the piece of map data, and to determine the timing of transferring the piece of map data to the external device based on the usage frequency.

10. A controller operating between plural devices, each device including an independent address scheme to indicate a location in which a piece of data is stored, wherein the controller is configured to perform an operation in response to a request inputted from one of the plural devices, to generate a piece of map data associating plural addresses used in the plural devices with each other, and to determine a timing of transferring the piece of map data into the one of the plural devices to avoid decreasing an input/output throughput of another device of the plural devices, and
wherein the controller is configured to select plural pieces of map data to be transferred, to send an inquiry to an external device when an amount of the plural pieces of map data is larger than a size of map data transferred one time to the external device, and to determine how many the controller transfers of some of the plural pieces of map data to the external device based on a request corresponding to the inquiry.

11. The controller according to claim 10, wherein the timing of transferring the piece of map data is determined based at least on a map miss count, an update or a usage frequency regarding the piece of map data.

12. The controller according to claim 11, wherein the controller is configured to determine the map miss count based on whether the physical address associated with the logical address, which is inputted from the one of the plural devices, is loaded in a cache memory from the another device of the plural devices, to calculate a map miss ratio based on a total read count and the map miss count and to determine the timing of transferring the piece of map data based on the map miss ratio.

13. The controller according to claim 11, wherein the controller is configured to monitor whether the piece of map data stored in the another device of the plural devices is updated after the piece of map data is transferred to the one of the plural devices and to determine the timing of transferring the piece of map data based on a monitoring result.

14. The controller according to claim 11, wherein the controller is configured to monitor a usage frequency regarding the piece of map data, and to determine the timing of transferring the piece of map data to the one of the plural devices based on the usage frequency.

15. The controller according to claim 10, wherein the controller is configured to synchronize the pieces of map data, which are stored in the plural devices individually, with each other.

16. The controller according to claim 10, wherein the controller is configured to receive a hibernation request inputted from the one of the plural devices, to transfer the piece of map data to the one of the plural devices before transferring a response corresponding to the hibernation request to the one of the plural devices, and to transfer the response including whether an operation status regarding the another device of the plural devices enters into a sleep mode to the one of the plural devices.

17. The controller according to claim 10, wherein the controller is configured to perform a data input/output operation to the another device of the plural devices based on the request inputted from the one of the plural devices, wherein the data input/output operation is parallelly or independently performed by a multi-processor with the determining the timing of transferring the piece of map data to the one of the plural devices.

18. A method for operating a memory system including a memory device configured to store a piece of data in a location which is distinguished by a physical address, comprising:
generating a piece of map data associating a logical address, inputted along with a request from an external device, with the physical address;
determining a timing of transferring the piece of map data into the external device to avoid decreasing an input/output throughput of the memory system;
select plural pieces of map data to be transferred;
sending an inquiry to the external device when an amount of the plural pieces of map data is larger than a size of map data transferred one time to the external device; and
determining how many a controller transfers of some of the plural pieces of map data to the external device based on a request corresponding to the inquiry.

19. The method according to claim 18, further comprising:
monitoring at least one of a map miss count, an update or a usage frequency regarding the piece of map data, wherein the timing of transferring the piece of map data is determined based on a monitoring result.

* * * * *